US012671943B2

(12) United States Patent
Lee et al.

(10) Patent No.: US 12,671,943 B2
(45) Date of Patent: Jun. 30, 2026

(54) VIBRATION GENERATING APPARATUS

(71) Applicant: LG Display Co., Ltd., Seoul (KR)

(72) Inventors: HwaYoul Lee, Paju-si (KR); YongWoo Lee, Paju-si (KR); Yong-Su Ham, Paju-si (KR); Seunghyun Sung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 292 days.

(21) Appl. No.: 17/980,488

(22) Filed: Nov. 3, 2022

(65) Prior Publication Data

US 2023/0217185 A1 Jul. 6, 2023

(30) Foreign Application Priority Data

Dec. 31, 2021 (KR) ........................ 10-2021-0194791
Aug. 10, 2022 (KR) ........................ 10-2022-0099961

(51) Int. Cl.
*H04R 17/00* (2006.01)

(52) U.S. Cl.
CPC ......... *H04R 17/00* (2013.01); *H04R 2499/15* (2013.01)

(58) Field of Classification Search
CPC ................ H04R 17/00; H04R 2499/11; H04R 2499/15; H04R 2217/00; H04R 2217/01; H04R 2217/03; H04R 19/00; H04R 19/005; H04R 19/01; H04R 19/013; H04R 19/02; H04R 1/028
USPC ................................. 381/190, 189, 191, 388
See application file for complete search history.

(56) References Cited

U.S. PATENT DOCUMENTS

| | | | | |
|---|---|---|---|---|
| 2018/0338379 A1* | 11/2018 | Bemmerl | ................. | H05K 7/02 |
| 2019/0205594 A1* | 7/2019 | Lee | ........................ | H10K 59/40 |
| 2020/0059733 A1* | 2/2020 | Shin | ........................ | H04R 17/00 |
| 2020/0209973 A1* | 7/2020 | Kim | ........................ | B60K 35/10 |
| 2021/0200265 A1 | 7/2021 | Ko et al. | | |
| 2021/0304920 A1 | 9/2021 | Ko et al. | | |

FOREIGN PATENT DOCUMENTS

| | | | | |
|---|---|---|---|---|
| CN | 113132874 A | 7/2021 | | |
| CN | 113471356 A | 10/2021 | | |
| CN | 215814105 U * | 2/2022 | ............ | G06F 3/041 |
| JP | 7-327297 A | 12/1995 | | |
| JP | 2014-127821 A | 7/2014 | | |
| JP | 2016-099137 A | 5/2016 | | |
| JP | 2016-522650 A | 7/2016 | | |
| JP | 2021-141584 A | 9/2021 | | |

(Continued)

OTHER PUBLICATIONS

Office Action issued on Dec. 5, 2023 in Japanese Patent Application No. 2022-173459.

(Continued)

*Primary Examiner* — Ahmad F. Matar
*Assistant Examiner* — Sabrina Diaz
(74) *Attorney, Agent, or Firm* — Morgan, Lewis & Bockius LLP

(57) ABSTRACT

An apparatus includes a vibration portion, a first protection member covering a first surface of the vibration portion, and a second protection member covering a second surface of the vibration portion, wherein at least one of the first protection member and the second protection member includes a first layer including a metal material or an inorganic material.

24 Claims, 17 Drawing Sheets

(56) References Cited

FOREIGN PATENT DOCUMENTS

| | | |
|---|---|---|
| JP | 2021-164165 A | 10/2021 |
| JP | 2021-180486 A | 11/2021 |

OTHER PUBLICATIONS

Office Action issued in corresponding Chinese Patent Application No. 202211346173.X, dated Jul. 24, 2025.

Office Action dated Feb. 10, 2026 issued in the corresponding Chinese Patent Application No. 202211346173.X.

* cited by examiner

VIBRATION GENERATING APPARATUS

CROSS-REFERENCE TO RELATED APPLICATIONS

This application claims the benefit of and priority to Korean Patent Application No. 10-2021-0194791 filed on Dec. 31, 2021, and No. 10-2022-0099961 filed on Aug. 10, 2022, both of which are hereby incorporated by reference as if fully set forth herein for all purposes.

BACKGROUND

Technical Field

The present disclosure relates to an apparatus.

Discussion of the Related Art

Apparatuses may include a separate speaker or sound apparatus for providing a sound. In a case where a speaker is provided in apparatuses, a problem occurs where the design and space arrangement of each apparatus are limited due to a space occupied by the speaker.

Speakers or vibration apparatuses applied to apparatuses may vibrate based on a type such as a coil type including a magnet and a coil or a piezoelectric type using a piezoelectric device to output a sound.

Piezoelectric devices may be easily damaged by an external impact due to a fragile characteristic thereof, causing a problem where the reliability of sound reproduction is low. Also, because a piezoelectric constant of a piezoelectric device is low, piezoelectric-type vibration apparatuses have a drawback where a sound characteristic and/or a sound pressure level characteristic are/is lower than the coil type in a low-pitched sound band region.

Moreover, a piezoelectric material of piezoelectric devices has a driving characteristic which may be changed based on, for example, a temperature and/or humidity, and due to this, piezoelectric devices may be degraded and there is a problem where the reliability of sound reproduction is low.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

Therefore, the inventors have recognized the problems described above as well as the problems and disadvantages of the related art, have performed extensive research and experiments for implementing an apparatus where the environment reliability of sound reproduction is enhanced by a piezoelectric material, and additionally performed extensive research and experiments for implementing an apparatus which may satisfy environment reliability, prevent the penetration of humidity and/or water from the outside, and enhance a sound characteristic and/or a sound pressure level characteristic. Through various experiments, the inventors have invented a new apparatus for enhancing the environment reliability of sound reproduction and have invented a new apparatus which may satisfy environment reliability, prevent the penetration of humidity and/or water from the outside, and enhance a sound characteristic and/or a sound pressure level characteristic.

Accordingly, embodiments of the present disclosure are directed to an apparatus that substantially obviates one or more of the problems due to limitations and disadvantages of the related art An aspect of the present disclosure is to provide an apparatus where the environment reliability of a vibration apparatus including a piezoelectric device is enhanced.

Another aspect of the present disclosure is to provide an apparatus where the environment reliability of a vibration apparatus including a piezoelectric device is enhanced and a sound characteristic and/or a sound pressure level characteristic are/is enhanced.

Another aspect of the present disclosure is to provide an apparatus where a vibration apparatus for preventing the penetration of humidity and/or water from the outside, and thus, a sound characteristic and/or a sound pressure level characteristic are/is enhanced.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, an apparatus may comprise a vibration portion, a first protection member covering a first surface of the vibration portion, and a second protection member covering a second surface of the vibration portion. At least one of the first protection member and the second protection member may include a first layer including a metal material or an inorganic material.

In another aspect, an apparatus may comprise one or more vibration generating portions, each of the one or more vibration generating portions may include a vibration portion, a first protection member on a first surface of the vibration portion, the first protection member including two or more layers, and a second protection member on a second surface different from the first surface of the vibration portion, the second protection member including two or more layers. One of two or more layers in one or more of the first protection member and the second protection member may include an organic material.

In one or more aspects of the present disclosure, an apparatus may comprise one or more vibration generating portions, each of the one or more vibration generating portions may include a vibration portion, a first protection member at a first surface of the vibration portion, and a second protection member at a second surface different from the first surface of the vibration portion. One or more of the first protection member and the second protection member may include a layer including an organic material.

In another aspect, an apparatus may comprise a passive vibration member and a vibration generating apparatus configured to vibrate the passive vibration member. The vibration generating apparatus may include a vibration portion, a first protection member covering a first surface of the vibration portion, and a second protection member covering a second surface of the vibration portion. At least one of the first protection member and the second protection member may include a first layer including a metal material or an inorganic material.

In another aspect, an apparatus may comprise a passive vibration member and a vibration generating apparatus configured to vibrate the passive vibration member. The vibration generating apparatus may include one or more vibration generating portions, and each of the one or more vibration generating portions includes a vibration portion, a first protection member on a first surface of the vibration portion, the first protection member including two or more layers, and a second protection member on a second surface different from the first surface of the vibration portion, the second protection member including two or more layers. One of two or more layers in one or more of the first protection member and the second protection member may include an organic material.

In another aspect, an apparatus may comprise a passive vibration member and a vibration generating apparatus configured to vibrate the passive vibration member. The vibration generating apparatus may include one or more vibration generating portions, and each of the one or more vibration generating portions includes a vibration portion, a first protection member at a first surface of the vibration portion, and a second protection member at a second surface different from the first surface of the vibration portion. One or more of the first protection member and the second protection member may include a layer including an organic material.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate embodiments of the disclosure and together with the description serve to explain principles of the disclosure.

Figure 1:
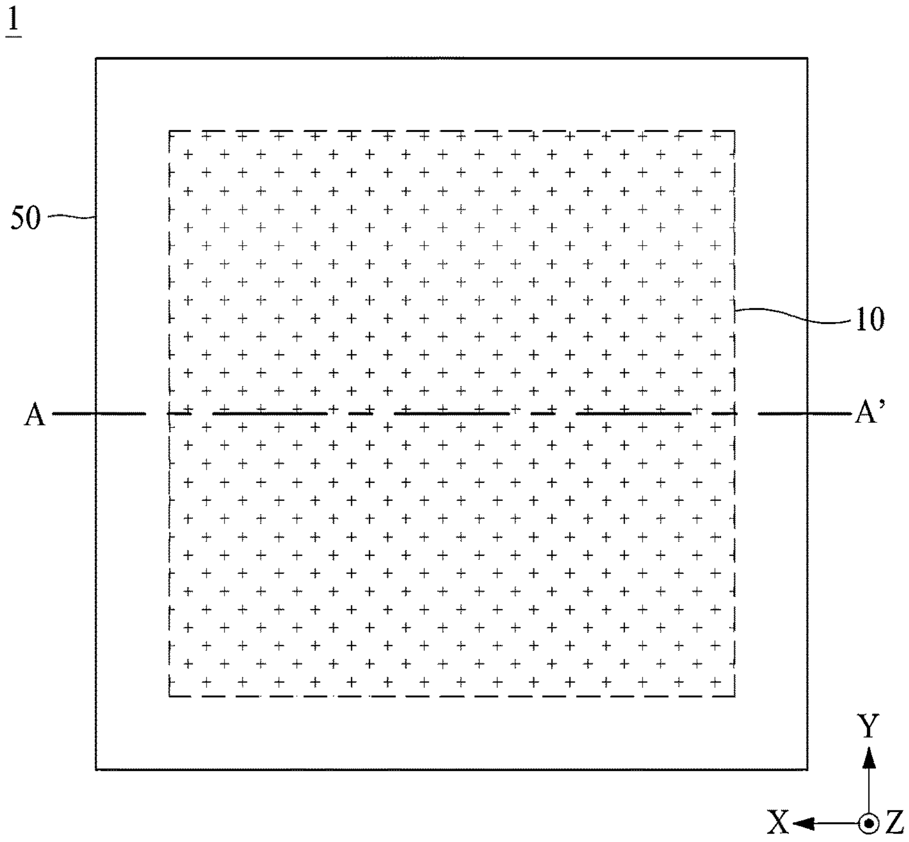
FIG. 1 illustrates a vibration apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted for brevity. The progression of processing steps and/or operations described is an example; however, the sequence of steps and/or operations is not limited to that set forth herein and may be changed, with the exception of steps and/or operations necessarily occurring in a particular order.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience of writing the specification and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are provided so that this disclosure is thorough and complete, and fully conveys the scope of the present disclosure to those skilled in the art. Further, the present disclosure is only defined by claims and their equivalents.

The shapes, sizes, areas, ratios, angles, numbers, and the like disclosed in the drawings for describing embodiments of the present disclosure are merely examples, and thus, embodiments of the present disclosure are not limited to the illustrated details.

When the term "comprise," "have," "include," "contain," "constitute," "make up of," "formed of," and the like is used, one or more other elements may be added unless a term, such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. Any implementation described herein as an "example" is not necessarily to be construed as preferred or advantageous over other implementations In one or more aspects, an element, feature, or corresponding information (e.g., a level, range, dimension, size, or the like) is construed as including an error range even where no explicit description is provided. An error or tolerance range may be caused by various factors (e.g., process factors, internal or external impact, noise, or the like). Further, the term "may" encompasses all the meanings of the term "can."

In describing a positional relationship, where the positional relationship is described using "on," "over," "under," "above," "below," "beneath," "near," "close to," or "adjacent to," "beside," "next to," or the like, one or more portions may be located between two other portions unless a more limiting term, such as "immediate(ly)," "direct(ly)," or "close(ly)," is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "front," "rear," "left," "right," "top," "bottom, "downward," "upward," "upper," "lower," and the like refer to an arbitrary frame of reference.

In describing a temporal relationship, when the temporal order is described as "after," "subsequent," "next," "before," "prior to," or the like, a case which is not consecutive or not sequential may be included unless a more limiting term, such as "just," "immediate(ly)," or "direct(ly)," is used.

It is understood that, although the term "first," "second," "A," "B," "(a)," "(b)," or the like may be used herein to describe various elements, these elements should not be limited by these terms. These terms are only used to partition one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. The terms "first," "second," and the like may be used to distinguish components from each other, but the functions or structures of the components are not limited by ordinal numbers or component names in front of the components.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

The terms "first horizontal axis direction," "second horizontal axis direction," and "vertical axis direction" should not be interpreted only based on a geometrical relationship in which the respective directions are perpendicular to each other, and may be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

Features of various embodiments of the present disclosure may be partially or wholly coupled to or combined with each other, and may be variously inter-operated, linked or driven together. The embodiments of the present disclosure may be carried out independently from each other, or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The apparatus according to embodiments the present disclosure may include a display apparatus such as an organic light emitting display (OLED) module or a liquid crystal module (LCM) including a display panel and a driver for driving the display panel. Also, the apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the apparatus may include a display apparatus itself, such as an LCM or an OLED module, and a set device which is a final consumer device or an application product including the LCM or the OLED module.

In some embodiments, an LCM or an OLED module including a display panel and a driver may be referred to as a display apparatus, and an electronic device which is a final product including an LCM or an OLED module may be referred to as a set device. For example, the display apparatus may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to an embodiment of the present disclosure may use all types of display panels such as a liquid crystal display panel, an organic light emitting diode (OLED) display panel, and an electroluminescent display panel, but is not limited to a specific display panel which is vibrated by a sound generating apparatus according to an embodiment of the present disclosure to output a sound. Also, a shape or a size of a display panel applied to a display apparatus according to an embodiment of the present disclosure is not limited.

For example, when the display panel is a liquid crystal display panel, the display panel may include a plurality of gate lines, a plurality of data lines, and a plurality of pixels provided in a plurality of intersection areas defined by the gate lines and the data lines. Also, the display panel may include an array substrate which includes a thin film transistor (TFT) which is a switching element for adjusting a light transmittance of each pixel, an upper substrate which includes a color filter and/or a black matrix, and a liquid crystal layer which is formed between the array substrate and the upper substrate.

When the display panel is an organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on the display panel. However, an embodiment of the present disclosure is not limited to the metal plate, and the display panel may include another structure (for example, another structure including another material).

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure are described in detail with reference to the accompanying drawings. With respect to reference numerals to elements of each of the drawings, although the same elements may be illustrated in other drawings, like reference numerals may refer to like elements unless stated otherwise. In addition, for convenience of description, a scale, dimension, size, and thickness of each of the elements illustrated in the accompanying drawings may differ from an actual scale, dimension, size, and thickness, and thus, embodiments of the present disclosure are not limited to a scale, dimension, size, and thickness illustrated in the drawings.

Figure 2:
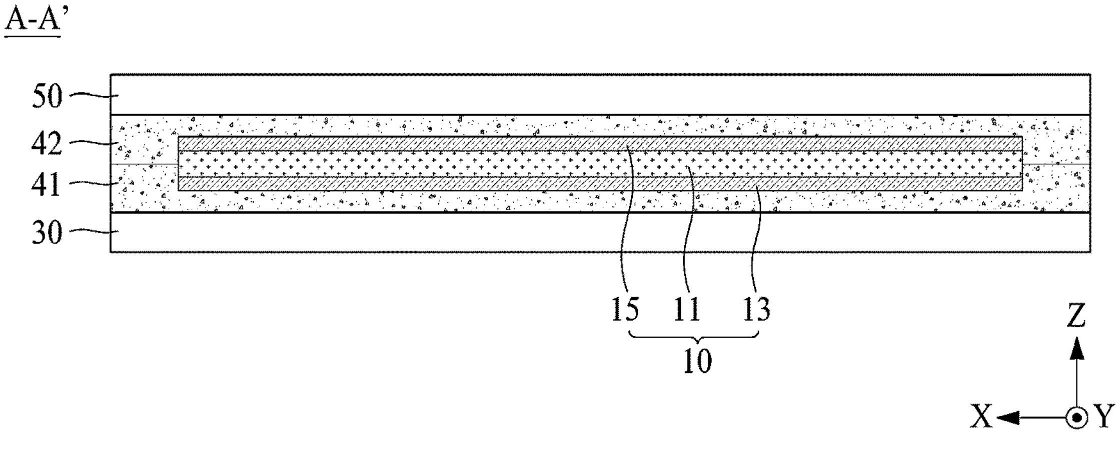
FIG. 2 is a cross-sectional view taken along line A-A' illustrated in FIG. 1.

FIG. 1 illustrates a vibration apparatus according to an embodiment of the present disclosure, and FIG. 2 is a cross-sectional view taken along line A-A' illustrated in FIG. 1.

Referring to FIGS. 1 and 2, the vibration apparatus 1 according to an embodiment of the present disclosure may be referred to as a flexible vibration structure material, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film piezoelectric speaker, or a film type piezoelectric composite speaker, but the terms are not limited thereto.

The vibration apparatus 1 according to an embodiment of the present disclosure may include a vibration portion 10, a first protection member 30, and a second protection member 50.

The vibration portion 10 may include a vibration layer 11, a first electrode layer 13, and a second electrode layer 15.

The vibration layer 11 may include a piezoelectric material (or an electroactive material) having a piezoelectric effect. For example, the piezoelectric material may have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. The vibration layer 11 may include a ceramic-based material for implementing a relatively high vibration, or may include a piezoelectric ceramic having a perovskite-based crystalline structure. For example, the vibration layer 11 may be referred to as the terms such as a vibration layer, a piezoelectric layer, a piezoelectric material layer, an electroactive layer, a vibration portion, a piezoelectric material portion, an electroactive portion, a piezoelectric structure material, a piezoelectric composite layer, a piezoelectric composite, or a piezoelectric ceramic composite, but the terms are not limited thereto.

The vibration layer 11 may include a ceramic-based material for implementing a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, the chemical formula "$ABO_3$" may include one or more of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization, and a piezoelectric effect may be generated based on the variation of the polarization. In a perovskite crystalline structure including $PbTiO_3$, a position of a Ti ion corresponding to a center ion may be changed to vary polarization, and thus, a piezoelectric effect may be generated. For example, in the perovskite crystalline structure, a cubic shape having a symmetric structure may be changed to a tetragonal shape, an orthorhombic shape, and a rhombohedral shape each having an unsymmetric structure by an external stress or a magnetic field, and thus, a piezoelectric effect may be generated. Polarization may be high at a morphotropic phase boundary (MPB) of a tetragonal structure and a rhombohedral structure, and polarization may be easily realigned, thereby obtaining a high piezoelectric characteristic.

The vibration layer 11 according to another embodiment of the present disclosure may include one or more materials among lead (Pb), zirconium (Zr), titanium (Ti), zinc (Zn), nickel (Ni), and niobium (Nb), but embodiments of the present disclosure are not limited thereto.

The vibration layer 11 according to another embodiment of the present disclosure may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. Also, the vibration layer 11 may include at least one or more among calcium titanate ($CaTiO_3$), $BaTiO_3$, and $SrTiO_3$, each without Pb, but embodiments of the present disclosure are not limited thereto.

The first electrode layer 13 may be disposed at first surfaces (or lower surfaces) of the vibration layer 11. The first electrode layer 13 may have the same size as that of each of the vibration layer 11, or may have a size which is less than that of each of the vibration layer 11. For example, the first electrode layer 13 may be formed on the whole first surfaces, except edge portions, of the vibration layer 11. For example, the first electrode layer 13 may substantially have the same shape as that of each of the vibration layer 11, but embodiments of the present disclosure are not limited thereto.

The second electrode layer 15 may be disposed at second surfaces (or upper surfaces), which differ from or are opposite to the first surfaces, of the vibration layer 11. The second electrode layer 15 may have the same size as that of each of the vibration layer 11, or may have a size which is less than that of each of the vibration layer 11. For example, the second electrode layer 15 may be formed on the whole second surfaces, except the edge portions, of the vibration layer 11. For example, the second electrode layer 15 may have substantially the same shape as that of each of the vibration layer 11, but embodiments of the present disclosure are not limited thereto.

Each of the first electrode layer 13 and the second electrode layer 15 according to an embodiment of the present disclosure may include carbon, but embodiments of the present disclosure are not limited thereto. For example, the carbon may be a carbon material including graphite, carbon black, ketjen black, and carbon nanotube, but embodiments of the present disclosure are not limited thereto. For example, one or more of the first electrode layer 13 and the second electrode layer 15 may include a transparent conductive material, a semitransparent conductive material, or an opaque conductive material. For example, the transparent or semitransparent conductive material may include indium tin oxide (ITO) or indium zinc oxide (IZO), but embodiments of the present disclosure are not limited thereto. The opaque conductive material may include gold (Au), silver (Ag), platinum (Pt), palladium (Pd), molybdenum (Mo), magnesium (Mg), or glass frit-containing Ag, or an alloy thereof, but embodiments of the present disclosure are not limited thereto. According to another embodiment of the present disclosure, each of the first electrode layer 13 and the second electrode layer 15 may include Ag having low resistivity, so as to enhance an electrical characteristic and/or a vibration characteristic of each of the vibration layer 11. For example, carbon may be a carbon material including graphite, carbon black, ketjen black, and carbon nanotube.

The first protection member 30 may be disposed at a first surface of the vibration portion 10. For example, the first protection member 30 may be in the first electrode layer 13.

For example, the first protection member 30 may be at the first electrode layer 13. For example, the first protection member 30 may be configured to cover the first electrode layer 13 disposed on the first surface of the vibration layer 11. Accordingly, the first protection member 30 may protect the first surface of the vibration portion 10 or the first electrode layer 13.

The second protection member 50 may be disposed at a second surface of the vibration portion 10. For example, the second protection member 50 may be in the second electrode layer 15. For example, the second protection member 50 may be on the second electrode layer 15. For example, the second protection member 50 may be configured to cover the second electrode layer 15 disposed at the second surface of the vibration layer 11. Accordingly, the second protection member 50 may protect the second surface of the vibration portion 10 or the second electrode layer 15.

Each of the first protection member 30 and the second protection member 50 according to an embodiment of the present disclosure may include one or more materials of plastic, metal, fiber, cloth, paper, leather, and wood, but embodiments of the present disclosure are not limited thereto. For example, each of the first protection member 30 and the second protection member 50 may include the same material or different materials. For example, each of the first protection member 30 and the second protection member 50 may be a polyimide film or a polyethylene terephthalate film, but embodiments of the present disclosure are not limited thereto.

One or more of the first protection member 30 and the second protection member 50 according to an embodiment of the present disclosure may include an adhesive member. For example, one or more of the first protection member 30 and the second protection member 50 may include an adhesive member coupled to or attached on the vibration portion 10 and a protection member (or a striping member) which covers or protects the adhesive member. For example, the adhesive member may include an electrical insulation material which has adhesive properties and is capable of compression and decompression. For example, the first protection member 30 may include an adhesive member coupled to or attached on the vibration portion 10 and a protection member (or a striping member) which covers or protects the adhesive member.

The first protection member 30 may be disposed at the first surface of the vibration portion 10 by the first adhesive layer 41. For example, the first protection member 30 may be connected or coupled to the first electrode layer 13 by the first adhesive layer 41. For example, the first protection member 30 may be disposed at the first surface of the vibration portion 10 or the first electrode layer 13 by a film laminating process using the first adhesive layer 41. For example, the first protection member 30 may be disposed at the first surface of the vibration portion 10 or the first electrode layer 13 by a thermal bonding (or heat bonding) process using the first adhesive layer 41. Accordingly, the vibration portion 10 may be integrated (or disposed) into and connected or coupled to the first protection member 30.

The second protection member 50 may be disposed at the second surface of the vibration portion 10 by the second adhesive layer 42. For example, the second protection member 50 may be connected or coupled to the second electrode layer 15 by the second adhesive layer 42. For example, the second protection member 50 may be disposed at the second surface of the vibration portion 10 or the second electrode layer 15 by a film laminating process using the second adhesive layer 42. For example, the second protection member 50 may be disposed at the second surface of the vibration portion 10 or the second electrode layer 15 by a thermal bonding (or heat bonding) process using the second adhesive layer 42. Accordingly, the vibration portion 10 may be integrated (or disposed) into and connected or coupled to the second protection member 50.

According to another embodiment of the present disclosure, the vibration layer 11 may include a piezoelectric material including no lead. For example, the vibration layer 11 may include potassium sodium niobate KNN ((K, Na)$NbO_3$). Sodium (K) and potassium (Na) of KNN may be materials which are large in deliquescence, and thus, may be more vulnerable to water than a piezoelectric material including lead. For example, the protection members 30 and 50 may include polyethylene naphthalate. Accordingly, a protection member which is good in water vapor transmission rate may be provided, thereby preventing the penetration of water from the outside.

Each of the first adhesive layer 41 and the second adhesive layer 42 according to an embodiment of the present disclosure may include an electrical insulation material which has adhesive properties and is capable of compression and decompression. For example, the first adhesive layer 41 may be disposed between the first protection member 30 and the first electrode layer 13. For example, the second adhesive layer 42 may be disposed between the second protection member 50 and the second electrode layer 15. The first adhesive layer 41 and the second adhesive layer 42 may surround all of the vibration portion 10. For example, the first adhesive layer 41 and the second adhesive layer 42 may fully surround all of the vibration portion 10. For example, the first adhesive layer 41 and the second adhesive layer 42 may contact or directly contact the vibration portion 10. Each of the first adhesive layer 41 and the second adhesive layer 42 may be disposed between the first protection member 30 and the second protection member 50 to surround the vibration layer 11, the first electrode layer 13, and the second electrode layer 15. For example, each of the first adhesive layer 41 and the second adhesive layer 42 may be disposed between the first protection member 30 and the second protection member 50 to fully surround the vibration layer 11, the first electrode layer 13, and the second electrode layer 15. For example, the vibration layer 11, the first electrode layer 13, and the second electrode layer 15 may be buried or embedded between the first adhesive layer 41 and the second adhesive layer 42. For convenience of description, the first adhesive layer 41 and the second adhesive layer 42 are illustrated, or are not limited thereto and may be provided as one adhesive layer.

Each of the first adhesive layer 41 and the second adhesive layer 42 according to an embodiment of the present disclosure may include epoxy resin, acrylic resin, silicone resin, or urethane resin, but embodiments of the present disclosure are not limited thereto.

Each of the first adhesive layer 41 and the second adhesive layer 42 according to an embodiment of the present disclosure may include one or more of a thermal curable adhesive, an ultraviolet (UV)-curable adhesive, and a natural curable adhesive. For example, each of the first adhesive layer 41 and the second adhesive layer 42 may include a thermal bonding adhesive (or a hot-melt adhesive). The thermal bonding adhesive may be a thermal active type or a thermal curable type. For example, the first adhesive layer 41 including the thermal bonding adhesive may connect or couple the first protection member 30 to the first surface of the vibration portion 10 or the first electrode layer 13 by heat and pressure. For example, the first adhesive layer 41 including the thermal bonding adhesive may connect or couple the first protection member 30 to the first surface of the vibration portion 10 or the first electrode layer 13 by heat. For example, the second adhesive layer 42 including the thermal bonding adhesive may connect or couple the second protection member 50 to the second surface of the vibration portion 10 or the second electrode layer 15 by heat and pressure. For example, the second adhesive layer 42 including the thermal bonding adhesive may connect or couple the second protection member 50 to the second surface of the vibration portion 10 or the second electrode layer 15 by heat.

Figure 3:
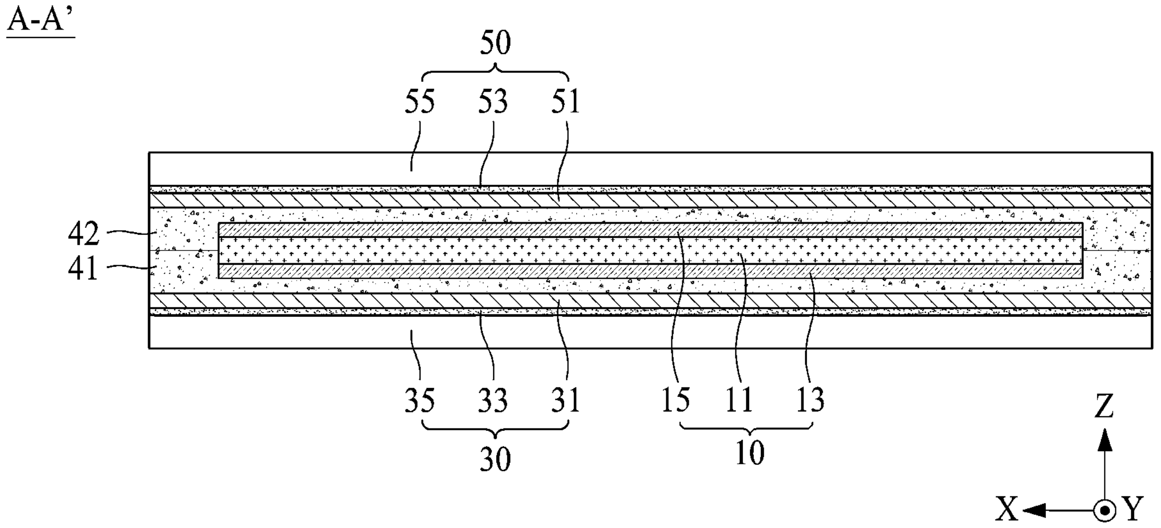
FIG. 3 is another cross-sectional view taken along line A-A' illustrated in FIG. 1.

FIG. 3 is another cross-sectional view taken along line A-A' illustrated in FIG. 1.

Referring to FIG. 3, a vibration apparatus 1 according to another embodiment of the present disclosure may include a vibration portion 10, a first protection member 30, and a second protection member 50.

The vibration portion 10 may include a vibration layer 11, a first electrode layer 13, and a second electrode layer 15. The vibration portion 10 may be substantially the same as descriptions given above with reference to FIGS. 1 and 2, and thus, a description thereof is omitted.

The first protection member 30 according to an embodiment of the present disclosure may be disposed at a first surface of the vibration portion 10 and may include two or more layers. One of the two or more layers may include an organic material.

The first protection member 30 may include the first layer 31, the second layer 35, and the third layer 33.

The first layer 31 of the first protection member 30 may be disposed at a first surface of a vibration portion 10 by a first adhesive layer 41. For example, the first layer 31 may be disposed at the first electrode layer 13 by the first adhesive layer 41. For example, the first layer 31 may be configured to cover the first electrode layer 13 disposed at a first surface of a vibration layer 11 by the first adhesive layer 41.

The first layer 31 of the first protection member 30 according to another embodiment of the present disclosure may include a metal material. The first layer 31 may include a metal material which is good in moisture resistance. For example, the first layer 31 may include a metal material such as aluminum (Al), copper (Cu), stainless steel (SUS), iridium (Ir), tungsten (W), molybdenum (Mo), nitride aluminum (AlN), or oxide tantalum (TaOx) or may include a material including an alloy thereof, but embodiments of the present disclosure are not limited thereto. For example, a thickness of the first layer 31 may be 10 μM or more, but embodiments of the present disclosure are not limited thereto. For example, when a thickness of the first layer 31 is 10 μM or more, the occurrence of a pin hole and/or a crack may be prevented in a process of forming the first layer 31.

The first layer 31 may prevent water from flowing into the vibration portion 10, the first electrode layer 13, or the vibration layer 11 or may decrease a water vapor transmission rate, thereby improving the reliability of the vibration apparatus 1 under an environment condition where a temperature and humidity are high. For example, when water flows into the vibration apparatus 1, water ($H_2O$) may be dissolved in the first electrode layer 13 to generate hydrogen ($H_2$) and water ion ($H^+$), and the vibration layer 11 may be degenerated and reduced in performance due to an internal reaction through a pore of the vibration layer 11. Therefore, in another embodiment of the present disclosure, the first layer 31 including a metal material which is good in moisture resistance may be added to a first protection member 30 which protects the vibration portion 10, and thus, may prevent penetration of water or may decrease a water vapor transmission rate, thereby improving the reliability of the vibration apparatus 1 under an environment condition where a temperature and humidity are high. For example, the first layer 31 may be referred to as other terms such as a barrier layer, a metal layer, a thin film metal layer, a thin film metal film, or a metal thin film, but embodiments of the present disclosure are not limited thereto.

The second layer 35 of the first protection member 30 may be a base film or a base layer of the first protection member 30. The second layer 35 may be coupled to or attached on the first layer 31 by the third layer 33. The second layer 35 may include one or more materials of plastic, metal, fiber, cloth, paper, leather, and wood, but embodiments of the present disclosure are not limited thereto. For example, the second layer 35 may be a polyimide film or a polyethylene terephthalate film, but embodiments of the present disclosure are not limited thereto.

For example, the first layer 31 may be between the vibration portion 10 and the second layer 35 which is a base layer. For example, a size of the first layer 31 may be less than or equal to that of the second layer 35 which is a base layer.

According to an embodiment of the present disclosure, the first layer 31 may be between the first adhesive layer 41 and the second layer 35 which is an organic material of the first protection member 30.

For example, when the second layer 35 is disposed closer to the vibration portion 10 than the first layer 31, the penetration of water from the outside may be better prevented by the first layer 31. When another layer is disposed at the first layer 31, an adverse effect of an external impact on the first layer 31 and/or oxidation of the first layer 31 may be prevented by the other layer. For example, the first layer 31 may be disposed closer to the vibration portion 10 or the vibration layer 11 than the second layer 35, and thus, a variation of a volume caused by absorption of water by the second layer 35 may be reduced by the first layer 31 and/or the third layer 33, thereby protecting the vibration portion 10 from an external impact.

The third layer 33 of the first protection member 30 may be disposed at a first surface of the first layer 31. For example, the third layer 33 may be disposed between the first layer 31 and the second layer 35 of the first protection member 30. The third layer 33 may be an adhesive for connecting or coupling the first layer 31 to the second layer 35. The third layer 33 may include epoxy resin, acrylic resin, silicone resin, or urethane resin, but embodiments of the present disclosure are not limited thereto.

The third layer 33 according to another embodiment of the present disclosure may include one or more of a thermal curable adhesive, a UV-curable adhesive, and a thermal bonding adhesive. For example, the third layer 33 may include the thermal bonding adhesive. The thermal bonding adhesive may be a thermal active type or a thermal curable type. For example, the third layer 33 including the thermal bonding adhesive may connect or couple the first layer 31 to the second layer 35 by heat and pressure. For example, the third layer 33 including the thermal bonding adhesive may connect or couple the first layer 31 to the second layer 35 by heat.

The first layer 31, the second layer 35, and the third layer 33 of the first protection member 30 may be connected or coupled to one another by the third layer 33. For example, the first layer 31 and the second layer 35 may be provided as one body and may be connected or coupled to each other through a film laminating process using the third layer 33. For example, the first layer 31 and the third layer 33 may be provided as one body and may be connected or coupled to each other through a thermal bonding process using the second layer 35.

The second protection member 50 according to an embodiment of the present disclosure may be disposed at a second surface, which differs from the first surface, of the vibration portion 10 and may include two or more layers. One of the two or more layers may include an organic material.

The second protection member 50 may include the first layer 51, the second layer 55, and the third layer 53.

The first layer 51 of the second protection member 50 may be disposed at a second surface of a vibration portion 10 by a second adhesive layer 42. For example, the first layer 51 may be disposed at the second electrode layer 15 by the second adhesive layer 42. For example, the first layer 51 may be configured to cover the second electrode layer 15 disposed at a second surface of a vibration layer 11 by the second adhesive layer 42.

The first layer 51 of the second protection member 50 according to another embodiment of the present disclosure may include a metal material. The first layer 51 may include a metal material which is good in moisture resistance. For example, the first layer 51 may include a metal material such as aluminum (Al), copper (Cu), stainless steel (SUS), iridium (Ir), tungsten (W), molybdenum (Mo), nitride aluminum (AlN), or oxide tantalum (TaOx) or may include a material including an alloy thereof, but embodiments of the present disclosure are not limited thereto. For example, a thickness of the first layer 51 may be 10 μM or more, but embodiments of the present disclosure are not limited thereto. For example, when a thickness of the first layer 51 is 10 μM or more, the occurrence of a pin hole and/or a crack may be prevented in a process of forming the first layer 51.

The first layer 51 may prevent water from flowing into the vibration portion 10, the second electrode layer 15, or the vibration layer 11 or may decrease a water vapor transmission rate, thereby improving the reliability of the vibration apparatus 1 under an environment condition where a temperature and humidity are high. For example, when water flows into the vibration apparatus 1, water ($H_2O$) may be dissolved in the second electrode layer 15 to generate hydrogen ($H_2$) and water ion ($H^+$), and the vibration layer 11 may be degenerated and reduced in performance due to an internal reaction through a pore of the vibration layer 11. Therefore, in another embodiment of the present disclosure, the first layer 51 including a metal material which is good in moisture resistance may be added to a second protection member 50 which protects the vibration portion 10, and thus, may prevent penetration of water or may decrease a water vapor transmission rate, thereby improving the reliability of the vibration apparatus 1 under an environment condition where a temperature and humidity are high. For example, the first layer 51 may be referred to as other terms such as a barrier layer, a metal layer, a thin film metal layer, a thin film metal film, or a metal thin film, but embodiments of the present disclosure are not limited thereto.

The second layer 55 of the second protection member 50 may be coupled to or attached on the first layer 51 by the third layer 53. The second layer 55 may include one or more materials of plastic, metal, fiber, cloth, paper, leather, and wood, but embodiments of the present disclosure are not limited thereto. For example, the second layer 55 may be a polyimide film or a polyethylene terephthalate film, but embodiments of the present disclosure are not limited thereto.

For example, the first layer 51 may be between the vibration portion 10 and the second layer 55 which is a base layer. For example, a size of the first layer 51 may be less than or equal to that of the second layer 55 which is a base layer.

According to an embodiment of the present disclosure, the first layer 51 may be between the second adhesive layer 42 and the second layer 55 which is an organic material of the second protection member 50.

For example, when the second layer 55 is disposed closer to the vibration portion 10 than the first layer 51, the penetration of water from the outside may be better prevented by the first layer 51. When another layer is disposed at the first layer 51, an adverse effect of an external impact on the first layer 51 and/or oxidation of the first layer 51 may be prevented by the other layer. For example, the first layer 51 may be disposed closer to the vibration portion 10 or the vibration layer 11 than the second layer 55, and thus, a variation of a volume caused by absorption of water by the second layer 55 may be reduced by the first layer 51 and/or the third layer 53, thereby protecting the vibration portion 10 from an external impact.

The third layer 53 of the second protection member 50 may be disposed at a first surface of the first layer 51. For example, the third layer 53 may be disposed between the first layer 51 and the second layer 55 of the second protection member 50. The third layer 53 may be an adhesive for connecting or coupling the first layer 51 to the second layer 55. The third layer 53 may include epoxy resin, acrylic resin, silicone resin, or urethane resin, but embodiments of the present disclosure are not limited thereto.

The third layer 53 according to another embodiment of the present disclosure may include one or more of a thermal curable adhesive, a UV-curable adhesive, and a thermal bonding adhesive. For example, the third layer 53 may include the thermal bonding adhesive. The thermal bonding adhesive may be a thermal active type or a thermal curable type. For example, the third layer 53 including the thermal bonding adhesive may connect or couple the first layer 51 to the second layer 55 by heat and pressure. For example, the third layer 53 including the thermal bonding adhesive may connect or couple the first layer 51 to the second layer 55 by heat.

The first layer 51, the second layer 55, and the third layer 53 of the second protection member 50 may be connected or coupled to one another by the third layer 53. For example, the first layer 51 and the second layer 55 may be provided as one body and may be connected or coupled to each other through a film laminating process using the third layer 53. For example, the first layer 51 and the second layer 55 may be provided as one body and may be connected or coupled to each other through a thermal bonding process using the third layer 53.

According to another embodiment of the present disclosure, the first layer 31 of the first protection member 30 and the first layer 51 of the second protection member 50 may include the same material. According to another embodiment of the present disclosure, the first layer 31 of the first protection member 30 and the first layer 51 of the second protection member 50 may include different materials.

According to another embodiment of the present disclosure, the first protection member 30 and the second protection member 50 may further include the first layer 31 and the first layer 51 including a metal material which is good in moisture resistance, respectively, and thus, may prevent the penetration of water from the outside and may decrease a water vapor transmission rate, thereby improving the reliability of the vibration apparatus 1 under an environment condition where a temperature and humidity are high.

Figure 4:
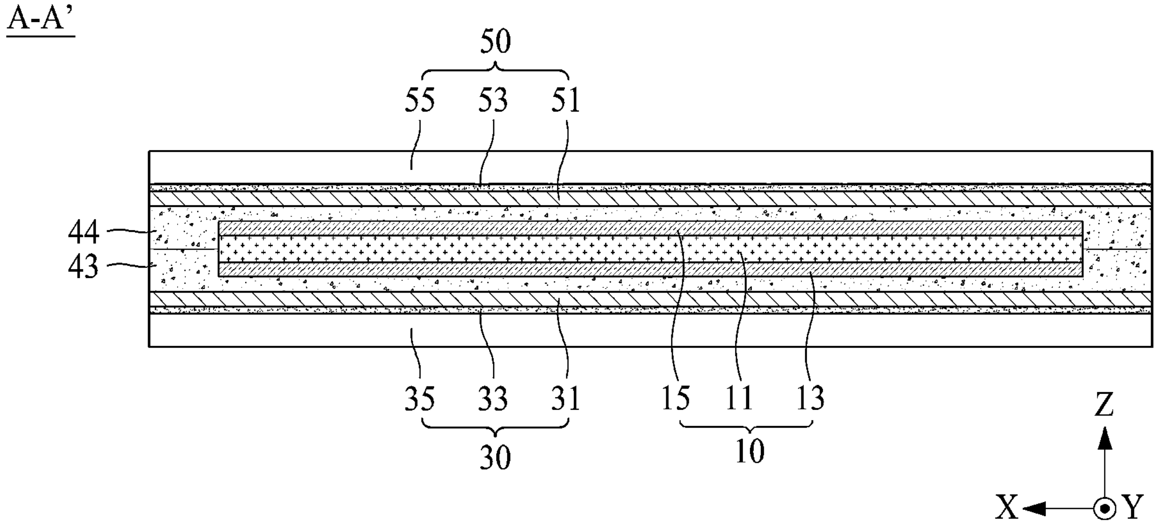
FIG. 4 is another cross-sectional view taken along line A-A' illustrated in FIG. 1.

FIG. 4 is another cross-sectional view taken along line A-A' illustrated in FIG. 1.

Referring to FIG. 4, a vibration apparatus 1 according to another embodiment of the present disclosure may include a vibration portion 10, a first protection member 30, a second protection member 50, a first adhesive layer 43, and a second adhesive layer 44.

The vibration portion 10 may include a vibration layer 11, a first electrode layer 13, and a second electrode layer 15. The vibration portion 10 may be substantially the same as descriptions given above with reference to FIGS. 1 and 2, and thus, a description thereof is omitted.

The first protection member 30 according to another embodiment of the present disclosure may include a first layer 31, a second layer 35, and a third layer 33. The second protection member 50 may include a first layer 51, a second layer 55, and a third layer 53. The first adhesive layer 43 and the second adhesive layer 44 may be between the vibration portion 10 and each of the first protection member 30 and the second protection member 50.

The first protection member 30 may include a first layer 31 including a metal material, a second layer 35 which is a base film or a base layer, and a third layer 33 including an adhesive.

The second protection member 50 may include a first layer 51 including a metal material, a second layer 55 which is a base film or a base layer, and a third layer 53 including an adhesive. For example, each of the first protection member 30 and the second protection member 50 may include a base layer. The base layers of the first protection member 30 and the second protection member 50 may be the second layers 35 and 55.

The first protection member 30 and the second protection member 50 may be substantially the same as the first protection member 30 and the second protection member 50 described above with reference to FIG. 3, respectively, and thus, repetitive descriptions thereof may be omitted or will be briefly given below.

Each of the first adhesive layer 43 and the second adhesive layer 44 according to another embodiment of the present disclosure may include an electrical insulation material which has adhesive properties and is capable of compression and decompression. For example, the first adhesive layer 43 may be disposed between the first protection member 30 and the first electrode layer 13. For example, the second adhesive layer 44 may be disposed between the second protection member 50 and the second electrode layer 15. The first adhesive layer 43 and the second adhesive layer 44 may surround all of the vibration portion 10. For example, the first adhesive layer 43 and the second adhesive layer 44 may fully surround all of the vibration portion 10. For example, the first adhesive layer 43 and the second adhesive layer 44 may contact or directly contact the vibration portion 10. Each of the first adhesive layer 43 and the second adhesive layer 44 may be disposed between the first protection member 30 and the second protection member 50 to surround the vibration layer 11, the first electrode layer 13, and the second electrode layer 15. For example, each of the first adhesive layer 43 and the second adhesive layer 44 may be disposed between the first protection member 30 and the second protection member 50 to fully surround the vibration layer 11, the first electrode layer 13, and the second electrode layer 15. For example, the vibration layer 11, the first electrode layer 13, and the second electrode layer 15 may be buried or embedded between the first adhesive layer 43 and the second adhesive layer 44. For convenience of description, the first adhesive layer 43 and the second adhesive layer 44 are illustrated, or are not limited thereto and may be provided as one adhesive layer.

Each of the first adhesive layer 43 and the second adhesive layer 44 according to another embodiment of the present disclosure may include a filler member. For example, each of the first adhesive layer 43 and the second adhesive layer 44 may include a pressure sensitive adhesive (PSA), an optically clear adhesive (OCA), or an optically clear resin (OCR), but embodiments of the present disclosure are not limited thereto. Each of the first adhesive layer 43 and the second adhesive layer 44 may include the filler member including the material. For example, the filler member may include a filler material including one or more oxide, carbide, nitride, and oxynitride. For example, the filler material may include at least one of aluminum oxide, indium oxide, magnesium oxide, niobium oxide, silicone oxide, tantalum oxide, tin oxide, titanium oxide, zinc oxide, zirconium oxide, boron carbide, silicone carbide, tungsten carbide, aluminum nitride, boron nitride, silicone oxynitride, aluminum oxynitride, boron oxynitride, silicone oxynitride, zirconium oxybride, and titanium oxybride, or a combination thereof, but embodiments of the present disclosure are not limited thereto. For example, the filler member may include a shape such as a spherical shape, a rod shape, or an eccentric shape, but embodiments of the present disclosure are not limited thereto. The rod shape may be a rod shape where a ratio of a width to a length is 1:1 to 1:10000. A content ratio of the filler member may be a volume ratio and may be included by 50% or less. For example, because a modulus increases as a content ratio of the filler member increases, each of the first adhesive layer 43 and the second adhesive layer 44 may enhance a sound pressure level, but because a problem where an adhesive force is reduced occurs when the filler member reaches a certain content ratio or more, a content ratio of the filler member may be adjusted to 50% or less of a volume ratio.

According to another embodiment of the present disclosure, each of the first adhesive layer 43 and the second adhesive layer 44 further includes the filler member so that the loss of a sound pressure level characteristic caused by the first layers 31 and 51 which are respectively included in the first protection member 30 and the second protection member 50 and have stiffness may be reduced, and thus, environment reliability may be improved and a sound pressure level characteristic may be enhanced.

Figure 5:
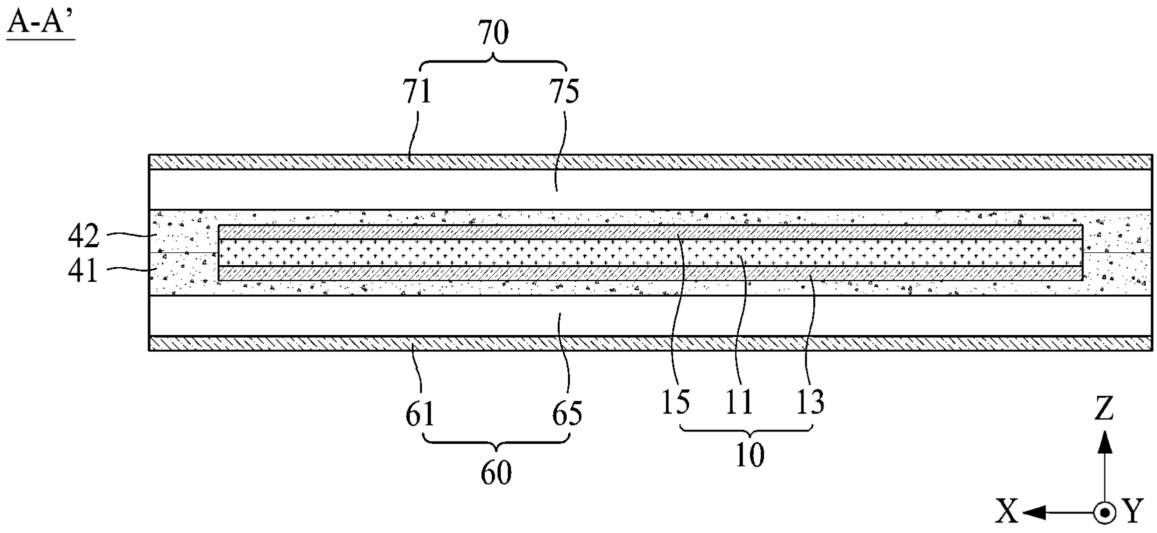
FIG. 5 is another cross-sectional view taken along line A-A' illustrated in FIG. 1.

FIG. 5 is another cross-sectional view taken along line A-A' illustrated in FIG. 1.

Referring to FIG. 5, a vibration apparatus 1 according to another embodiment of the present disclosure may include a vibration portion 10, a first protection member 60, and a second protection member 70.

The vibration portion 10 may include a vibration layer 11, a first electrode layer 13, and a second electrode layer 15. The vibration portion 10 may be substantially the same as descriptions given above with reference to FIGS. 1 and 2, and thus, a description thereof is omitted.

The first protection member 60 according to another embodiment of the present disclosure may be disposed at a first surface of the vibration portion 10 and may include two or more layers. One of the two or more layers may include an organic material.

The first protection member 60 according to another embodiment of the present disclosure may include a first layer 61 and a second layer 65.

For example, the second layer 65 may be a base layer. For example, the second layer 65 which is a base layer may be between the vibration portion 10 and the first layer 61.

For example, the first layer 61 of the first protection member 60 may be adjacent to the second layer 65, which is an organic material, of two or more layers. The first layer 61 of the first protection member 60 may include an inorganic material. For example, the first layer 61 may include one or more of single compounds such as silicone oxide (SiOx), oxide silicone ($SiO_2$), zinc oxide (ZnO), aluminum oxide ($Al_2O_3$), magnesium fluoride (MgF), or inorganic compounds such as SAO ($SiO_2$, $Al_2O_3$), SMO ($SiO_2$—MgO), STO ($SiO_2$, $SnO_2$), and SZO ($SiO_2$, ZnO), but embodiments of the present disclosure are not limited thereto. For example, a thickness of the first layer 61 may be 400 nm or more or 1,000 nm or more, but embodiments of the present disclosure are not limited thereto. For example, when a thickness of the first layer 61 is 400 nm or more or 1,000 nm or more, the occurrence of a pin hole and/or a crack may be prevented in a process of forming the second layer 65.

The second layer 65 of the first protection member 60 may include an organic material. For example, the second layer 65 may be a polyimide film or a polyethylene terephthalate film, but embodiments of the present disclosure are not limited thereto.

The second protection member 70 according to another embodiment of the present disclosure may be disposed at a first surface of the vibration portion 10 and may include two or more layers. One of the two or more layers may include an organic material.

The second protection member 70 according to another embodiment of the present disclosure may include a first layer 71 and a second layer 75.

For example, the second layer 75 may be a base layer. For example, the second layer 75 which is a base layer may be between the vibration portion 10 and the first layer 71.

For example, the first layer 71 of the second protection member 70 may be adjacent to the second layer 75, which is an organic material, of two or more layers. The first layer 71 of the second protection member 70 may include an inorganic material. For example, the first layer 71 may include one or more of single compounds such as silicone oxide (SiOx), oxide silicone ($SiO_2$), zinc oxide (ZnO), aluminum oxide ($Al_2O_3$), magnesium fluoride (MgF), or inorganic compounds such as SAO ($SiO_2$, $Al_2O_3$), SMO ($SiO_2$—MgO), STO ($SiO_2$, $SnO_2$), and SZO ($SiO_2$, ZnO), but embodiments of the present disclosure are not limited thereto. For example, a thickness of the first layer 71 may be 400 nm or more or 1,000 nm or more, but embodiments of the present disclosure are not limited thereto. For example, when a thickness of the first layer 71 is 400 nm or more or 1,000 nm or more, the occurrence of a pin hole and/or a crack may be prevented in a process of forming the second layer 75.

The second layer 75 of the second protection member 70 may include an organic material. For example, the second layer 75 may be a polyimide film or a polyethylene terephthalate film, but embodiments of the present disclosure are not limited thereto.

According to another embodiment of the present disclosure, because the first layers 61 and 71 including an inorganic material are respectively provided on the second layers 65 and 75, the penetration of water from the outside may be prevented. For example, when the first layers 61 and 71 are disposed closer to the vibration portion 10 than the second layers 65 and 75, the second layers 65 and 75 may not endure a variation such as volume expansion caused by absorption of water by the first layers 61 and 71, and thus, a crack may occur. Accordingly, according to another embodiment of the present disclosure, because the first layers 61 and 71 including an inorganic material are respectively provided on the second layers 65 and 75 including an organic material, the first layers 61 and 71 may protect the second layers 65 and 75, and thus, may prevent the penetration of water, thereby enhancing the reliability of the vibration apparatus 1.

The first adhesive layer 41 and the second adhesive layer 42 may be between the vibration portion 10 and each of the first protection member 60 and the second protection member 70. The first adhesive layer 41 may be between the first electrode layer 13 and the first protection member 60. The second adhesive layer 42 may be between the second electrode layer 15 and the second protection member 70. For example, an organic material of the first protection member 60 may be adjacent to the first adhesive layer 41. An organic material may be the second layer 65. For example, an organic material of the second protection member 70 may be adjacent to the second adhesive layer 42. An organic material may be the second layer 75.

For example, the first adhesive layer 41 may be between the vibration portion 10 and the second layer 65 which is a base layer of the first protection member 60. For example, the second adhesive layer 42 may be between the vibration portion 10 and the second layer 75 which is a base layer of the second adhesive layer 42. The second layers 65 and 75 which are base layers may be adjacent to one or more of the first electrode layer 13 and the second electrode layer 15 with the first and second adhesive layers 41 and 42 therebetween. The first adhesive layer 41 and the second adhesive layer 42 may be substantially the same as descriptions given above with reference to FIGS. 1 and 2, and thus, detailed descriptions thereof are omitted.

Figure 6:
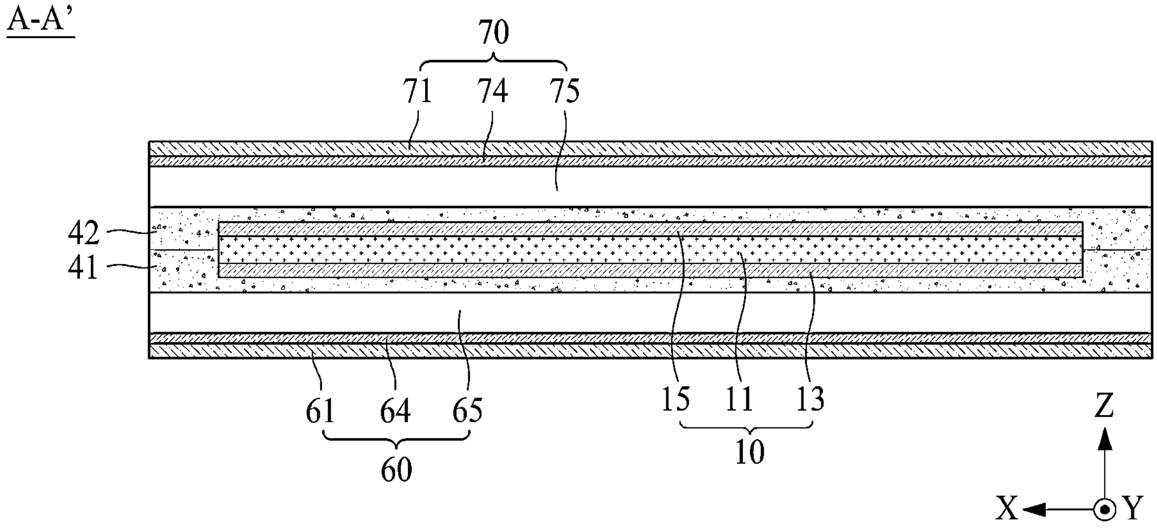
FIG. 6 is another cross-sectional view taken along line A-A' illustrated in FIG. 1.

FIG. 6 is another cross-sectional view taken along line A-A' illustrated in FIG. 1.

Referring to FIG. 6, a vibration apparatus 1 according to another embodiment of the present disclosure may include a vibration portion 10, a first protection member 60, and a second protection member 70.

The vibration portion 10 may include a vibration layer 11, a first electrode layer 13, and a second electrode layer 15. The vibration portion 10 may be substantially the same as descriptions given above with reference to FIGS. 1 and 2, and thus, a description thereof is omitted.

The first protection member 60 according to another embodiment of the present disclosure may include a first layer 61 and a second layer 65. The second protection member 70 may include a first layer 71 and a second layer 75. Descriptions of the first layer 61 and the second layer 65 of the first protection member 60 and the first layer 71 and the second layer 75 of the second protection member 70 may be substantially the same as descriptions given above with reference to FIG. 5, and thus, detailed descriptions thereof are omitted.

The first protection member 60 according to another embodiment of the present disclosure may further include a first secondary layer 64. The second layer 65 may be formed on the first layer 61 through a sputtering process or a chemical vapor deposition (CVD) process. In order to enhance an adhesive force to the first layer 61 in forming a film of the second layer 65, the first secondary layer 64 may be further provided. The first secondary layer 64 may be between the first layer 61 and the second layer 65. For example, the first secondary layer 64 may include silicone nitride (SiNx), but embodiments of the present disclosure are not limited thereto.

The second protection member 70 according to another embodiment of the present disclosure may further include a second secondary layer 74. The second layer 75 may be formed on the first layer 71 through a sputtering process or a CVD process. In order to enhance an adhesive force to the first layer 71 in forming a film of the second layer 75, the second secondary layer 74 may be further provided. The second secondary layer 74 may be between the first layer 71 and the second layer 75. For example, the second secondary layer 74 may include SiNx, but embodiments of the present disclosure are not limited thereto.

According to another embodiment of the present disclosure, because the secondary layers 64 and 74 are further provided between the first layers 61 and 71 and the second layers 65 and 75, an adhesive force between the first layers 61 and 71 and the second layers 65 and 75 may be enhanced.

Figure 7:
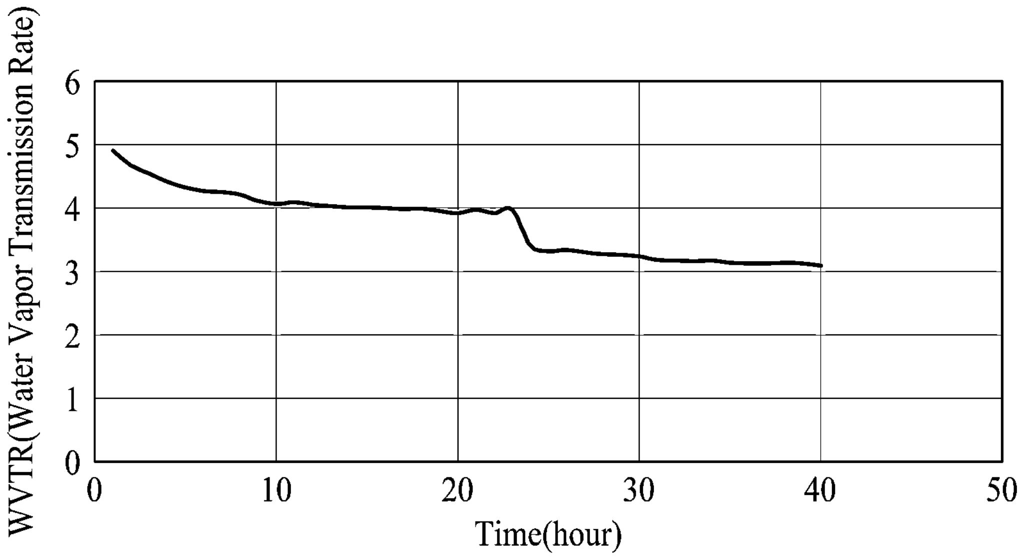
FIG. 7 illustrates a water vapor transmission rate according to an embodiment of the present disclosure.

FIG. 7 illustrates a water vapor transmission rate according to an embodiment of the present disclosure.

FIG. 7 shows a water vapor transmission rate of the protection member of FIG. 2. In FIG. 7, the abscissa axis represents a time, and the ordinate axis represents a water vapor transmission rate. The vibration layer 11 may include a KNN-based piezoelectric material, and the protection members 30 and 50 may include polyethylene naphthalate. The adhesive layers 41 and 42 may include epoxy resin. A thickness of each of the protection members 30 and 50 and the adhesive layers 41 and 42 may be 50 μM and does not limit the descriptions of the present disclosure. For example, a water vapor transmission rate of a protection member may be $1\times10^{0}$ g/m$^{2}$·day or less. For example, when a thickness of polyethylene naphthalate of the protection member is adjusted to 50 μM or more and a water vapor transmission rate is set to $1\times10^{0}$ g/m$^{2}$·day or less, a moisture resistance characteristic of a protection member may be enhanced.

Figure 8:
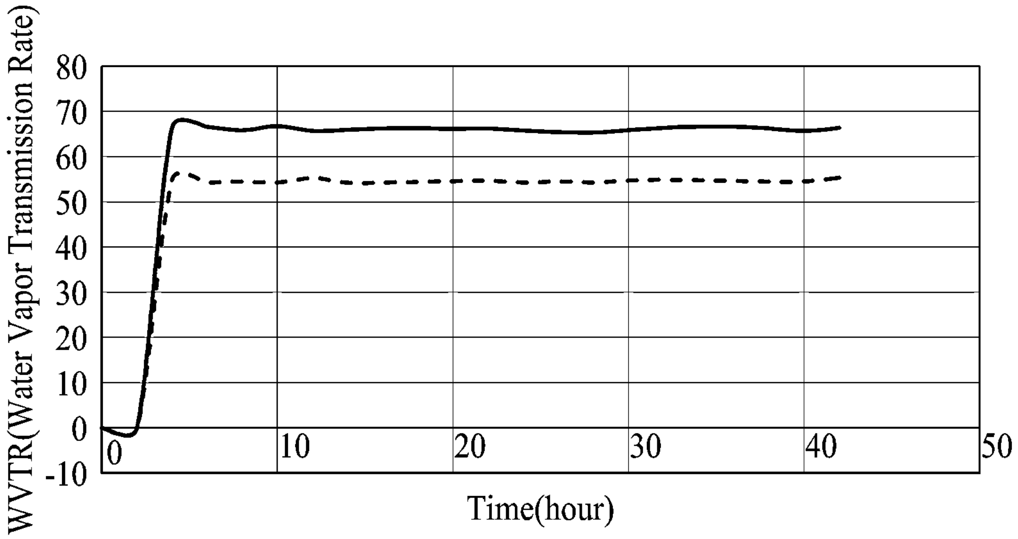
FIG. 8 illustrates a water vapor transmission rate according to an embodiment of the present disclosure.

FIG. 8 illustrates a water vapor transmission rate according to another embodiment of the present disclosure.

FIG. 8 shows a water vapor transmission rate of the protection member of FIG. 5. In FIG. 8, the abscissa axis represents a time, and the ordinate axis represents a water vapor transmission rate. The vibration layer 11 may include a KNN-based piezoelectric material or a lead-free piezoelectric material, and the adhesive layers 41 and 42 may include epoxy resin. In a solid line, a thickness of the first layers 61 and 71 of the protection member is adjusted to 0.7 μM, a thickness of the second layers 65 and 75 is adjusted to 25 μM, and a thickness of the adhesive layers 41 and 42 is adjusted to 25 μM, but the thicknesses do not limit the descriptions of the present disclosure. In a dotted line, a thickness of the first layers 61 and 71 of the protection member is adjusted to 0.7 μM, a thickness of the second layers 65 and 75 is adjusted to 25 μM, and a thickness of the adhesive layers 41 and 42 is adjusted to 50 μM, but the thicknesses do not limit the descriptions of the present disclosure. For example, when a thickness of the first layers 61 and 71 is 0.7 μM and a thickness of the second layers 65 and 75 is 25 μM, a water vapor transmission rate WVTR may be $1\times10^{-1}$ g/m$^{2}$·day. According to another embodiment of the present disclosure, when a thickness of the adhesive layers 41 and 42 is thin, the moisture resistance of a lateral surface may be enhanced.

Figure 9:
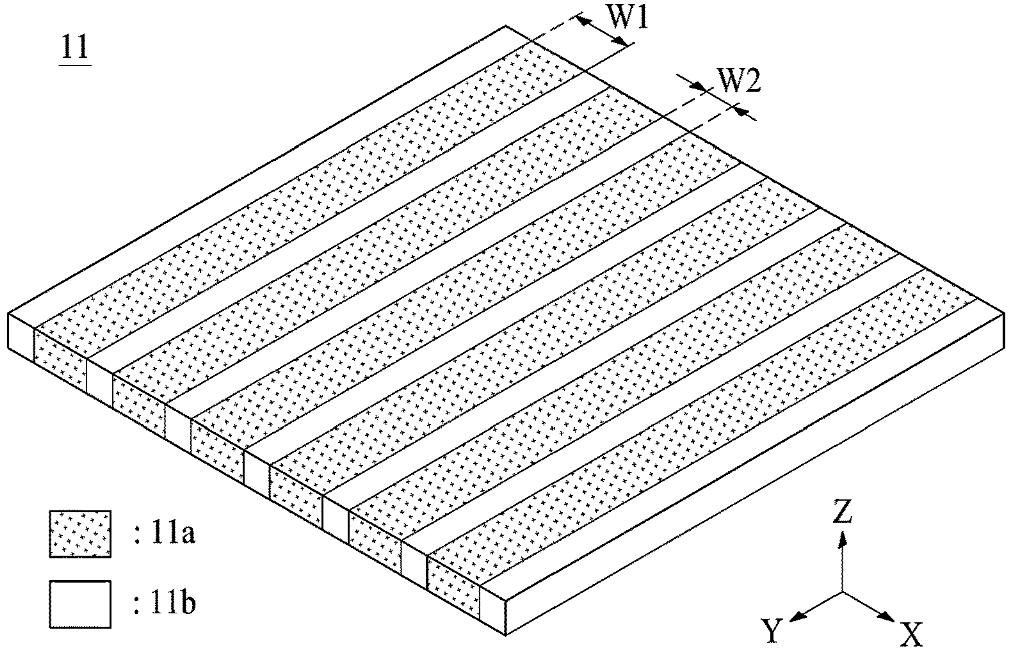
FIG. 9 is a perspective view illustrating a vibration layer of a vibration portion according to an embodiment of the present disclosure.

FIG. 9 is a perspective view illustrating a vibration layer of a vibration portion according to an embodiment of the present disclosure.

Referring to FIG. 9, a vibration layer 11 according to another embodiment of the present disclosure may include a plurality of first portions **11*a* and a plurality of second portions 11*b*. For example, the plurality of first portions 11*a* and the plurality of second portions 11*b* may be alternately and repeatedly arranged in a first direction X (or a second direction Y). For example, the first direction X may be a widthwise direction of the vibration layer 11 and the second direction Y may be a lengthwise direction of the vibration layer 11 intersecting with the first direction X, but embodiments of the present disclosure are not limited thereto and the first direction X may be the lengthwise direction of the vibration layer 11 and the second direction Y may be the widthwise direction of the vibration layer 11**.

Each of the plurality of first portions **11*a*** may include an inorganic material portion. The inorganic material portion may have piezoelectric characteristic. For example, the inorganic material portion may include a piezoelectric material, a composite piezoelectric material, or an electroactive material having a piezoelectric effect.

Each of the plurality of first portions **11*a* may include a ceramic-based material for implementing a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, the first portions 11*a* may include one or more of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto. For example, each of the plurality of first portions 11*a* may include substantially the same piezoelectric material as that of the vibration layer 11 described above with reference to FIGS. 2 to 8**, and thus, like reference numerals refer to like elements and their repeated descriptions are omitted.

Each of the plurality of first portions **11*a* according to an embodiment of the present disclosure may be disposed between the plurality of second portions 11*b*, have a first width W1 parallel to the first direction X (or the second direction Y), and have a length parallel to the second direction Y (or the first direction X). For example, the organic material portion included in the second portion 11*b* may be between the plurality of inorganic material portions included in the first portion 11*a*. Each of the plurality of second portions 11*b* may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 11*a* and the second portion 11*b* may include a line shape or a stripe shape having the same size or different sizes. Accordingly, the vibration layer 11 may have a 2-2 composite structure having a piezoelectric characteristic of a 2-2 vibration mode, and thus, may have a resonance frequency of 20 kHz or less, but embodiments of the present disclosure are not limited thereto. For example, the resonance frequency of the vibration layer 11** may vary based on one or more of a shape, a length, and a thickness thereof.

In the vibration layer 11, the plurality of first portions 11*a* and the plurality of second portions 11*b* may be disposed (or arranged) in parallel on the same plane (or the same layer). Each of the plurality of second portions 11*b* may be configured to fill a gap between two adjacent first portions 11*a*, and thus, may be connected to or attached on an adjacent first portion 11*a*. Accordingly, the vibration layer 11 may extend by a desired size or length based on lateral coupling (or connection) of the first portion 11*a* and the second portion 11*b*.

In the vibration layer 11, the width W2 of each of the plurality of second portions 11*b* may decrease progressively in a direction from a center portion of the vibration layer 11 or the vibration apparatus 1 to both edge portions (or both ends) thereof.

According to an embodiment of the present disclosure, when the vibration layer 11 or the vibration apparatus 1 vibrates in a vertical direction Z (or a thickness direction), a second portion 11*b* having a largest width W2 among the plurality of second portions 11*b* may be disposed at a portion on which a largest stress concentrates. When the vibration layer 11 or the vibration apparatus 1 vibrates in the vertical direction Z, a second portion 11*b* having a smallest width W2 among the plurality of second portions 11*b* may be disposed at a portion where a relatively smallest stress occurs. For example, the second portion 11*b* having the largest width W2 among the plurality of second portions 11*b* may be disposed at a center portion of the vibration layer 11, and the second portion 11*b* having the smallest width W2 among the plurality of second portions 11*b* may be disposed at both edge portions of the vibration layer 11. Accordingly, when the vibration layer 11 or the vibration apparatus 1 vibrates in the vertical direction Z, an overlap of a resonance frequency or interference of a sound wave occurring at a portion on which a largest stress concentrates may be minimized, and thus, dip of a sound pressure level occurring in a low-pitched sound band may be reduced. For example, the flatness of a sound characteristic may be a level of a deviation between a highest sound pressure level and a lowest sound pressure level.

In the vibration layer 11, the plurality of first portions 11*a* may have different sizes (or widths). For example, a size (or a width) of each of the plurality of first portions 11*a* may decrease or increase progressively in a direction from the center portion of the vibration layer 11 or the vibration apparatus 1 to both edge portions (or both ends) thereof. In this case, a sound pressure level characteristic of a sound of the vibration layer 11 may be enhanced by various unique vibration frequencies based on vibrations of the plurality of first portions 11*a* having different sizes, and a reproduction band of a sound may extend.

Each of the plurality of second portions 11*b* may be disposed between the plurality of first portions 11*a*. Therefore, in the vibration layer 11 or the vibration apparatus 1, vibration energy based on a link in a unit lattice of the first portion 11*a* may be increased by the second portion 11*b*, and thus, a vibration characteristic may increase and a piezoelectric characteristic and flexibility may be secured. For example, the second portion 11*b* may include one of an epoxy-based polymer, an acrylic-based polymer, and a silicone-based polymer, but embodiments of the present disclosure are not limited thereto.

Each of the plurality of second portions 11*b* according to an embodiment of the present disclosure may be configured with an organic material portion. For example, the organic material portion may be disposed between two adjacent inorganic material portions, and thus, may absorb an impact applied to the inorganic material portion (or the first portion) and may release a stress concentrating on the inorganic material portion, thereby enhancing the durability of the vibration layer 11 or the vibration apparatus 1 and realizing the flexibility of the vibration layer 11 or the vibration apparatus 1. Accordingly, the vibration apparatus 1 may have flexibility, and thus, may be bent in a shape matching a shape of a curved portion of a supporting member. For example, the vibration apparatus 1 may have flexibility, and thus, may be arranged along a shape of the curved portion of the supporting member or the vibration member.

The second portion 11*b* according to an embodiment of the present disclosure may have a modulus and viscoelasticity that are lower than those of the first portion 11*a*, and thus, the second portion 11*b* may enhance the reliability of the first portion 11*a* vulnerable to an impact due to a fragile characteristic of the first portion 11*a*. For example, the second portion 11*b* may include a material having a loss coefficient of about 0.01 to about 1 and a modulus of about 0.1 GPa to about 10 GPa (GigaPascal).

The organic material portion included in the second portion 11*b* may include an organic material, an organic polymer, an organic piezoelectric material, or an organic non-piezoelectric material having a flexible characteristic compared to the inorganic material portion which is the first portion 11*a*. For example, the second portion 11*b* may be referred to as an adhesive portion, a flexible portion, a bending portion, a damping portion, or a ductile portion, or the like, but embodiments of the present disclosure are not limited thereto.

The plurality of first portions 11*a* and the plurality of second portions 11*b* may be disposed on (or connected to) the same plane, and thus, the vibration layer 11 according to an embodiment of the present disclosure may have a single thin film form. For example, the vibration layer 11 may have a structure where the plurality of first portions 11*a* are connected to one side thereof. For example, the vibration layer 11 may have a structure where the plurality of first portions 11*a* are connected in all of the vibration layer 11. For example, the vibration layer 11 may be vibrated in a vertical direction by the first portion 11*a* having a vibration characteristic and may be bent in a curved shape by the second portion 11*b* having flexibility.

In the vibration layer 11 according to an embodiment of the present disclosure, a size of the first portion 11*a* and a size of the second portion 11*b* may be adjusted based on a piezoelectric characteristic and flexibility needed for the vibration layer 11 or the vibration apparatus 1. For example, in the vibration layer 11 requiring a piezoelectric characteristic rather than flexibility, a size of the first portion 11*a* may be adjusted to be greater than that of the second portion 11*b*. In another embodiment of the present disclosure, in the vibration layer 11 requiring flexibility rather than a piezoelectric characteristic, a size of the second portion 11*b* may be adjusted to be greater than that of the first portion 11*a*. Accordingly, a size of the vibration layer 11 may be adjusted based on a desired characteristic, and thus, the vibration layer 11 may be easily designed.

The first electrode layer 13 may be disposed at a first surface (or an upper surface) of the vibration layer 11. The first electrode layer 13 may be disposed on or coupled to a first surface of each of the plurality of first portions 11*a* and a first surface of each of the plurality of second portions 11*b* in common and may be electrically connected to the first surface of each of the plurality of first portions 11*a*. For example, the first electrode layer 13 may have a single electrode (or one electrode) form disposed on the whole first surface of the vibration layer 11. For example, the first electrode layer 13 may have substantially the same shape as the vibration layer 11, but embodiments of the present disclosure are not limited thereto.

The second electrode layer 15 may be disposed at a second surface, which differs from (or opposite to) the first surface, of the vibration layer 11. The second electrode layer 15 may be disposed on or coupled to a second surface of each of the plurality of first portions 11*a* and a second surface of each of the plurality of second portions 11*b* in common and may be electrically connected to the second surface of each of the plurality of first portions 11*a*. For example, the second electrode layer 15 may have a single electrode (or one electrode) form disposed on the whole second surface of the vibration layer 11. For example, the second electrode layer 15 may have substantially the same shape as the vibration layer 11, but embodiments of the present disclosure are not limited thereto.

One or more of the first electrode layer 13 and the second electrode layer 15 according to an embodiment of the present disclosure may include a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), molybdenum (Mo), magnesium (Mg), or an alloy thereof, but embodiments of the present disclosure are not limited thereto.

The vibration layer 11 may be polarized by a certain voltage applied to the first electrode layer 13 and the second electrode layer 15 in a certain temperature atmosphere or a temperature atmosphere which is changed from a high temperature to a room temperature, but embodiments of the present disclosure are not limited thereto. For example, when a vibration driving signal is applied, the vibration layer 11 may alternately and repeatedly contract and expand based on an inverse piezoelectric effect based on the vibration driving signal (or a sound signal or a voice signal) applied from the outside to the first electrode layer 13 and the second electrode layer 15, and thus, may vibrate. For example, the vibration layer 11 may vibrate based on a vibration in a vertical direction and a vibration in a planar direction based on the vibration driving signal applied to the first electrode layer 13 and the second electrode layer 15. A displacement of a passive vibration member or the display panel may increase based on contraction and/or expansion of the vibration layer 11 in the planar direction, and thus, a vibration may be more enhanced.

Figure 10:
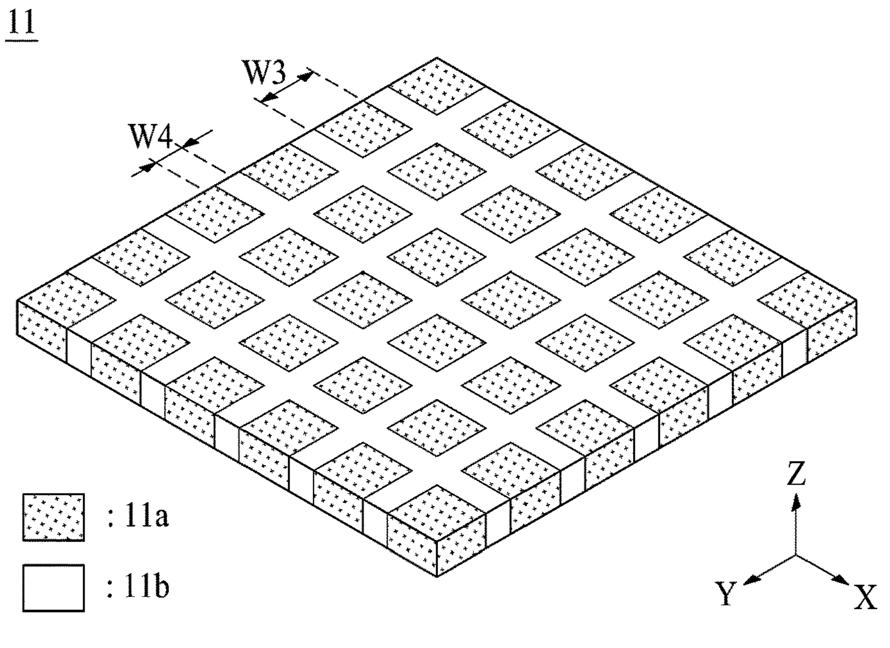
FIG. 10 is a perspective view illustrating another embodiment of the vibration layer illustrated in FIG. 9.

FIG. 10 is a perspective view illustrating a vibration layer of a vibration portion according to another embodiment of the present disclosure.

Referring to FIG. 10, a vibration layer 11 according to another embodiment of the present disclosure may include a plurality of first portions 11*a* which are apart from one another in a first direction X and a second direction Y and a second portion 11*b* disposed between the plurality of first portions 11*a*.

The plurality of first portions 11*a* may be disposed apart from one another in each of the first direction X and the second direction Y. For example, the plurality of first portions 11*a* may have a hexahedral shape having the same size and may be arranged in a lattice shape. Each of the plurality of first portions 11*a* may include substantially the same material as that of the first portion 11*a* described above with reference to FIG. 9, and thus, like reference numerals refer to like elements and their repeated descriptions are omitted.

The second portion 11*b* may be disposed between the plurality of first portions 11*a* in each of the first direction X and the second direction Y. The second portion 11*b* may be configured to fill a gap between two adjacent first portions 11*a* or to surround each of the plurality of first portions 11*a*, and thus, may be connected to or attached on an adjacent first portion 11*a*. According to an embodiment of the present disclosure, a width of a second portion 11*b* disposed between two first portions 11*a* adjacent to each other in the first direction X may be the same as or different from that of the first portion 11*a*, and a width of a second portion 11*b* disposed between two first portions 11*a* adjacent to each other in the second direction Y may be the same as or different from that of the first portion 11*a*. The second portion 11*b* may include substantially the same material as that of the second portion 11*b* described above with reference to FIG. 9, and thus, like reference numerals refer to like elements and their repeated descriptions are omitted.

The vibration layer 11 according to another embodiment of the present disclosure may include a 1-3 composite structure having a piezoelectric characteristic of a 1-3 vibration mode, and thus, may have a resonance frequency of 30 MHz or less, but embodiments of the present disclosure are not limited thereto. For example, the resonance frequency of the vibration layer 11 may vary based on one or more of a shape, a length, or a thickness thereof.

Figure 11:
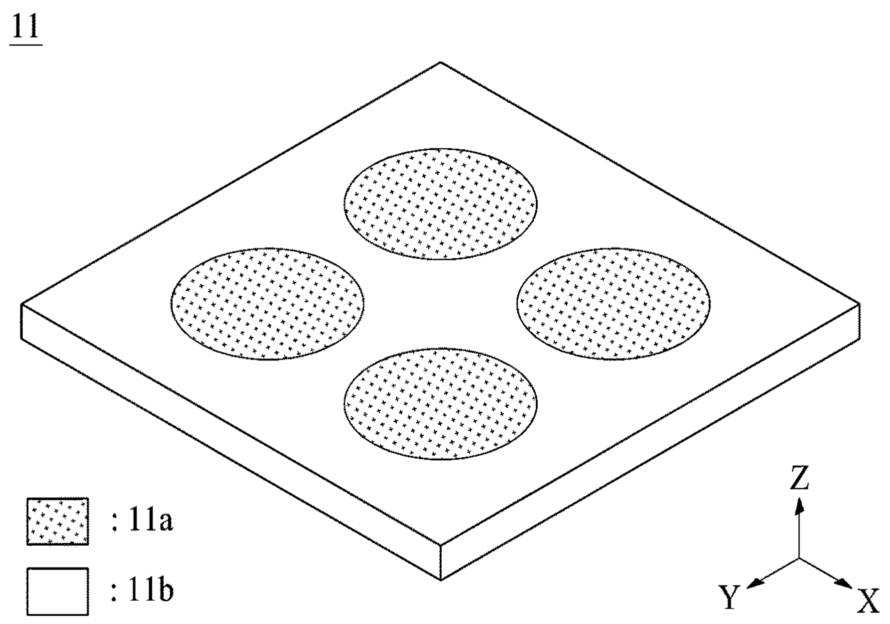
FIG. 11 is a perspective view illustrating another embodiment of the vibration layer illustrated in FIG. 9.

FIG. 11 is a perspective view illustrating a vibration layer of a vibration portion according to another embodiment of the present disclosure.

Referring to FIG. 11, a vibration layer 11 according to another embodiment of the present disclosure may include a plurality of first portions 11*a* which are apart from one another in a first direction X and a second direction Y and a second portion 11*b* which surrounds each of the plurality of first portions 11*a*.

Each of the plurality of first portions 11*a* may have a planar structure having a circular shape. For example, each of the plurality of first portions 11*a* may have a circular plate shape, but embodiments of the present disclosure are not limited thereto. For example, each of the plurality of first portions 11*a* may have a dot shape including an oval shape, a polygonal shape, or a donut shape. Each of the plurality of first portions 11*a* may include substantially the same piezoelectric material as that of the first portion 11*a* described above with reference to FIG. 9, and thus, like reference numerals refer to like elements and their repeated descriptions are omitted.

The second portion 11*b* may be disposed between the plurality of first portions 11*a* in each of the first direction X and the second direction Y. The second portion 11*b* may be configured to surround each of the plurality of first portions 11*a*, and thus, may be connected to or attached on a lateral surface of each of the plurality of first portions 11*a*. The plurality of first portions 11*a* and the second portion 11*b* may be disposed (or arranged) in parallel on the same plane (or the same layer). The second portion 11*b* may include substantially the same piezoelectric material as that of the second portion 11*b* described above with reference to FIG. 9, and thus, like reference numerals refer to like elements and their repeated descriptions are omitted.

Figure 12:
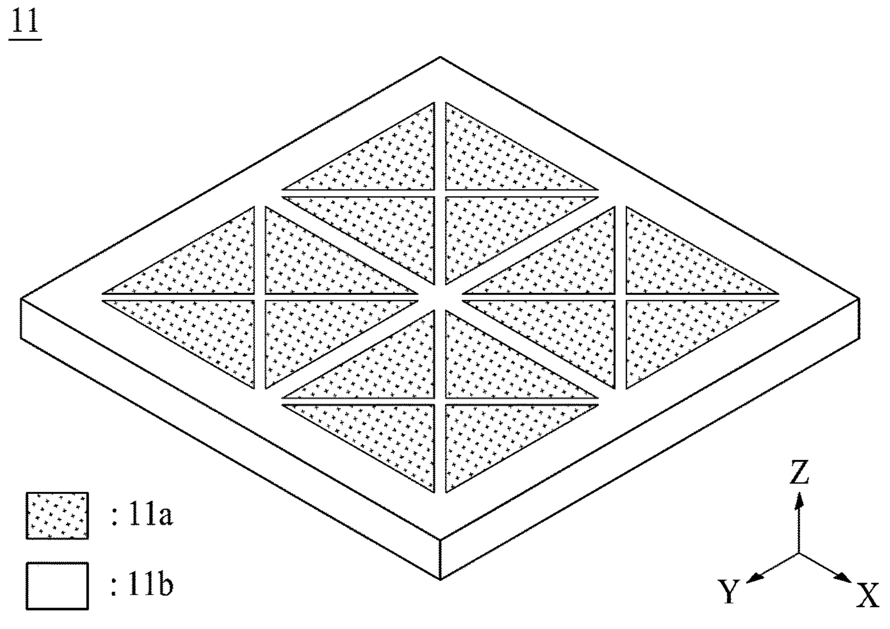
FIG. 12 is a perspective view illustrating another embodiment of the vibration layer illustrated in FIG. 9.

FIG. 12 is a perspective view illustrating a vibration layer of a vibration portion according to another embodiment of the present disclosure.

Referring to FIG. 12, a vibration layer 11 according to another embodiment of the present disclosure may include a plurality of first portions 11*a* which are apart from one another in a first direction X and a second direction Y and a second portion 11*b* which surrounds each of the plurality of first portions 11*a*.

Each of the plurality of first portions 11*a* may have a planar structure having a triangular shape. For example, each of the plurality of first portions 11*a* may have a triangular plate shape. The first portion 11*a* may include substantially the same piezoelectric material as that of the first portion 11*a* described above with reference to FIGS. 9 to 11, and thus, like reference numerals refer to like elements and their repeated descriptions are omitted.

According to another embodiment of the present disclosure, four adjacent first portions 11*a* of the plurality of first portions 11*a* may be disposed adjacent to one another to form a tetragonal shape (or a square shape). A vertex of each of four adjacent first portions 11*a* forming a tetragonal shape may be disposed adjacent to a middle portion (or a center portion) of a tetragonal shape.

The second portion 11*b* may be disposed between the plurality of first portions 11*a* in each of the first direction X and the second direction Y. The second portion 11*b* may be configured to surround each of the plurality of first portions 11*a*, and thus, may be connected to or attached on a lateral surface of each of the plurality of first portions 11*a*. The plurality of first portions 11*a* and the second portion 11*b* may be disposed (or arranged) in parallel on the same plane (or the same layer). The second portion 11*b* may include substantially the same piezoelectric material as that of the second portion 11*b* described above with reference to FIGS. 9 to 11, and thus, like reference numerals refer to like elements and their repeated descriptions are omitted.

According to another embodiment of the present disclosure, 2N (where N is a natural number of 2 or more) adjacent first portions 11*a* of a plurality of first portions 11*a* having a triangular shape may be arranged adjacent to one another to form a 2N-angular shape. For example, six adjacent first portions 11*a* of the plurality of first portions 11*a* may be disposed adjacent to one another to form a hexagonal shape (or a regular hexagon). A vertex of each of six adjacent first portions 11*a* forming a hexagonal shape may be disposed adjacent to a middle portion (or a center portion) of a hexagonal shape. The second portion 11*b* may be configured to surround each of the plurality of first portions 11*a*, and thus, may be connected to or attached on a lateral surface of each of the plurality of first portions 11*a*.

Figure 13:
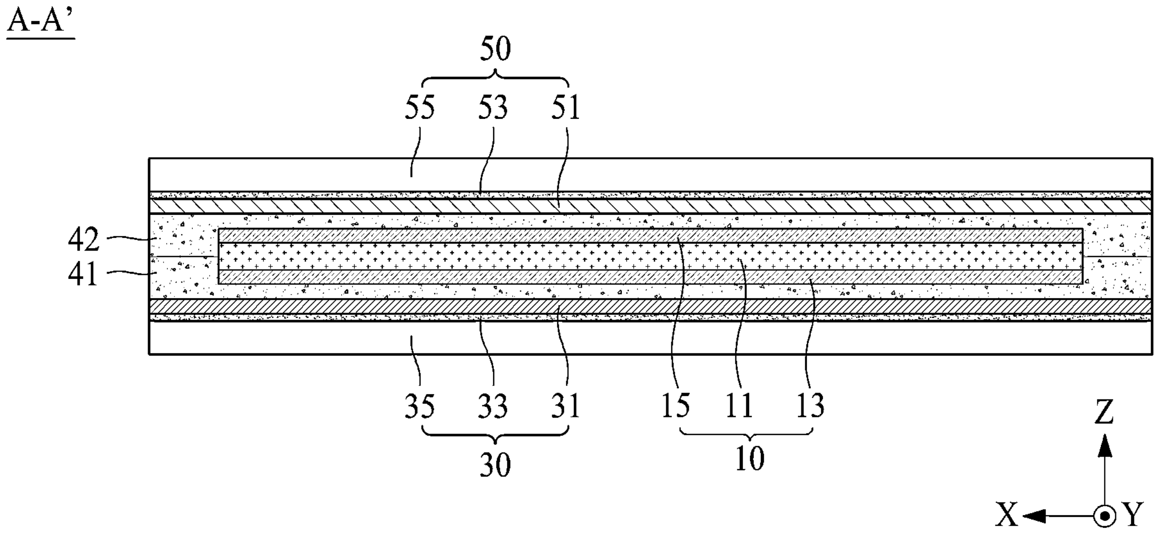
FIG. 13 illustrates a vibration apparatus according to another embodiment of the present disclosure.
Figure 14:
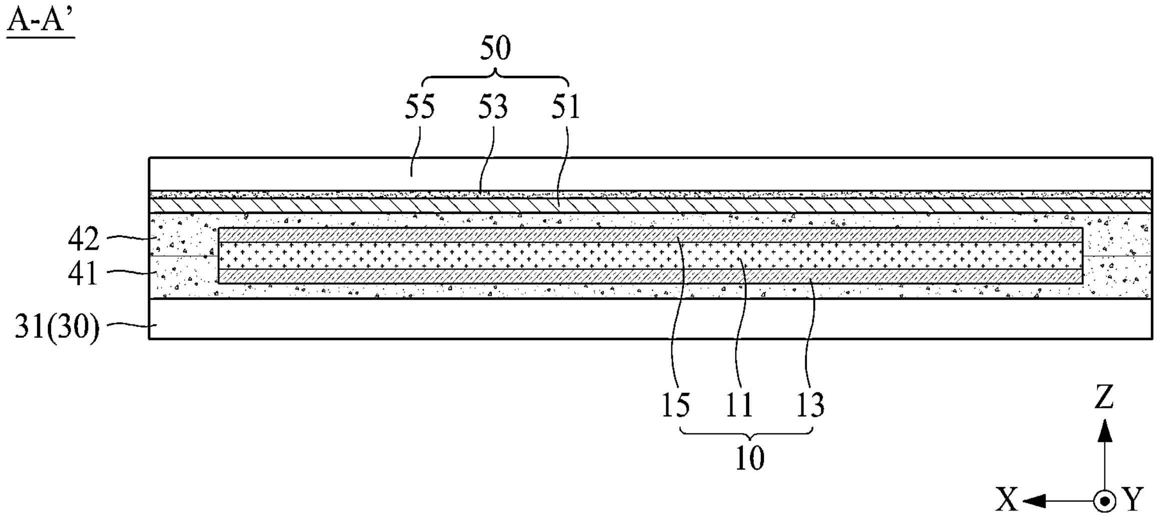
FIG. 14 illustrates a vibration apparatus according to another embodiment of the present disclosure.

FIG. 13 illustrates a vibration apparatus according to another embodiment of the present disclosure. FIG. 14 illustrates a vibration apparatus according to another embodiment of the present disclosure.

Referring to FIG. 13, a vibration apparatus 1 according to another embodiment of the present disclosure may include a first protection member 30 and a second protection member 50.

The first protection member 30 may include a first layer 31, a second layer 35, and a third layer 33. The second protection member 50 may include a first layer 51, a second layer 55, and a third layer 53.

The first layer 31 and the first layer 51 respectively included in the first protection member 30 and the second protection member 50 according to another embodiment of the present disclosure may include different metal materials. For example, the first layer 31 and the first layer 51 respectively included in the first protection member 30 and the second protection member 50 may be configured based on an acoustic impedance component including a metal material. For example, according to the sound impedance theory, in a material which is low in acoustic impedance component, because the transfer of a sound wave is slight, the loss of a sound wave may be reduced, and when the first layer 51 of the second protection member 50 disposed on a surface which does not contact a vibration plate includes a material which is low in acoustic impedance component, the loss of a sound wave may be more reduced. For example, when an acoustic impedance component of the first layer 51 included in the second protection member 50 is lower than an acoustic impedance component of the first layer 31 included in the first protection member 30 coupled to the vibration member or the display panel, the loss of a sound pressure level may be reduced and a sound pressure level characteristic may be enhanced. For example, comparing an aluminum material with a copper material, an acoustic impedance of the aluminum material may be 17×106 and an acoustic impedance of the copper material may be 42×106, and thus, the first layer 31 of the first protection member 30 may include the copper material and the first layer 51 of the second protection member 50 may include the aluminum material, thereby enhancing a sound pressure level characteristic of the vibration apparatus 1.

Referring to FIG. 14, a vibration apparatus 1 according to another embodiment of the present disclosure may include a first protection member 30 which is a single layer and a second protection member 50 which includes a first layer 51, a second layer 55, and a third layer 53.

According to another embodiment of the present disclosure, when the first protection member 30 coupled to the vibration member or the display panel includes the first layer 31 having stiffness, a vibration of a vibration portion 10 may be partially blocked in the middle of being transferred to the vibration member. Accordingly, the first protection member 30 may be configured as a single layer and the second protection member 50 may include the first layer 51, the second layer 55, and the third layer 53, and thus, a sound pressure level characteristic of the vibration apparatus 1 may be enhanced.

Figure 15:
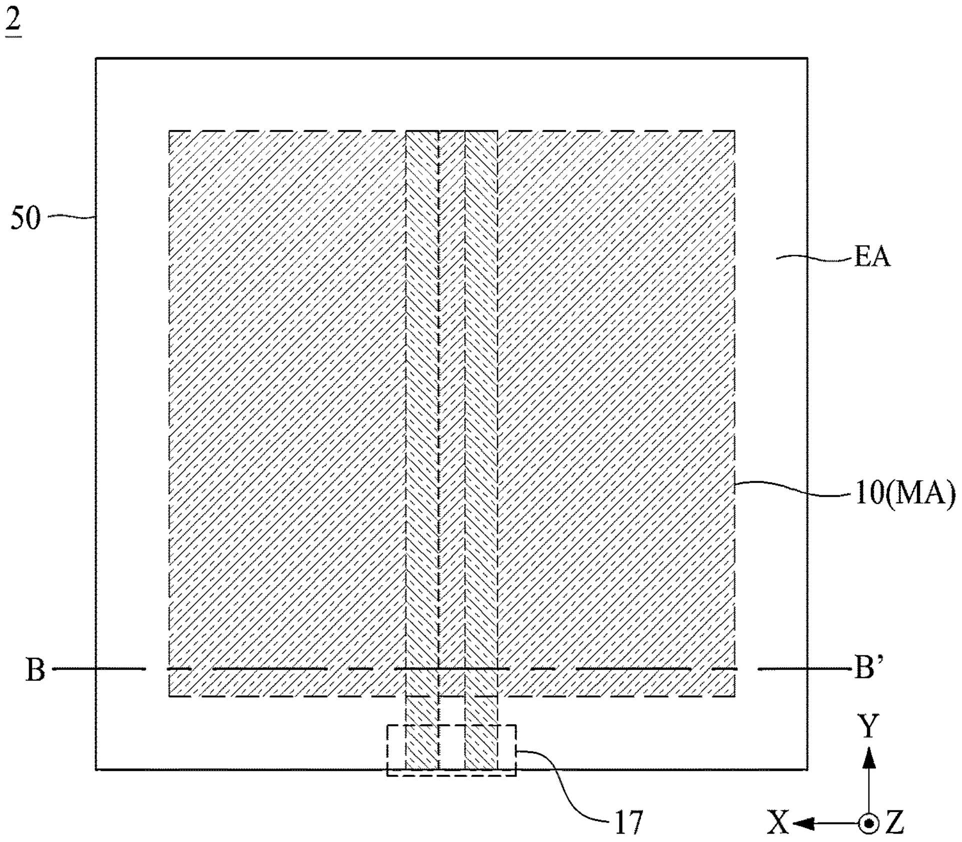
FIG. 15 illustrates a vibration apparatus according to another embodiment of the present disclosure.
Figure 16:
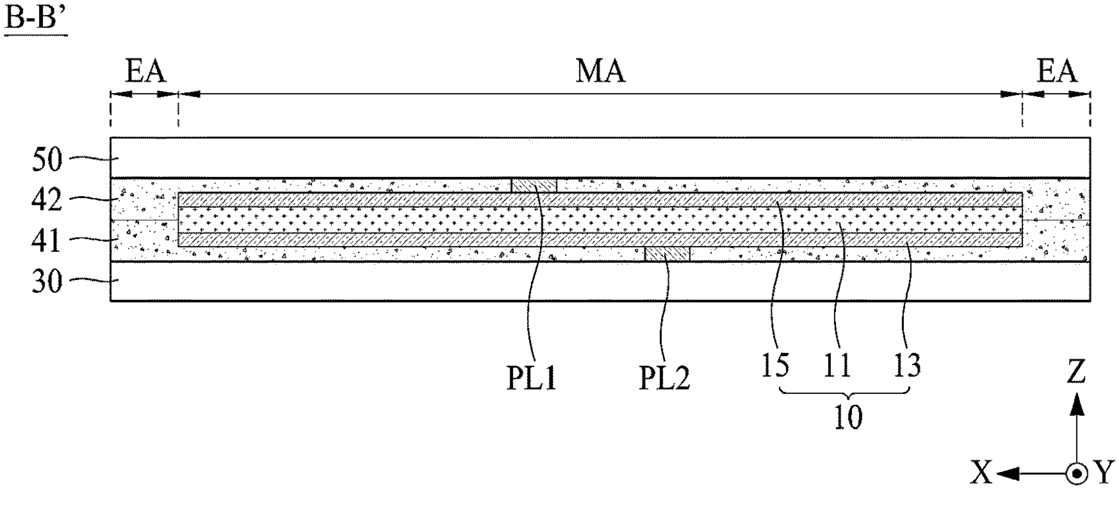
FIG. 16 is a cross-sectional view taken along line B-B' illustrated in FIG. 15.

FIG. 15 illustrates a vibration apparatus according to another embodiment of the present disclosure, and FIG. 16 is a cross-sectional view taken along line B-B' illustrated in FIG. 15. FIGS. 11 and 12 illustrate an embodiment implemented by modifying the vibration apparatus described above with reference to one or more of FIGS. 1 to 4, 13, and 14. In the following description, therefore, the other elements except a vibration apparatus and relevant elements are referred to by like reference numerals, and their repeated descriptions are omitted or will be briefly given.

Referring to FIGS. 15 and 16, a vibration apparatus 2 according to another embodiment of the present disclosure may include a vibration portion 10, a first protection member 30, a second protection member 50, and a pad region 17.

The vibration apparatus 2 according to another embodiment of the present disclosure may include a piezoelectric material. For example, the vibration apparatus 2 may include a piezoelectric material (or a piezoelectric device) having a piezoelectric characteristic (or a piezoelectric effect). For example, the vibration apparatus 2 may include a first region MA and a second region EA surrounding the first region MA. For example, in the vibration apparatus 2, the first region MA may be referred to as an inner region, an internal region, a middle region, or a center region, but embodiments of the present disclosure are not limited thereto. The second region EA may be referred to as an outer region, a peripheral region, a border region, an edge region, or an external region, but embodiments of the present disclosure are not limited thereto. For example, the second region EA of the vibration apparatus 2 may include the pad region 17.

The vibration portion 10 may be provided in the first region MA of the vibration apparatus 2, but embodiments of the present disclosure are not limited thereto. The vibration portion 10 may include a vibration layer 11, a first electrode layer 13, and a second electrode layer 15.

The vibration layer 11 may include a piezoelectric-type vibration layer. For example, the vibration layer 11 may include a piezoelectric material having a piezoelectric effect, a composite piezoelectric material, or an electroactive material. The vibration layer 11 may autonomously vibrate (or displace or drive) or may vibrate (or displace or drive) a vibration member, based on a vibration (or a displacement or drive) of a piezoelectric material based on a driving signal applied to the piezoelectric material. For example, the vibration layer 11 may alternately repeat contraction and expansion based on a piezoelectric effect (or a piezoelectric characteristic) to vibrate (or displace or drive). For example, the vibration layer 11 may alternately repeat contraction and expansion based on an inverse piezoelectric effect to vibrate (or displace or drive) in a vertical direction (or a thickness direction) Z.

The vibration layer 11 according to another embodiment of the present disclosure may include a piezoelectric material, a composite piezoelectric material, or an electroactive material having a piezoelectric effect. The vibration layer 11 may include an inorganic material and an organic material. For example, the vibration layer 11 may include a plurality of inorganic material portions including a piezoelectric material and at least one organic material portion including a ductile material. For example, the vibration layer 11 may be referred to as a vibration layer, a piezoelectric layer, a piezoelectric material layer, a piezoelectric material portion, a piezoelectric vibration layer, a piezoelectric vibration portion, an electroactive layer, an electroactive portion, a displacement portion, a piezoelectric displacement layer, a piezoelectric displacement portion, a sound wave generating layer, a sound wave generating portion, an organic/inorganic material layer, an organic/inorganic material portion, a piezoelectric composite layer, a piezoelectric composite, or a piezoelectric ceramic composite, but embodiments of the present disclosure are not limited thereto. The vibration layer 11 may include a transparent, semitransparent, or opaque piezoelectric material, and thus, the vibration layer 11 may be transparent, semitransparent, or opaque.

A vibration layer 11 according to another embodiment of the present disclosure may include a plurality of first portions 11*a* and a plurality of second portions 11*b*. For example, the plurality of first portions 11*a* and the plurality of second portions 11*b* may be alternately and repeatedly arranged in a first direction X (or a second direction Y). For example, the first direction X may be a widthwise direction of the vibration layer 11 and the second direction Y may be a lengthwise direction of the vibration layer 11 intersecting with the first direction X, but embodiments of the present disclosure are not limited thereto. For example, the first direction X may be the lengthwise direction of the vibration layer 11, and the second direction Y may be the widthwise direction of the vibration layer 11.

Each of the plurality of first portions 11*a* may include an inorganic material portion. The inorganic material portion may include a piezoelectric material, a composite piezoelectric material, or an electroactive material having a piezoelectric effect. For example, each of the plurality of first portions 11*a* may include substantially the same piezoelectric material as that of the vibration layer 11 described above with reference to FIGS. 1 and 2, and thus, like reference numerals refer to like elements and their repeated descriptions are omitted.

The first electrode layer 13 may be disposed at a first surface (or an upper surface) of the vibration layer 11. The first electrode layer 13 may be disposed on or coupled to a first surface of each of the plurality of first portions 11*a* and a first surface of each of the plurality of second portions 11*b* in common and may be electrically connected to the first surface of each of the plurality of first portions 11*a*. For example, the first electrode layer 13 may have a single electrode (or one electrode) form disposed on the whole first surface of the vibration layer 11. For example, the first electrode layer 13 may have substantially the same shape as the vibration layer 11, but embodiments of the present disclosure are not limited thereto.

The second electrode layer 15 may be disposed at a second surface, which differs from (or opposite to) the first surface, of the vibration layer 11. The second electrode layer 15 may be disposed on or coupled to a second surface of each of the plurality of first portions 11*a* and a second surface of each of the plurality of second portions 11*b* in common and may be electrically connected to the second surface of each of the plurality of first portions 11*a*. For example, the second electrode layer 15 may have a single electrode (or one electrode) form disposed on the whole second surface of the vibration layer 11. For example, the second electrode layer 15 may have substantially the same shape as the vibration layer 11, but embodiments of the present disclosure are not limited thereto.

Each of the first electrode layer 13 and the second electrode layer 15 according to an embodiment of the present disclosure may include the same material as that of each of the first electrode layer 13 and the second electrode layer 15 described above with reference to FIGS. 1 and 2, and thus, their repeated descriptions are omitted.

The first electrode layer 13 may be covered by the first protection member 30 described above. The second electrode layer 15 may be covered by the second protection member 50 described above. The first protection member 30 and the second protection member 50 may respectively be substantially the first protection member 30 and the second protection member 50 described above with reference to FIG. 5, and thus, like reference numerals refer to like elements and their repeated descriptions are omitted.

The vibration layer 11 may be polarized by a certain voltage applied to the first electrode layer 13 and the second electrode layer 15 in a certain temperature atmosphere or a temperature atmosphere which is changed from a high temperature to a room temperature, but embodiments of the present disclosure are not limited thereto. For example, when a vibration driving signal is applied, the vibration layer 11 may alternately and repeatedly contract and expand based on an inverse piezoelectric effect based on the vibration driving signal (or a sound signal or a voice signal) applied from the outside to the first electrode layer 13 and the second electrode layer 15, and thus, may be displaced or may vibrate (or drive). For example, the vibration layer 11 may vibrate based on a vibration in a vertical direction and a vibration in a planar direction based on the vibration driving signal applied to the first electrode layer 13 and the second electrode layer 15. A displacement of the vibration layer 11 may increase based on contraction and/or expansion of the vibration layer 11 in the planar direction, and thus, a vibration characteristic may be more enhanced.

The vibration apparatus 2 according to another embodiment of the present disclosure may include a first power supply line PL1 and a second power supply line PL2.

The first power supply line PL1 may be disposed in the second protection member 50 and may be electrically coupled to the second electrode layer 15. For example, the first power supply line PL1 may be disposed on an inner surface of the second protection member 50 facing the second electrode layer 15 and may be electrically coupled or electrically and directly connected to the second electrode layer 15. The second power supply line PL2 may be disposed in the first protection member 30 and may be electrically coupled to the first electrode layer 13. For example, the second power supply line PL2 may be disposed on an inner surface of the first protection member 30 facing the first electrode layer 13 and may be electrically coupled or electrically and directly connected to the first electrode layer 13.

The vibration apparatus 2 according to another embodiment of the present disclosure may further include a pad region 17.

The pad region 17 may be disposed in a second region EA of the vibration apparatus 2. The pad region 17 may be configured at one edge portion of one of the first protection member 30 and the second protection member 50 so as to be electrically coupled to one side (or one end) of each of the first power supply line PL1 and the second power supply line PL2.

The pad region 17 according to another embodiment of the present disclosure may include a first pad electrode, which is electrically coupled to one end of the first power supply line PL1, and a second pad electrode which is electrically coupled to one end of the second power supply line PL2.

The first pad electrode may be disposed at one edge portion of one of the first protection member 30 and the second protection member 50 and may be connected to one end (or one side) of the first power supply line PL1. For example, the first pad electrode may pass through one of the first protection member 30 and the second protection member 50 and may be electrically coupled to the one end (or one side) of the first power supply line PL1.

The second pad electrode may be disposed in parallel with the first pad electrode and may be coupled to one end (or one side) of the second power supply line PL2. For example, the second pad electrode may pass through one of the first protection member 30 and the second protection member 50 and may be electrically coupled to the one end of the second power supply line PL2.

According to another embodiment of the present disclosure, each of the first power supply line PL1, the second power supply line PL2, and the pad region 17 may be configured to be transparent, semitransparent, or opaque.

The pad region 17 according to another embodiment of the present disclosure may be electrically coupled to a signal cable.

Figure 17:
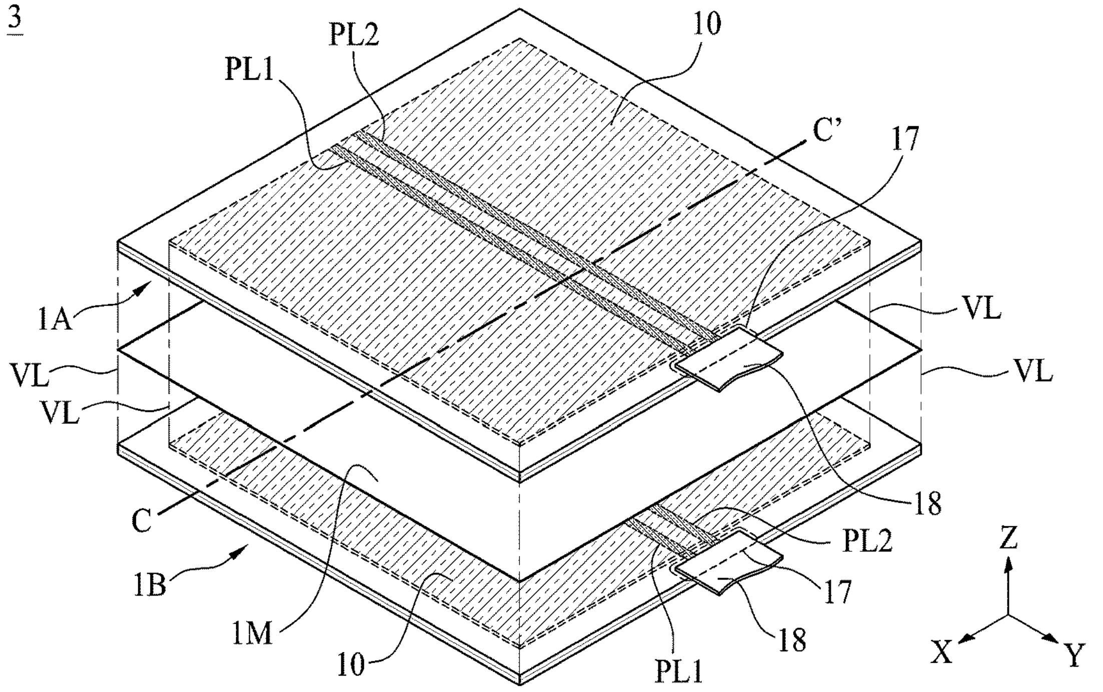
FIG. 17 illustrates a vibration apparatus according to another embodiment of the present disclosure.
Figure 18:
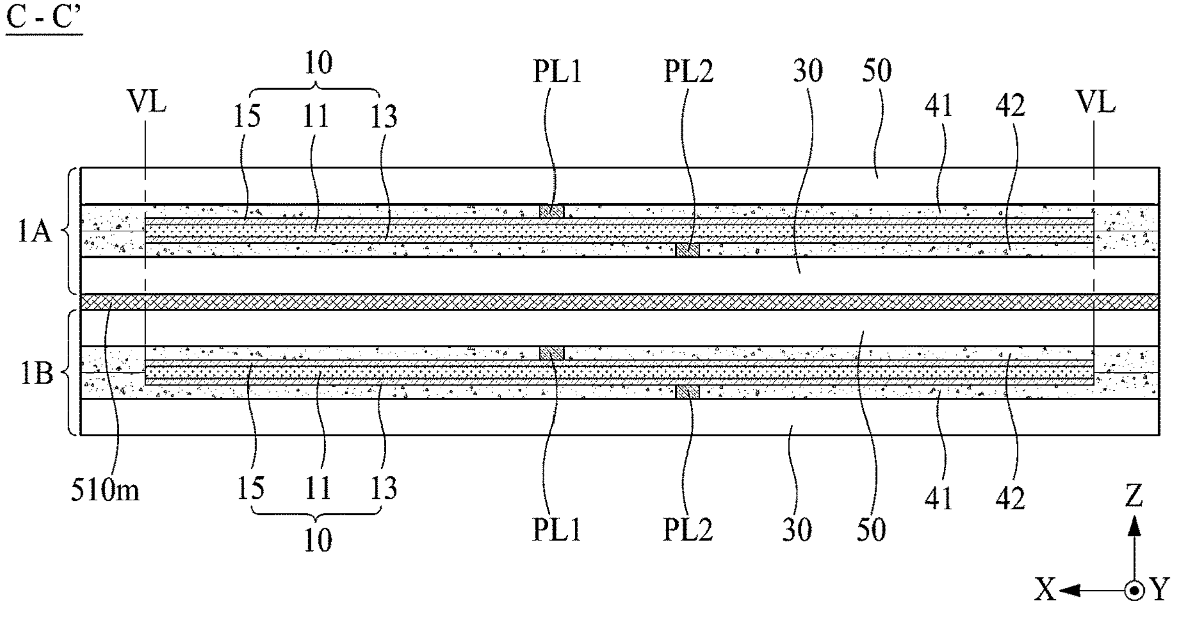
FIG. 18 is a cross-sectional view taken along line C-C' illustrated in FIG. 17.

FIG. 17 illustrates a vibration apparatus according to another embodiment of the present disclosure. FIG. 18 is a cross-sectional view taken along line C-C' illustrated in FIG. 17. FIGS. 17 and 18 are diagrams illustrating another embodiment of the vibration apparatus described above with reference to FIGS. 1 to 6, 13, and 14.

Referring to FIGS. 17 and 18, a vibration apparatus 3 according to another embodiment of the present disclosure may include a plurality of vibration generating portions 1A and 1B and a middle member 1M. For example, the vibration apparatus 3 according to another embodiment of the present disclosure may include a first vibration generating portion 1A, a second vibration generating portion 1B, and the middle member 1M between the first vibration generating portion 1A and the second vibration generating portion 1B.

According to an embodiment of the present disclosure, descriptions of FIGS. 17 and 18 may be identically applied to FIGS. 1 and 15.

The plurality of vibration generating portions (or first and second vibration generating portions) 1A and 1B may overlap each other or may be stacked to be displaced (or driven or vibrated) in the same direction, in order to maximize or increase a displacement amount or an amplitude displacement of the vibration apparatus 3. For example, one side (or end portion or end or outer surface or each edge portion) of each of the plurality of vibration generating portions (or the first and second vibration generating portions) 1A and 1B may be aligned in a virtual extension line VL extending in a third direction Z or may be disposed in the virtual extension line VL. For example, the first vibration generating portion 1A may be disposed on a front surface or a rear surface of the second vibration generating portion 1B.

Each of the plurality of vibration generating portions (or first and second vibration generating portions) 1A and 1B may be one of the vibration apparatuses described above with reference to FIGS. 9 to 12, and thus, repetitive descriptions thereof are omitted.

The plurality of vibration generating portions 1A and 1B may overlap each other or may be stacked to be displaced (or driven or vibrated) in the same direction, based on a polarization direction of a vibration layer 11. For example, when vibration layers 11 of the first and second vibration generating portions 1A and 1B have the same polarization direction, the second vibration generating portion 1B may be disposed on a front surface or a rear surface of the first vibration generating portion 1A. For example, when the vibration layers 11 of the first and second vibration generating portions 1A and 1B have opposite polarization directions, the second vibration generating portion 1B may be vertically reversed and disposed on the front surface or the rear surface of the first vibration generating portion 1A.

The middle member 1M may be disposed or interposed between the plurality of vibration generating portions 1A and 1B. For example, the middle member 1M may be disposed between a first protection member 30 of the first vibration generating portion 1A and a second protection member 50 of the second vibration generating portion 1B. For example, the middle member 1M may include an adhesive material including an adhesive layer which is good in attaching force or adhesive force to each of the first vibration generating portion 1A and the second vibration generating portion 1B which overlap vertically.

The middle member 1M according to an embodiment of the present disclosure may include a foam pad, a single-sided tape, a double-sided tape, a single-sided foam pad, a double-sided foam pad, a single-sided foam tape, a double-sided foam tape, or an adhesive, but embodiments of the present disclosure are not limited thereto. For example, an adhesive layer of the middle layer 1M may include epoxy, acrylic, silicone, or urethane-based materials, but embodiments of the present disclosure are not limited thereto. The adhesive layer of the middle layer 1M may include a urethane-based material (or substance) which relatively has a ductile characteristic compared to acryl among acryl and urethane. Accordingly, in the vibration apparatus 3 according to another embodiment of the present disclosure, vibration loss caused by displacement interference between the plurality of vibration generating portions 1A and 1B may be minimized, or each of the plurality of vibration generating portions 1A and 1B may be freely displaced.

The middle member 1M according to another embodiment of the present disclosure may include one or more of a thermal-curable adhesive, an ultraviolet (UV)-curable adhesive, and a thermal bonding adhesive. For example, the middle member 1M may include a thermal bonding adhesive. The thermal bonding adhesive may be a thermal-active type or a thermal-curable type. For example, the middle member 1M including the thermal bonding adhesive may bond or couple two adjacent vibration generating portions 1A and 1B by heat and pressure. For example, the middle member 1M including the thermal bonding adhesive may minimize or reduce the loss of a vibration of the vibration apparatus 3.

The plurality of vibration generating portions 1A and 1B may be provided as one structure material (or part) by a laminating process using the middle member 1M. For example, the plurality of vibration generating portions 1A and 1B may be provided as one structure material (or part) by a laminating process using a roller.

FIGS. 19A to 19D illustrate a stack structure between vibration layers of a plurality of vibration generating portions illustrated in FIGS. 17 and 18.

Figure 19A:
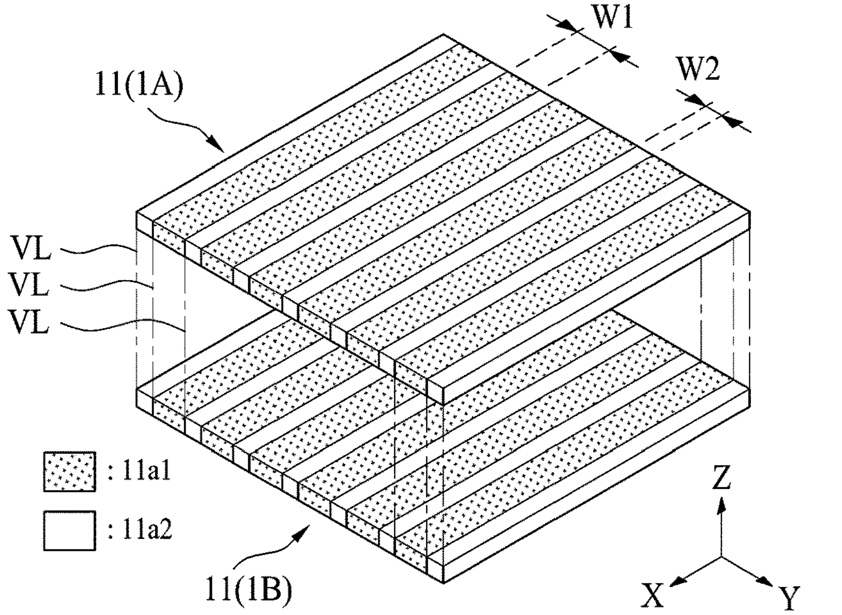
FIGS. 19A to 19D illustrate a stack structure between vibration layers of a plurality of vibrators illustrated in FIGS. 17 and 18.
Figure 19B:
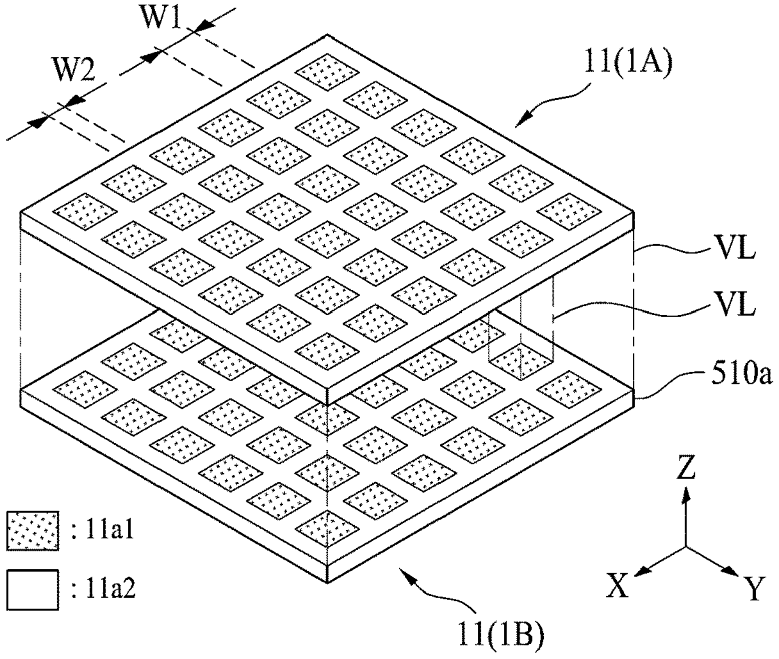
Figure 19C:
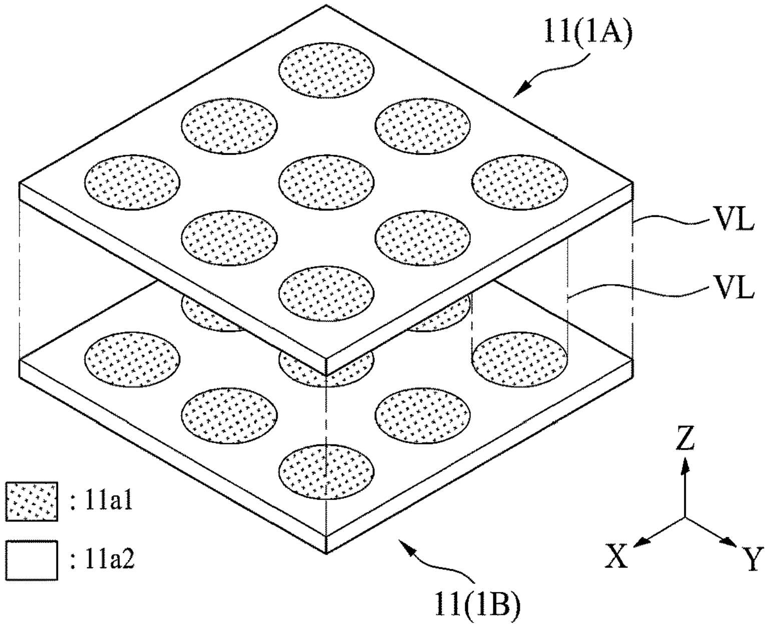
Figure 19D:
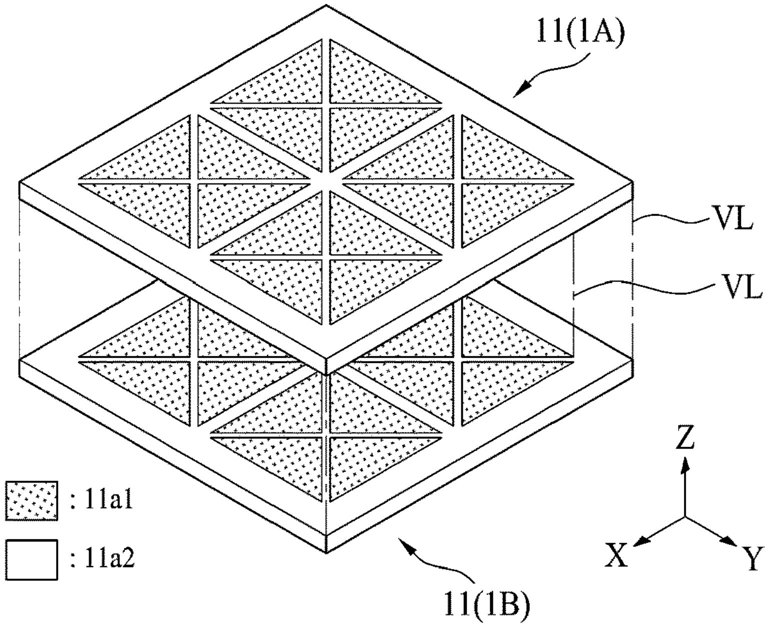

Referring to FIGS. 17 and 19A, a vibration layer 11 of each of a plurality of vibration generating portions 1A and 1B may include a plurality of first portions 11*a*1 and a plurality of second portions 11*a*2 disposed between the plurality of first portions 11*a*1. The vibration layer 11 may be substantially the same as the vibration layer 11 described above with reference to FIGS. 15 and 16, and thus, a repetitive description thereof is omitted. According to an embodiment of the present disclosure, descriptions of FIGS. 19A to 19D may be identically applied to FIGS. 15 and 16.

The first portion 11*a*1 of the vibration generating portion 1B, disposed in a lower layer, of the plurality of vibration generating portions 1A and 1B and the first portion 11*a*1 of the vibration generating portion 1A, disposed in an upper layer, of the plurality of vibration generating portions 1A and 1B may substantially overlap each other without being staggered. The second portion 11*a*2 of the vibration generating portion 1B, disposed in the lower layer, of the plurality of vibration generating portions 1A and 1B and the second portion 11*a*2 of the vibration generating portion 1A, disposed in the upper layer, of the plurality of vibration generating portions 1A and 1B may substantially overlap each other without being staggered. Accordingly, the first portions 11*a*1 of the plurality of vibration generating portions 1A and 1B may substantially overlap each other without being staggered and may be displaced (or driven or vibrated) in the same direction, and thus, an amplitude displacement of the vibration apparatus 3 and/or an amplitude displacement of a vibration member may be increased or maximized by a synthesis vibration of each of the plurality of vibration generating portions 1A and 1B, thereby enhancing a sound characteristic and/or a sound pressure level characteristic of a low-pitched sound band generated based on a vibration of the vibration member.

Referring to FIGS. 17 and 19B to 19D, a vibration layer 11 of each of a plurality of vibration generating portions 1A and 1B may include a plurality of first portions 11*a*1 and a plurality of second portions 11*a*2 disposed to surround the plurality of first portions 11*a*1. The vibration layer 11 may be substantially the same as the vibration layer 11 described above with reference to FIGS. 15 and 16, and thus, a repetitive description thereof is omitted.

The first portion 11*a*1 of the vibration generating portion 1B, disposed in a lower layer, of the plurality of vibration generating portions 1A and 1B and the first portion 11*a*1 of the vibration generating portion 1A, disposed in an upper layer, of the plurality of vibration generating portions 1A and 1B may substantially overlap each other without being staggered. The second portion 11*a*2 of the vibration generating portion 1B, disposed in the lower layer, of the plurality of vibration generating portions 1A and 1B and the second portion 11*a*2 of the vibration generating portion 1A, disposed in the upper layer, of the plurality of vibration generating portions 1A and 1B may substantially overlap each other without being staggered. Accordingly, the first portions 11*a*1 of the plurality of vibration generating portions 1A and 1B may substantially overlap each other without being staggered and may be displaced (or driven or vibrated) in the same direction, and thus, an amplitude displacement of the vibration apparatus 3 and/or an amplitude displacement of a vibration member may be increased or maximized by a synthesis vibration of each of the plurality of vibration generating portions 1A and 1B, thereby enhancing a sound characteristic and/or a sound pressure level characteristic of a low-pitched sound band generated based on a vibration of the vibration member.

Figure 20:
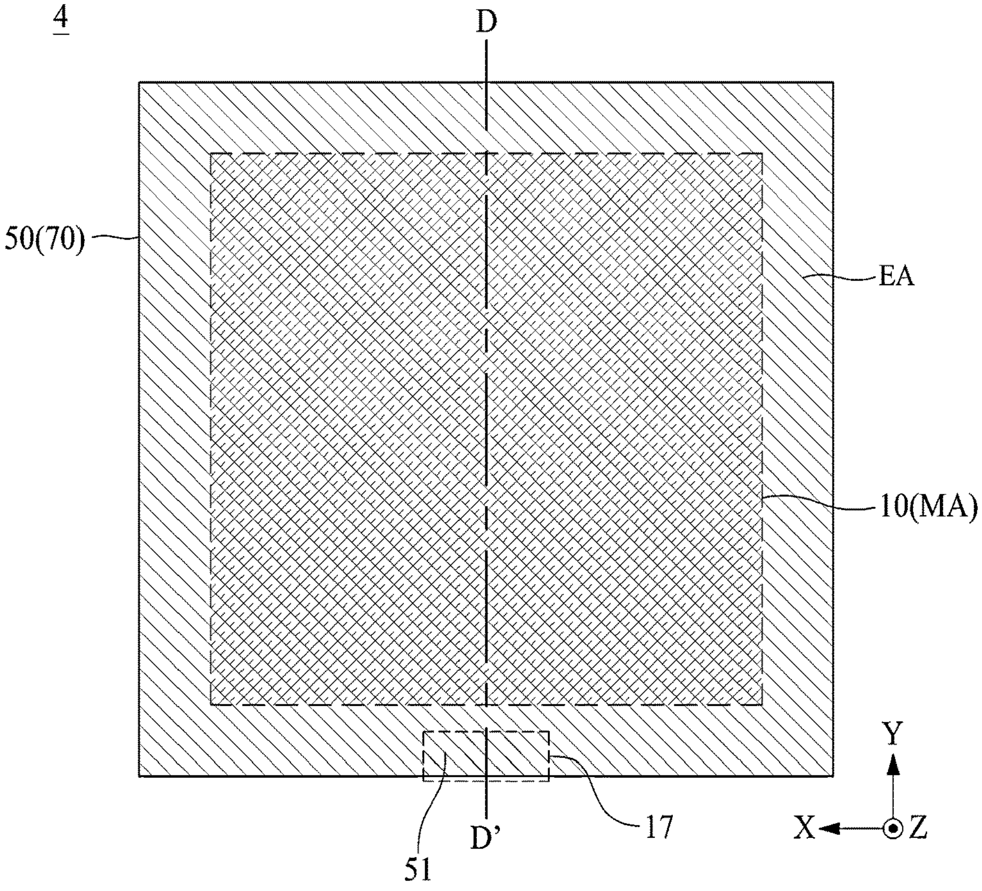
FIG. 20 illustrates an apparatus according to another embodiment of the present disclosure.
Figure 21:
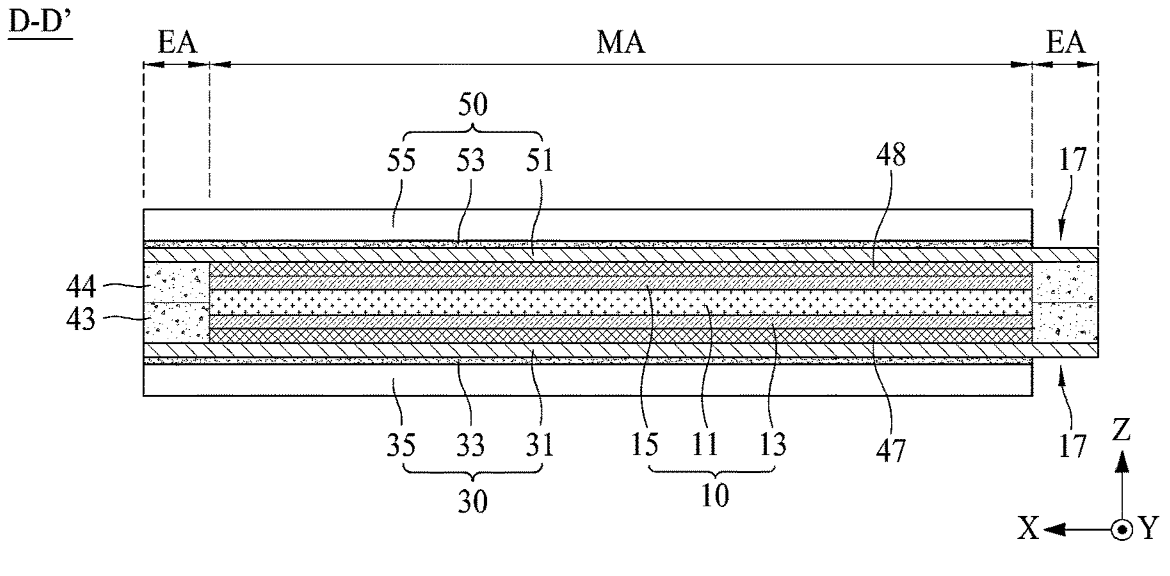
FIG. 21 is a cross-sectional view taken along line D-D' illustrated in FIG. 20.

FIG. 20 illustrates an apparatus according to another embodiment of the present disclosure. FIG. 21 is a cross-sectional view taken along line D-D' illustrated in FIG. 20.

Referring to FIGS. 20 and 21, a vibration apparatus 4 according to another embodiment of the present disclosure may include a vibration portion 10, a first protection member 30, and a second protection member 50.

The first protection member 30 may include a first layer 31, a second layer 35, and a third layer 33. The second protection member 50 may include a first layer 51, a second layer 55, and a third layer 53.

The vibration apparatus 4 according to another embodiment of the present disclosure may include a first region MA and a second region EA surrounding the first region MA. The first region MA may be an inner region MA, but embodiments of the present disclosure are not limited thereto. The second region EA may be an outer region EA, but embodiments of the present disclosure are not limited thereto.

The vibration portion 10 may be provided in the first region MA of the vibration apparatus 4, but embodiments of the present disclosure are not limited thereto. The vibration portion 10 may include a vibration layer 11, a first electrode layer 13, and a second electrode layer 15. The vibration portion 10 may be substantially the same as the vibration portion 10 described above with reference to FIGS. 15 and 16, and thus, its repeated description is omitted.

The first layer 31 of the first protection member 30 and the first layer 51 of the second protection member 50 may be disposed at a first surface and a second surface of the vibration portion 10. The first layers 31 and 51 may have the same size or area as that of the second layers 35 and 55 which are base films or base layers. For example, the first layers 31 and 51 may be disposed on a whole surface including the first region MA and the second region EA of the vibration apparatus 3.

The first layer 31 of the first protection member 30 may be disposed at a first surface of the vibration portion 10 by a third adhesive layer 47 disposed in the first region MA of the vibration apparatus 4 and a first adhesive layer 43 disposed in the second region EA of the vibration apparatus 4. The first adhesive layer 43 may be an insulation adhesive layer. The third adhesive layer 47 may be a conductive adhesive layer. For example, the third adhesive layer 47 may be between the first layer 31 and the vibration portion 10. For example, the third adhesive layer 47 may be between the first layer 31 and the first electrode layer 13. For example, the first layer 31 may be electrically connected to the first electrode layer 13 disposed at a first surface of the vibration layer 11 by the third adhesive layer 47. For example, the first layer 31 may be a portion of a contact portion of the vibration portion 10. The first layer 31 may electrically insulate the other region except an electrical contact portion with the first electrode layer 13 by the first adhesive layer 43 disposed in the second region EA of the first protection member 30.

The first layer 51 of the second protection member 50 may be disposed at a second surface of the vibration portion 10 by a fourth adhesive layer 48 disposed in the first region MA of the vibration apparatus 4 and a second adhesive layer 44 disposed in the second region EA of the vibration apparatus 4. The second adhesive layer 44 may be an insulation adhesive layer. The fourth adhesive layer 48 may be a conductive adhesive layer. For example, the fourth adhesive layer 48 may be between the first layer 51 and the vibration portion 10. For example, the fourth adhesive layer 48 may be between the first layer 51 and the second electrode layer 15. For example, the first layer 51 may be a portion of a contact portion of the vibration portion 10. For example, the first layer 51 may be electrically connected to the second electrode layer 15 disposed at the second surface of the vibration layer 11 by the fourth adhesive layer 48. The first layer 51 may electrically insulate the other region except an electrical contact portion with the second electrode layer 15 by the second adhesive layer 44 disposed in the second region EA of the second protection member 50.

The vibration apparatus 4 according to another embodiment of the present disclosure may further include a pad region 17.

The pad region 17 may be disposed in the second region EA of the vibration apparatus 4. The pad region 17 may be configured at one edge portion or both edge portions of one of the first protection member 30 and the second protection member 50 so as to be electrically coupled to one side (or one end) of each of the first layer 31 of the first protection member 30 electrically connected to the first electrode layer 13 and the first layer 51 of the second protection member 50 electrically connected to the second electrode layer 15.

In the pad region 17 according to another embodiment of the present disclosure, a separate pad electrode may not be provided, and the first layer 31 of the first protection member 30 and the first layer 51 of the second protection member 50 may be configured with first and second pad electrodes.

The pad region 17 according to another embodiment of the present disclosure may be electrically coupled to a signal cable.

Figure 22:
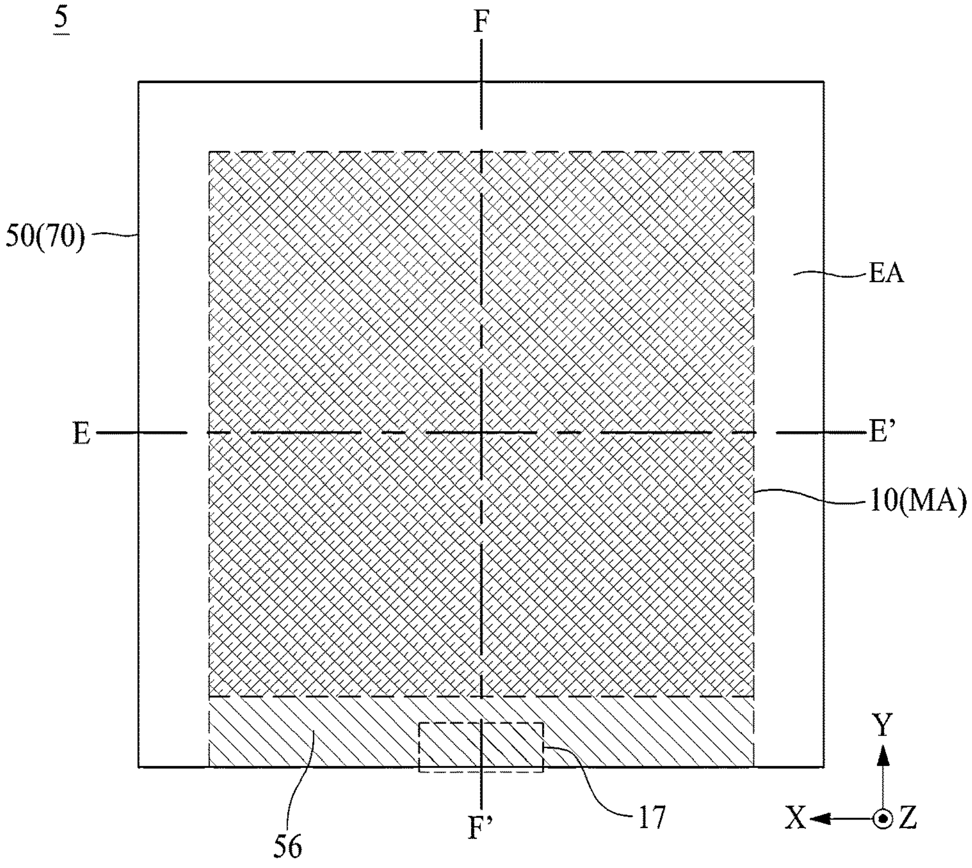
FIG. 22 illustrates an apparatus according to another embodiment of the present disclosure.
Figure 23:
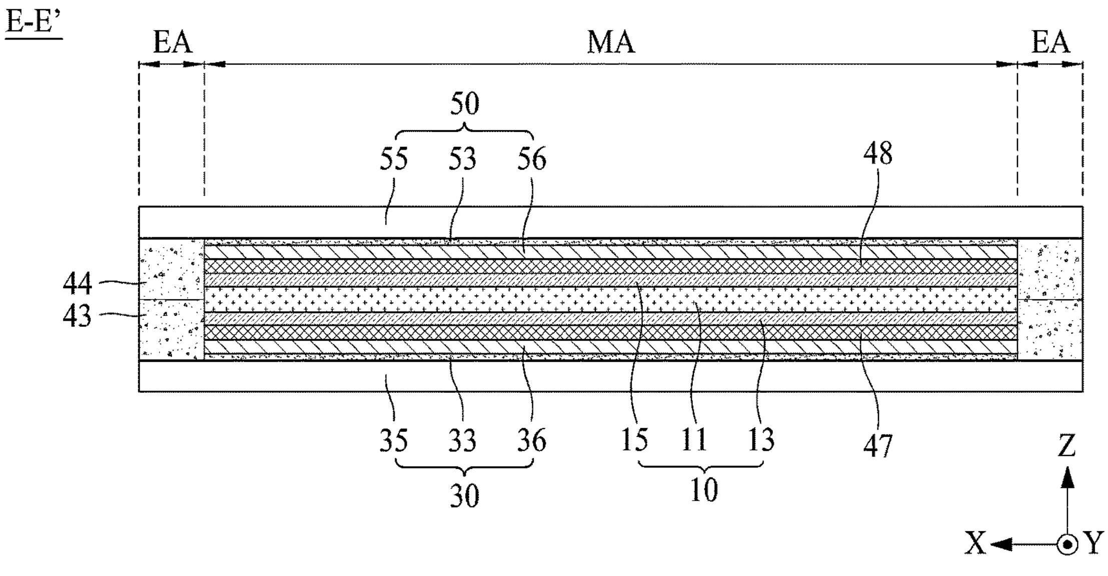
FIG. 23 is a cross-sectional view taken along line E-E' illustrated in FIG. 22.
Figure 24:
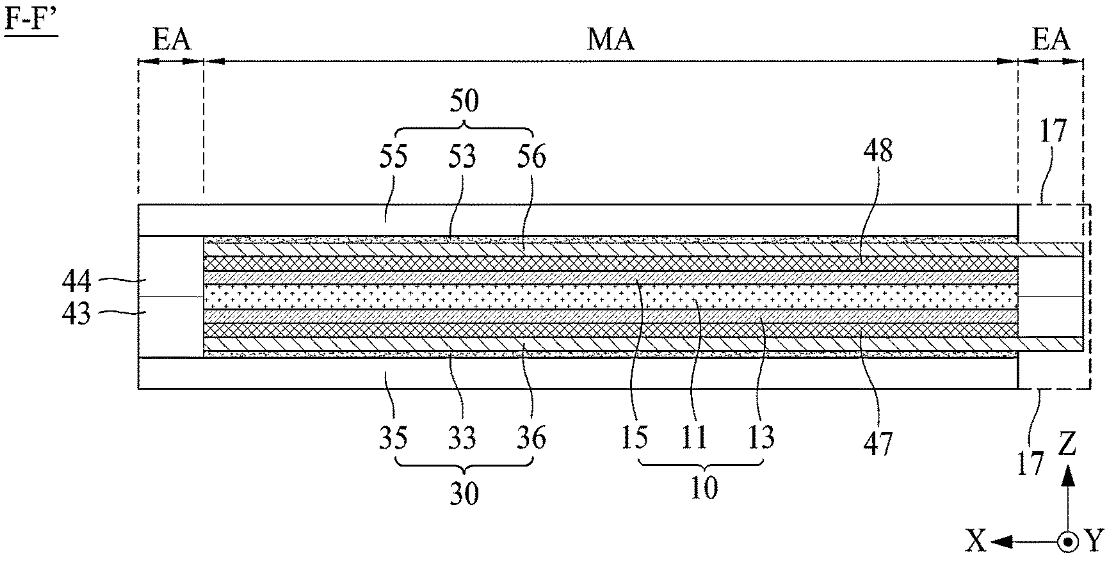
FIG. 24 is a cross-sectional view taken along line F-F' illustrated in FIG. 22.

FIG. 22 illustrates an apparatus according to another embodiment of the present disclosure. FIG. 23 is a cross-sectional view taken along line E-E' illustrated in FIG. 22. FIG. 24 is a cross-sectional view taken along line F-F' illustrated in FIG. 22.

Referring to FIGS. 22 to 24, a vibration apparatus 5 according to another embodiment of the present disclosure may include a vibration portion 10, a first protection member 30, and a second protection member 50.

The vibration apparatus 5 according to another embodiment of the present disclosure may include a first region MA and a second region EA surrounding the first region MA.

The vibration portion 10 may be provided in the first region MA of the vibration apparatus 5, but embodiments of the present disclosure are not limited thereto. The vibration portion 10 may include a vibration layer 11, a first electrode layer 13, and a second electrode layer 15. The vibration portion 10 may be substantially the same as the vibration portion 10 described above with reference to FIGS. 15 and 16, and thus, a repetitive description thereof is omitted.

The first protection member 30 may include the first layer 36, the second layer 35, and the third layer 34, and the second protection member 50 may include the first layer 56, the second layer 55, and the third layer 53.

The first layer 36 of the first protection member 30 and the first layer 56 of the second protection member 50 may be disposed at a first surface and a second surface of the vibration portion 10. The first layers 36 and 56 may have the same size or area as that of the second layers 35 and 55 which are base films or base layers. For example, the first layers 36 and 56 may be partially disposed in the first region MA of the vibration apparatus 5. For example, the first layers 36 and 56 may be partially disposed at a portion overlapping the vibration portion 10.

The first layer 36 of the first protection member 30 may be partially disposed at a portion overlapping a first electrode layer 13 disposed at a first surface of the vibration layer 11. For example, the first layer 36 may be disposed at a first surface of the vibration portion 10 by a third adhesive layer 47 disposed in the first region MA of the vibration apparatus 5. For example, the first layer 36 may be electrically connected to the first electrode layer 13 disposed at the first surface of the vibration layer 11 by the third adhesive layer 47. The first layer 36 may disposed in at least a portion of the second region EA of the first protection member 30. For example, the first layer 36 may not be disposed at the other portion except a portion, where a pad region 17 is disposed, of the second region EA of the first protection member 30. For example, a first adhesive layer 43 disposed in the second region EA of the first protection member 30 may be connected or coupled to the second layer 35. The first layer 36 may electrically insulate the other region except an electrical contact portion with the first electrode layer 13 by the first adhesive layer 43.

The first layer 56 of the second protection member 50 may be partially disposed at a portion overlapping a second electrode layer 15 disposed at a second surface of the vibration layer 11. For example, the first layer 56 may be disposed at a second surface of the vibration portion 10 by a fourth adhesive layer 48 disposed in the first region MA of the vibration apparatus 5. For example, the first layer 56 may be electrically connected to the second electrode layer 15 disposed at the second surface of the vibration layer 11 by the fourth adhesive layer 48. The first layer 56 may be disposed in at least a portion of the second region EA of the second protection member 50. For example, the first layer 56 may not be disposed at the other portion except a portion, where the pad region 17 is disposed, of the second region EA of the second protection member 50. For example, a second adhesive layer 44 disposed in the second region EA of the second protection member 50 may be connected or coupled to the second layer 55. The first layer 56 may electrically insulate the other region except an electrical contact portion with the second electrode layer 15 by the second adhesive layer 44.

The vibration apparatus 5 according to another embodiment of the present disclosure may further include the pad region 17.

The pad region 17 may be disposed in the second region EA of the vibration apparatus 5. The pad region 17 may be configured at one edge portion or both edge portions of one of the first protection member 30 and the second protection member 50 so as to be electrically coupled to one side (or one end) of each of the first layer 36 of the first protection member 30 electrically connected to the first electrode layer 13 and the first layer 56 of the second protection member 50 electrically connected to the second electrode layer 15.

In the pad region 17 according to another embodiment of the present disclosure, a separate pad electrode may not be provided, and the first layer 36 of the first protection member 30 and the first layer 56 of the second protection member 50 may be configured with first and second pad electrodes.

The pad region 17 according to another embodiment of the present disclosure may be electrically coupled to a signal cable.

Figure 25:
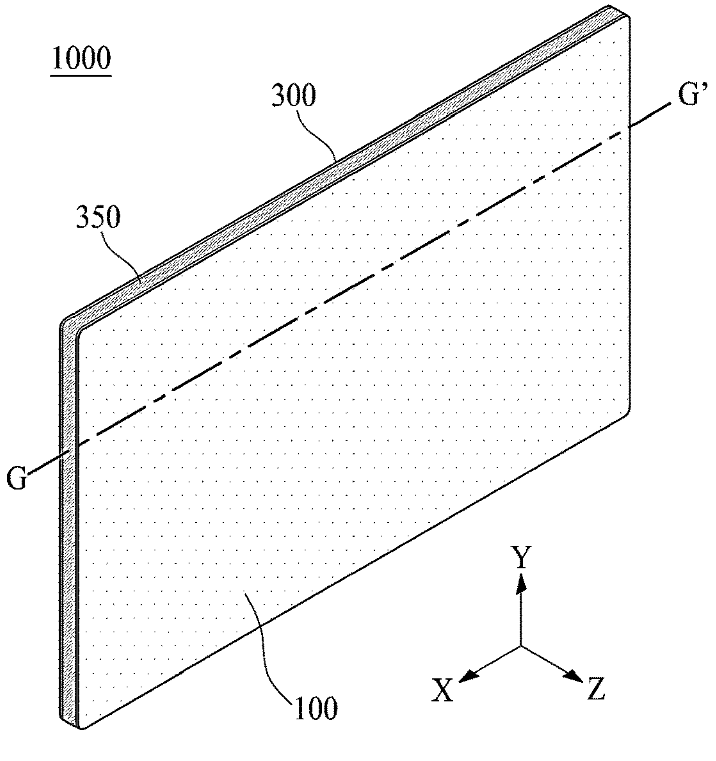
FIG. 25 illustrates an apparatus according to another embodiment of the present disclosure.
Figure 26:
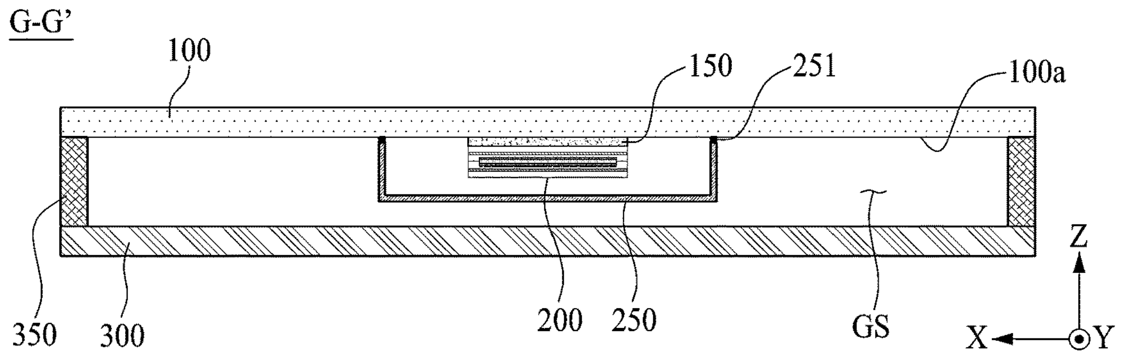
FIG. 26 is a cross-sectional view taken along line G-G' illustrated in FIG. 25.

FIG. 25 illustrates an apparatus according to an embodiment of the present disclosure, and FIG. 26 is a cross-sectional view taken along line G-G' illustrated in FIG. 25.

Referring to FIGS. 25 and 26, the apparatus 1000 according to an embodiment of the present disclosure may include a passive vibration member 100 and one or more vibration generating apparatuses 200.

An "apparatus" according to an embodiment of the present disclosure may be a display apparatus, a sound apparatus, a sound generating apparatus, a sound bar, an analog signage, or a digital signage, but embodiments of the present disclosure are not limited thereto.

A display apparatus may include a display panel, including a plurality of pixels implementing a white-and-black image or a color image, and a driver for driving the display panel. For example, the display panel may be a curved display panel, a variable display panel, or one of all types of display panels such as a liquid crystal display panel, an organic light emitting display panel, a light emitting diode display panel, an electrophoretic display panel, an electro-wetting display panel, a micro light emitting diode display panel, or a quantum dot light emitting display panel, but embodiments of the present disclosure are not limited thereto. For example, the display panel may be a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto. For example, in the organic light emitting display panel, a pixel may include an organic light emitting device such as an organic light emitting layer and may be a subpixel which implements one of a plurality of colors constituting a color image. Therefore, an "apparatus" according to an embodiment of the present disclosure may include a set electronic apparatus or a set device (or a set apparatus), such as a mobile electronic apparatus such as a smartphone or an electronic pad, and an equipment apparatus including a notebook computer, a television (TV), a computer monitor, an automotive apparatus, or a vehicle, which is a complete product (or a final product) including a display panel such as a liquid crystal display panel or an organic light emitting display panel.

The analog signage may be an advertising signboard, a poster, or a guideboard. The analog signage may include content such as a sentence, a picture, and a sign. The content may be disposed to be visible from the passive vibration member 100 of the apparatus. The content may be directly attached on the passive vibration member 100, and a medium such as paper on which content is attached through printing may be attached on the passive vibration member 100.

The passive vibration member 100 may vibrate based on driving (or vibration) of one or more vibration generating apparatuses 200. For example, the passive vibration member 100 may generate one or more of a vibration and a sound based on driving of the one or more vibration generating apparatuses 200.

The passive vibration member 100 according to an embodiment of the present disclosure may be a display panel which includes a display part (or a screen) including a plurality of pixels implementing a white-and-black image or a color image. For example, the image may be an electronic image, a digital image, a still image, or a video image, but embodiments of the present disclosure are not limited thereto. Therefore, the passive vibration member 100 may generate one or more of a vibration and a sound based on driving of the one or more vibration generating apparatuses 200. For example, the passive vibration member 100 may vibrate based on driving of the vibration generating apparatus 200 while displaying an image on the display unit, and thus, may generate or output a sound synchronized with an image in the display unit. For example, the passive vibration member 100 may be a vibration object, a vibration plate, a display member, a display panel, a flexible display panel, a signage panel, a passive vibration plate, a front cover, a front member, a vibration panel, a sound panel, a passive vibration panel, a sound output plate, a sound vibration plate, or an image screen, but embodiments of the present disclosure are not limited thereto.

The passive vibration member 100 according to an embodiment of the present disclosure may be a vibration plate which includes a metal material having a material characteristic which is suitable for vibrating by the one or more vibration generating apparatuses 200 to output a sound, or includes a nonmetal material (or a complex nonmetal material). For example, the passive vibration member 100 may be a vibration plate including one or more materials of metal, plastic, paper, wood, rubber, fiber, cloth, leather, glass, carbon, and mirror. For example, paper may be a cone paper for speakers. For example, the cone paper may be pulp or foam plastic, but embodiments of the present disclosure are not limited thereto.

The passive vibration member 100 according to an embodiment of the present disclosure may include a display panel including a pixel displaying an image, or may include a non-display panel. For example, the passive vibration member 100 may include one or more of a display panel including a pixel displaying an image, a screen panel on which an image is to be projected from a display apparatus, a lighting panel, a signage panel, an interior material of a vehicular apparatus, an exterior material of a vehicular apparatus, a glass window of a vehicular apparatus, a seat interior material of a vehicular apparatus, a ceiling material of a building, an interior material of a building, a glass window of a building, an interior material of an aircraft, a glass window of an aircraft, and a mirror, but embodiments of the present disclosure are not limited thereto. For example, the non-display panel may include a light emitting diode lighting panel (or apparatus), an organic light emitting lighting panel (or apparatus), or an inorganic light emitting lighting panel (or apparatus), but embodiments of the present disclosure are not limited thereto. For example, the passive vibration member 100 may include one or more of a garnish, an A pillar, a door frame, and a roof panel of a vehicular apparatus (or car or a vehicle).

The display panel according to an embodiment of the present disclosure may include a display area which displays an image based on driving of a plurality of pixels. The display panel may include a non-display area which surrounds the display area, but embodiments of the present disclosure are not limited thereto.

The display panel according to an embodiment of the present disclosure may include an anode electrode, a cathode electrode, and a light emitting device and may display an image in a type such as a top emission type, a bottom emission type, or a dual emission type, based on a structure of a pixel array layer including a plurality of pixels. In the top emission type, visible light emitted from the pixel array layer may be irradiated in a forward direction of a base substrate to allow an image to be displayed, and in the bottom emission type, the visible light emitted from the pixel array layer may be irradiated in a rearward direction of the base substrate to allow an image to be displayed.

The display panel according to an embodiment of the present disclosure may include a pixel array portion which is provided in a pixel area defined by a plurality of gate lines and/or a plurality of data lines. The pixel array portion may include a plurality of pixels which display an image, based on signals supplied through signal lines. The signal lines may include a gate line, a data line, and a pixel driving power line, but embodiments of the present disclosure are not limited thereto.

Each of the plurality of pixels may include a pixel circuit layer including a driving thin film transistor (TFT) provided in the pixel area, an anode electrode electrically connected to the driving TFT, a light emitting device provided on the anode electrode, and a cathode electrode electrically connected to the light emitting device.

The driving TFT may be provided in a transistor region of each pixel area provided in a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but embodiments of the present disclosure are not limited thereto.

The anode electrode (or a pixel electrode) may be provided in an opening region provided in each pixel area and may be electrically connected to the driving TFT.

The light emitting device according to an embodiment of the present disclosure may include an organic light emitting device layer provided on the anode electrode. The organic light emitting device layer may be implemented so that pixels emit light of the same color (for example, white light) or emit lights of different colors (for example, red light, green light, and blue light). The cathode electrode (or a common electrode) may be connected to the organic light emitting device layer provided in each pixel area. For example, the organic light emitting device layer may have a stack structure including two or more structures or a single structure including the same color. In another embodiment of the present disclosure, the organic light emitting device layer may have a stack structure including two or more structures including one or more different colors for each pixel. Two or more structures including one or more different colors may be configured in one or more of blue, red, yellow-green, and green, or a combination thereof, but embodiments of the present disclosure are not limited thereto. An example of the combination may include blue and red, red and yellow-green, red and green, and red/yellow-green/green, but embodiments of the present disclosure are not limited thereto. Also, regardless of a stack order thereof, the combination may be applied. A stack structure including two or more structures having the same color or one or more different colors may further include a charge generating layer between two or more structures. The charge generating layer may have a PN junction structure and may include an N-type charge generating layer and a P-type charge generating layer.

According to another embodiment of the present disclosure, the light emitting device may include a micro light emitting diode device which is electrically connected to each of the anode electrode and the cathode electrode. The micro light emitting diode device may be a light emitting diode implemented as an integrated circuit (IC) type or a chip type. The micro light emitting diode device may include a first terminal electrically connected to the anode electrode and a second terminal electrically connected to the cathode electrode. The cathode electrode may be connected to the second terminal of the micro light emitting diode device provided in each pixel area.

An encapsulation portion may be formed on the substrate to surround the pixel array portion, and thus, may prevent oxygen or water from penetrating into the light emitting device layer of the pixel array portion. The encapsulation portion according to an embodiment of the present disclosure may be formed in a multi-layer structure where an organic material layer and an inorganic material layer are alternately stacked, but embodiments of the present disclosure are not limited thereto. The inorganic material layer may prevent oxygen or water from penetrating into the light emitting device layer of the pixel array portion. The organic material layer may be formed to have a thickness which is relatively thicker than that of the inorganic material layer, so as to cover particles occurring in a manufacturing process. For example, the encapsulation portion may include a first inorganic layer, an organic layer on the first inorganic layer, and a second inorganic layer on the organic layer. The organic layer may be a particle covering layer, but the terms are not limited thereto. A touch panel may be disposed on the encapsulation portion, or may be disposed at a rear surface of the pixel array portion or in the pixel array portion.

The display panel according to an embodiment of the present disclosure may include a first substrate, a second substrate, and a liquid crystal layer. The first substrate may be an upper substrate or a TFT array substrate. For example, the first substrate may include a pixel array (or a display portion or a display area) including a plurality of pixels provided in a pixel area configured by the plurality of gate lines and/or the plurality of data lines. Each of the plurality of pixels may include a TFT connected to a gate line and/or a data line, a pixel electrode connected to the TFT, and a common electrode which is formed to be adjacent to the pixel electrode and is supplied with a common voltage.

The first substrate may further include a pad portion provided at a first edge (or a non-display portion or a first periphery) thereof and a gate driving circuit provided at a second edge (or a second non-display portion or a second periphery) thereof.

The pad portion may supply the pixel array portion and/or the gate driving circuit with a signal supplied from the outside. For example, the pad portion may include a plurality of data pads connected to the plurality of data lines through a plurality of data link lines and/or a plurality of gate input pads connected to the gate driving circuit through a gate control signal line. For example, a size of the first substrate may be greater than that of the second substrate, but the terms are not limited thereto.

The gate driving circuit may be embedded (or integrated) into the second edge (or a second periphery) of the first substrate so as to be connected to the plurality of gate lines. For example, the gate driving circuit may be implemented with a shift register including a transistor formed by the same process as a TFT provided in the pixel area. According to another embodiment of the present disclosure, the gate driving circuit may not be embedded into the first substrate and may be provided in a panel driving circuit in an IC type.

The second substrate may be a lower substrate or a color filter array substrate. For example, the second substrate may include a pixel pattern (or a pixel definition pattern) capable of including an opening region overlapping the pixel area formed in the first substrate and a color filter layer formed in the opening region. The second substrate may have a size which is less than that of the first substrate, but embodiments of the present disclosure are not limited thereto. The second substrate may overlap the other portion, except the first edge (or the first periphery), of the first substrate. The second substrate may be bonded to the other portion, except the first edge, of the first substrate by a sealant with the liquid crystal layer therebetween.

The liquid crystal layer may be disposed between the first substrate and the second substrate. The liquid crystal layer may include liquid crystal where an alignment direction of liquid crystal molecules is changed based on an electrical field generated by the common voltage and a data voltage applied to the pixel electrode for each pixel.

A second polarization member may be attached on a bottom surface (or a lower surface) of the second substrate and may polarize light which is incident from a backlight and travels to the liquid crystal layer. The first polarization member may be attached on a top surface (or an upper surface) of the first substrate and may polarize light which passes through the first substrate and is discharged to the outside.

The display panel according to an embodiment of the present disclosure may drive the liquid crystal layer with the electrical field which is generated by the common voltage and the data voltage applied to each pixel, thereby displaying an image based on light passing through the liquid crystal layer.

In the display panel according to another embodiment of the present disclosure, the first substrate may be a color filter array substrate, and the second substrate may be a TFT array substrate. For example, the display panel according to another embodiment of the present disclosure may have a form where the display panel according to an embodiment of the present disclosure is vertically reversed. In this case, a pad portion of the display panel according to another embodiment of the present disclosure may be covered by a separate mechanism.

The display panel according to another embodiment of the present disclosure may include a bending portion which is bent or curved to have a certain curvature radius or a curved shape.

The bending portion of the display panel may be implemented at one or more of one edge portion (or one periphery portion) and the other edge portion (or the other periphery portion) of the display panel parallel to each other. The one edge portion (or one periphery portion) and the other edge portion (or the other periphery portion) of the display panel implementing the bending portion may include only the non-display area, or may include an edge portion (or a periphery portion) of the display area and the non-display area. The display panel including a bending portion implemented by bending of the non-display area may have a one-side bezel bending structure or a both-side bezel bending structure. Also, the display panel including the edge portion (or the periphery portion) of the display area and the bending portion implemented by bending of the non-display area may have a one-side active bending structure or a both-side active bending structure.

According to an embodiment of the present disclosure, the vibration generating apparatus 200 may vibrate based on a vibration driving signal synchronized with an image displayed by a display panel, thereby vibrating the display panel which is a passive vibration member 100. According to another embodiment of the present disclosure, the vibration generating apparatus 200 may vibrate based on a haptic feedback signal (or a tactile feedback signal) synchronized with a user touch applied to a touch panel (or a touch sensor layer) which is disposed on the display panel or embedded into the display panel, and thus, may vibrate the display panel. Accordingly, the display panel may vibrate based on a vibration of the vibration generating apparatus 200 to provide a user (or a viewer) with one or more of a sound and a haptic feedback.

The apparatus 1000 or the vibration generating apparatus 200 according to an embodiment of the present disclosure may be implemented to have a size corresponding to the display area of the display panel or the passive vibration member 100. A size of the vibration generating apparatus 200 may be 0.9 to 1.1 times a size of the display area or the passive vibration member 100, but embodiments of the present disclosure are not limited thereto. For example, a size of the vibration generating apparatus 200 may be the same as or smaller than the size of the display area or the passive vibration member 100. For example, a size of the vibration generating apparatus 200 may be the same as or approximately same as the display area of the display panel or the passive vibration member 100, and thus, the vibration generating apparatus 200 may cover a most region of the display panel or the passive vibration member 100 and a vibration generated by the vibration generating apparatus 200 may vibrate a whole portion of the display panel or the passive vibration member 100, and thus, localization of a sound may be high, and satisfaction of a user may be improved. Also, a contact area (or panel coverage) between the display panel or the passive vibration member 100 and the vibration generating apparatus 200 may increase, and thus, a vibration region of the display panel or the passive vibration member 100 may increase, thereby improving a sound of a middle-low-pitched sound band generated based on a vibration of the display panel or the passive vibration member 100. Also, a vibration generating apparatus 200 applied to a large-sized display apparatus may vibrate the entire display panel or the passive vibration member 100 having a large size (or a large area), and thus, localization of a sound based on a vibration of the display panel or the passive vibration member 100 may be further enhanced, thereby realizing an improved sound effect. Accordingly, the apparatus 1000 according to an embodiment of the present disclosure may be disposed at the rear surface of the display panel or the passive vibration member 100 to sufficiently vibrate the display panel or the passive vibration member 100 in a vertical (or forward and rearward) direction, thereby outputting a desired sound in a forward direction of the apparatus 1000.

Because the vibration generating apparatus 200 is implemented as a film type, the vibration generating apparatus 200 may have a thickness which is thinner than the display panel or the passive vibration member 100, thereby reducing or minimizing an increase in thickness of the apparatus caused by the arrangement of the vibration generating apparatus 200. For example, the vibration generating apparatus 200 may be referred to as a vibration apparatus, a displacement apparatus, a sound apparatus, a sound generating module, a sound generating apparatus, a film actuator, a film type piezoelectric composite actuator, a film speaker, a film type piezoelectric speaker, or a film type piezoelectric composite speaker, which uses the display panel or the passive vibration member 100 as a vibration plate or a sound vibration plate, but the terms are not limited thereto.

According to another embodiment of the present disclosure, the vibration generating apparatus 200 may not be disposed at the rear surface of the display panel and may be applied to a non-display panel instead of the display panel. For example, the vibration generating apparatus 200 may be applied to the non-display panel such as wood, plastic, glass, metal, cloth, fiber, rubber, paper, mirror, carbon, leather, an interior material of a vehicle, a ceiling material of a building, and an interior material of an aircraft, but embodiments of the present disclosure are not limited thereto. In this case, the non-display panel may be applied as a vibration plate, and the vibration generating apparatus 200 may vibrate the non-display panel to output a sound.

The apparatus 1000 or the vibration generating apparatus 200 according to an embodiment of the present disclosure may be disposed at a rear surface of the passive vibration member 100 or the display panel to overlap a display area of the display panel or the passive vibration member 100. For example, the apparatus 1000 or the vibration generating apparatus 200 may overlap half or more of the passive vibration member 100 or half or more of the display area of the display panel. According to another embodiment of the present disclosure, the apparatus 1000 or the vibration generating apparatus 200 may overlap all of the passive vibration member 100 or all of the display area of the display panel.

According to another embodiment of the present disclosure, a plate may be further provided in the vibration generating apparatus 200. For example, the plate may be disposed on a front surface and/or a rear surface of the vibration generating apparatus 200. The plate may include a metal material or may include one or more single nonmetal or composite nonmetal materials of wood, rubber, plastic, glass, fiber, cloth, paper, mirror, carbon, and leather, but embodiments of the present disclosure are not limited thereto. For example, each of the vibration generating apparatus 200 and the plate may have the same size, but embodiments of the present disclosure are not limited thereto.

The plate according to an embodiment of the present disclosure may increase a weight of the vibration generating apparatus 200 to decrease a lowest resonance frequency (or a lowest natural frequency) of the vibration generating apparatus 200. Therefore, the vibration generating apparatus 200 may vibrate at a relatively low frequency due to a reduction in a lowest resonance frequency (or a lowest natural frequency) caused by an increase in weight caused by the plate. Accordingly, a sound characteristic and/or a sound pressure level characteristic of the low-pitched sound band generated based on a vibration of the vibration generating apparatus 200 may be enhanced. For example, the plate may be a resonance pad, a mass member, a weight, a weight member, a supporting plate, a stiff plate, a transfer plate, a middle plate, or a vibration transfer plate, but embodiments of the present disclosure are not limited thereto. For example, the low-pitched sound band may be 300 Hz or 500 Hz or less, but embodiments of the present disclosure are not limited thereto.

When an alternating current (AC) voltage is applied, the vibration generating apparatus 200 according to an embodiment of the present disclosure may alternately contract and/or expand based on an inverse piezoelectric effect and may vibrate the display panel or the passive vibration member 100 based on a vibration. For example, the vibration generating apparatus 200 may vibrate based on a vibration driving signal synchronized with an image displayed by the display panel to vibrate the display panel. According to another embodiment of the present disclosure, the vibration generating apparatus 200 may vibrate based on a haptic feedback signal (or a tactile feedback signal) synchronized with a user touch applied to a touch panel (or a touch sensor layer) which is disposed on the display panel or embedded into the display panel, and thus, may vibrate the display panel. Accordingly, the display panel may vibrate based on a vibration of the vibration generating apparatus 200 to provide a user (or a viewer) with one or more of a sound and a haptic feedback.

Therefore, the apparatus 1000 according to an embodiment of the present disclosure may output a sound, generated by a vibration of the display panel or the passive vibration member 100 based on a vibration of the vibration generating apparatus 200, in a forward direction of the display panel or the passive vibration member 100. Also, the apparatus 1000 according to an embodiment of the present disclosure may vibrate a large region of the display panel or the passive vibration member 100 by the vibration generating apparatus 200 of a film type, thereby more enhancing a sense of sound localization and a sound pressure level characteristic of a sound based on a vibration of the display panel or the passive vibration member 100.

The one or more vibration generating apparatuses 200 may be configured to vibrate the passive vibration member 100. The one or more vibration generating apparatuses 200 may be configured to be connected to a rear surface 100*a* of the passivation vibration member 100 by the connection member 150. Accordingly, the one or more vibration generating apparatuses 200 may vibrate the passive vibration member 100, and thus, may generate or output one or more of a vibration and a sound based on a vibration of the passive vibration member 100.

The one or more vibration generating apparatuses 200 may include one or more of the vibration apparatuses 1 to 5 described above with reference to FIGS. 1 to 24. Therefore, descriptions of the vibration apparatuses 1 to 5 illustrated in FIGS. 1 to 24 may be included in a description of the vibration generating apparatus 200 illustrated in FIGS. 25 and 26, and thus, like reference numerals refer to like elements and repeated descriptions thereof may be omitted.

The connection member 150 may be disposed between the passive vibration member 100 and at least a portion of the vibration generating apparatus 200. The connection member 150 may be connected between the passive vibration member 100 and at least a portion of the vibration generating apparatus 200. The connection member 150 according to an embodiment of the present disclosure may be connected between the passive vibration member 100 and a center portion of the vibration generating apparatus 200 except an edge portion of the vibration generating apparatus 200. For example, the connection member 150 may be connected between the passive vibration member 100 and the center portion of the vibration generating apparatus 200 based on the partial attachment scheme. The center portion of the vibration generating apparatus 200 may be a portion which is a center of a vibration, and thus, a vibration of the vibration generating apparatus 200 may be efficiently transferred to the passive vibration member 100 through the connection member 150. The connection member 150 may be connected to or attached on a whole front surface of each of the one or more vibration generating apparatuses 200 and a rear surface 100*a* of the passive vibration member 100 based on an entire surface attachment scheme, but embodiments of the present disclosure are not limited thereto.

The connection member 150 according to an embodiment of the present disclosure may include a material including an adhesive layer which is good in adhesive force or attaching force, with respect to each of a rear surface of the passive vibration member 100 or a display panel and the one or more vibration generating apparatuses 200. For example, the connection member 150 may include a foam pad, a double-sided tape, or an adhesive, but is not limited thereto. For example, the adhesive layer of the connection member 150 may include epoxy, acryl, silicone, or urethane, but is not limited thereto. For example, the adhesive layer of the connection member 150 may include an acryl-based material, having a characteristic where an adhesive force is relatively good and hardness is high, among acryl and urethane. Accordingly, a vibration of each of the one or more vibration generating apparatuses 200 may be well transferred to the passive vibration member 100.

The apparatus according to an embodiment of the present disclosure may include a supporting member 300 and a coupling member 350.

The supporting member 300 may be disposed at the rear surface 100*a* of the passive vibration member 100. The supporting member 300 may be disposed at the rear surface 100*a* of the passive vibration member 100 to cover the vibration generating apparatus 200. The supporting member 300 may be disposed at the rear surface 100*a* of the passive vibration member 100 to cover all of the vibration generating apparatus 200 and the rear surface 100*a* of the passive vibration member 100. For example, the supporting member 300 may have the same size as that of the passive vibration member 100. For example, the supporting member 300 may cover the whole rear surface of the passive vibration member 100 with the vibration generating apparatus 200 and a gap space GS therebetween. The gap space GS may be provided by the coupling member 350 disposed between the passive vibration member 100 and the supporting member 300 facing each other. The gap space GS may be referred to as an air gap, an accommodating space, a vibration space, or a sound box, but embodiments of the present disclosure are not limited thereto.

The supporting member 300 may include one material of a glass material, a metal material, and a plastic material. The supporting member 300 may include a stack structure where one or more materials of a glass material, a metal material, and a plastic material are stacked.

Each of the passive vibration member 100 and the supporting member 300 may have a square shape or a rectangular shape, but embodiments of the present disclosure are not limited thereto. For example, each of the passive vibration member 100 and the supporting member 300 may have a polygonal shape, a non-polygonal shape, a circular shape, or an oval shape. For example, when the apparatus according to an embodiment of the present disclosure is applied to a sound apparatus or a sound bar, each of the passive vibration member 100 and the supporting member 300 may have a rectangular shape where a long-side length is twice or more times a short-side length, but embodiments of the present disclosure are not limited thereto.

The coupling member 350 may be configured to be connected between a rear edge portion of the passive vibration member 100 and a front edge portion of the supporting member 300, and thus, may provide the gap space GS between the passive vibration member 100 and the supporting member 300 facing each other.

The coupling member 350 according to an embodiment of the present disclosure may include an elastic material which has adhesive properties and is capable of compression and decompression. For example, the coupling member 350 may include a double-sided tape, a single-sided tape, or a double-sided adhesive foam pad, but embodiments of the present disclosure are not limited thereto. For example, the coupling member 350 may include an elastic pad such as a silicone pad or a rubber pad, which has adhesive properties and is capable of compression and decompression. For example, the coupling member 350 may be formed of an elastomer.

According to another embodiment of the present disclosure, the supporting member 300 may further include a sidewall portion which supports a rear edge portion of the passive vibration member 100. The sidewall portion of the supporting member 300 may protrude or may be bent toward the rear edge portion of the passive vibration member 100 from a front edge portion of the supporting member 300, and thus, may provide the gap space GS between the passive vibration member 100 and the supporting member 300. In this case, the coupling member 350 may be configured to be connected between the sidewall portion of the supporting member 300 and the rear edge portion of the passive vibration member 100. Accordingly, the supporting member 300 may cover the one or more vibration generating apparatuses 200 and may support the rear surface of the passive vibration member 100. For example, the supporting member 300 may cover the one or more vibration generating apparatuses 200 and may support the rear surface of the passive vibration member 100.

According to another embodiment of the present disclosure, the passive vibration member 100 may further include a sidewall portion which is connected to the front edge portion of the supporting member 300. The sidewall portion of the passive vibration member 100 may protrude or may be bent toward the front edge portion of the supporting member 300 from the rear edge portion of the passive vibration member 100, and thus, may provide the gap space GS between the passive vibration member 100 and the supporting member 300. The stiffness of the passive vibration member 100 may increase based on the sidewall portion. In this case, the coupling member 350 may be configured to be connected between the sidewall portion of the passive vibration member 100 and the rear edge portion of the supporting member 300. Accordingly, the supporting member 300 may cover the one or more vibration generating apparatuses 200 and may support the rear surface 100*a* of the passive vibration member 100. For example, the supporting member 300 may cover the one or more vibration generating apparatuses 200 and may support the rear edge portion of the passive vibration member 100.

The apparatus according to an embodiment of the present disclosure may further include one or more enclosures 250.

The enclosure 250 may individually cover the one or more vibration generating apparatuses 200. For example, the enclosure 250 may be connected or coupled to the rear edge portion of the passive vibration member 100. For example, the enclosure 250 may be connected or coupled to the rear surface 100*a* of the passive vibration member 100 by a coupling member 251. The enclosure 250 may configure a sealed space, which covers or surrounds the one or more vibration generating apparatuses 200, in the rear surface 100*a* of the passive vibration member 100. For example, the sealed space may be an air gap, a vibration space, a sound space, or a sound box, but embodiments of the present disclosure are not limited thereto. For example, the enclosure 250 may be a sealed member, a sealed cap, a sealed box, or a sound box, but embodiments of the present disclosure are not limited thereto.

The enclosure 250 may include one or more materials of a metal material or a nonmetal material (or a complex nonmetal material). For example, the enclosure 250 may include one or more materials of a metal material, plastic, and wood, but embodiments of the present disclosure are not limited thereto.

The enclosure 250 according to an embodiment of the present disclosure may maintain a constant impedance component based on air acting on the passive vibration member 100 when the passive vibration member 100 or the vibration generating apparatus 200 is vibrating. For example, air near the passive vibration member 100 may resist a vibration of the passive vibration member 100 and may act as an impedance component having a reactance component and a resistance varying based on a frequency. Therefore, the enclosure 250 may configure a sealed space, surrounding the one or more vibration generating apparatuses 200, in the rear surface 100*a* of the passive vibration member 100, and thus, may maintain an impedance component (or an air impedance or an elastic impedance) acting on the passive vibration member 100 based on air, thereby enhancing a sound characteristic and/or a sound pressure level characteristic of a low-pitched sound band and enhancing the quality of a sound of a high-pitched sound band.

Figure 27:
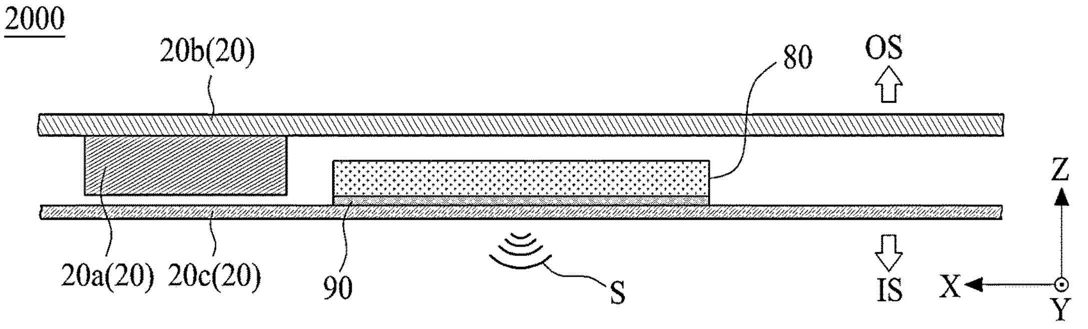
FIG. 27 illustrates an apparatus according to another embodiment of the present disclosure.

FIG. 27 illustrates an apparatus according to another embodiment of the present disclosure.

Referring to FIG. 27, an apparatus 2000 according to another embodiment of the present disclosure may implement a vehicular vibration apparatus, a vehicular vibration generating apparatus, a vehicular sound apparatus, a vehicular sound generating apparatus, a vehicular speaker, a sound apparatus for vehicles, a sound generating apparatus for vehicles, or a speaker for vehicles.

The apparatus 2000 according to another embodiment of the present disclosure may include one or more vibration generating apparatuses 80 which are configured to output a sound to one or more of an indoor space IS and an outdoor space OS of a vehicular apparatus 20.

The vehicular apparatus 20 may include one or more seats and one or more glass windows. For example, the vehicular apparatus 20 may include a vehicle, a train, a ship, or an aircraft, but embodiments of the present disclosure are not limited thereto.

The vehicular apparatus 20 according to another embodiment of the present disclosure may include a main structure material 20*a*, an exterior material 20*b*, and an interior material 20*c*.

The main structure material (or a frame structure material) 20*a* may include a main frame, a sub-frame, a side frame, a door frame, an under frame, and a seat frame, but embodiments of the present disclosure are not limited thereto.

The exterior material 20*b* may be configured to cover the main structure material 20*a*. For example, the exterior material 20*b* may be configured to cover an outer portion of the main structure material 20*a*. The exterior material 20*b* according to an embodiment of the present disclosure may include a hood panel, a front fender panel, a dash panel, a pillar panel, a trunk panel, a roof panel, a floor panel, a door inner panel, and a door outer panel, but embodiments of the present disclosure are not limited thereto. The exterior material 20*b* according to an embodiment of the present disclosure may include one or more of a flat portion and a curved portion. For example, the exterior material 20*b* may have a surface structure corresponding to a surface structure of a corresponding mains structure material 20*a*, or may have a surface structure which differs from the surface structure of the corresponding mains structure material 20*a*.

The interior material 20*c* may include all elements configuring an inner structure of the vehicular apparatus 20, or may include all elements disposed in the indoor space IS of the vehicular apparatus 20. For example, the interior material 20*c* may be an interior member or an inner finishing member of the vehicular apparatus 20, but embodiments of the present disclosure are not limited thereto.

The interior material 20*c* according to an embodiment of the present disclosure may be configured to be exposed at the indoor space IS of the vehicular apparatus 20 while covering one or more of the main structure material 20*a* and the exterior material 20*b* in the indoor space IS of the vehicular apparatus 20. For example, the interior material 20*c* may include a dash board, a pillar interior material (or a pillar trim), a floor interior material (or a floor carpet), a roof interior material (or a headliner), a door interior material (or a door trim), a handle interior material (or a steering cover), a seat interior material, a rear package interior material (or a backseat shelf), an overhead console (or an indoor illumination interior material), a rear view mirror, a glove box, and a sun visor, but embodiments of the present disclosure are not limited thereto. For example, the vibration generating apparatus 80 may vibrate one or more of a dash board, a pillar interior material, a floor interior material, a roof interior material, a door interior material, a handle interior material, a seat interior material, or a rear package interior material.

The interior material 20*c* according to an embodiment of the present disclosure may include one or more of plastic, fiber, leather, cloth, wood, carbon, and metal, but embodiments of the present disclosure are not limited thereto.

According to another embodiment of the present disclosure, the interior material 20*c* may include a base member and a surface member. For example, the base member may be an injection material, a first interior material, an inner interior material, or a rear interior material, but embodiments of the present disclosure are not limited thereto. The surface member may be a second interior material, an outer interior material, a front interior material, an outer surface member, a reinforcement member, or a decoration member, but embodiments of the present disclosure are not limited thereto.

The interior material 20*c* or the base member may include a plastic material. For example, the interior material 20*c* or the base member may be an injection material which is implemented by an injection process using thermosetting resin or thermoplastic resin, but embodiments of the present disclosure are not limited thereto.

The interior material 20*c* or the base member may be configured to cover one or more of the main structure material 20*a* and the exterior material 20*b* in the indoor space IS of the vehicular apparatus 20. For example, the interior material 20*c* or the base member may be configured to cover one surface (or an internal surface) of at least one of a main frame, a side frame, a door frame, and a handle frame, which are exposed at the indoor space IS of the vehicular apparatus 20.

The surface member may be disposed to cover the base member. The surface member may be configured to be exposed at the indoor space IS while covering the base member in the indoor space IS of the vehicular apparatus 20. For example, the surface member may be disposed on or coupled to a front surface of the base member exposed at the indoor space IS of the vehicular apparatus 20. For example, the surface member may include one or more of plastic, fiber, leather, cloth, wood, carbon, and metal, but embodiments of the present disclosure are not limited thereto.

The interior material 20*c* or the outer surface member including a fiber material may include one or more of synthetic fiber, carbon fiber (or aramid fiber), and natural fiber. For example, the interior material 20*c* or the outer surface member including a fiber material may include a fabric sheet, a knitting sheet, or a nonwoven fabric, but embodiments of the present disclosure are not limited thereto. For example, the interior material 20*c* or the outer surface member including a fiber material may be a fabric member, but embodiments of the present disclosure are not limited thereto. The synthetic fiber may be thermoplastic resin and may include polyolefin-based fiber which is an eco-friendly material which does not relatively emit a harmful material, but embodiments of the present disclosure are not limited thereto. For example, the polyolefin-based fiber may include polyethylalene fiber, polypropylene fiber, or polyethylene terephthalate fiber, but embodiments of the present disclosure are not limited thereto. The polyolefin-based fiber may be fiber including single resin or fiber having a core-shell structure. The natural fiber may be one of jute fiber, Kenaf fiber, Abaca fiber, coconut fiber, and wood fiber or mixed fiber of two or more fibers thereof, but embodiments of the present disclosure are not limited thereto.

One or more vibration generating apparatuses 80 may be configured to output a sound between the exterior material 20*b* and the interior material 20*c*. For example, the one or more vibration generating apparatuses 80 may be disposed between the exterior material 20*b* and the interior material 20*c* and may directly or indirectly vibrate one or more of the exterior material 20*b* and the interior material 20*c* to output a sound. Accordingly, one or more of the exterior material 20*b* and the interior material 20*c* may be a vibration member or a passive vibration member which generates or outputs a sound.

The one or more vibration generating apparatuses 80 may be coupled to or attached on the exterior material 20*b* or the interior material 20*c* in a space between the exterior material 20*b* and the interior material 20*c*. One or more of the exterior material 20*b* and the interior material 20*c* of the vehicular apparatus 20 may be a vibration plate, a sound vibration plate, or a sound generating plate for outputting a sound. For example, each of the exterior material 20*b* and the interior material 20*c* for outputting a sound may have a size which is greater than that of each of the one or more vibration generating apparatuses 80, and thus, a sound characteristic and/or a sound pressure level characteristic of the low-pitched sound band generated based on a vibration of each of the one or more vibration generating apparatuses 80 may be enhanced. For example, a frequency of a sound of the low-pitched sound band may be 500 Hz or less, but embodiments of the present disclosure are not limited thereto.

The one or more vibration generating apparatuses 80 according to an embodiment of the present disclosure may output a sound between the exterior material 20*b* and the interior material 20*c* of the vehicular apparatus 20. For example, the one or more vibration generating apparatuses 80 may be coupled to or attached on one or more of the exterior material 20*b* and the interior material 20*c* between the exterior material 20*b* and the interior material 20*c* and may directly or indirectly vibrate one or more of the exterior material 20*b* and the interior material 20*c* to output a sound.

The one or more vibration generating apparatuses 80 according to an embodiment of the present disclosure may be configured to include the vibration apparatuses 1 to 5 described above with reference to FIGS. 1 to 24. Accordingly, repetitive descriptions of the one or more vibration generating apparatuses 80 are omitted.

The one or more vibration generating apparatuses 80 may be coupled to or attached on the exterior material 20*b* or the interior material 20*c* in a space between the exterior material 20*b* and the interior material 20*c* by g a coupling member 90. The apparatus 2000 according to another embodiment of the present disclosure may vibrate the interior material 20*c* based on a vibration of the vibration generating apparatus 80 to output a sound to one or more of the indoor space IS and the outdoor space OS of the vehicular apparatus 20.

The apparatus 2000 according to another embodiment of the present disclosure may indirectly or directly vibrate one or more of the exterior material 20*b* and the interior material 20*c* of the vehicular apparatus 20 on the basis of a vibration of the vibration generating apparatus 80 to output a sound to one or more of the indoor space IS and the outdoor space OS of the vehicular apparatus 20.

Figure 28:
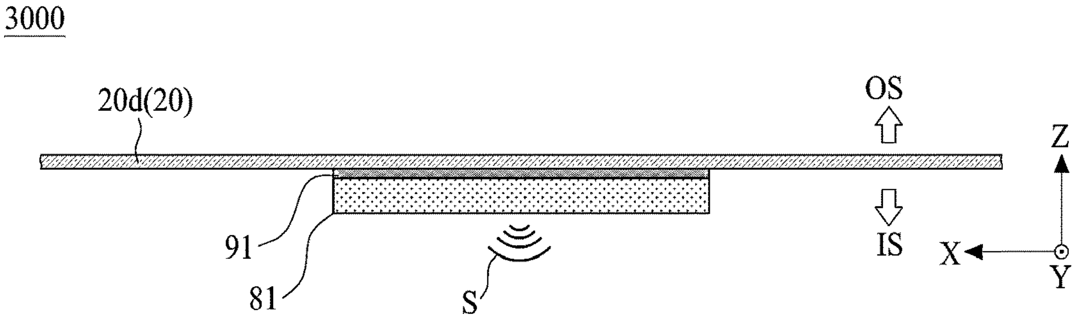
FIG. 28 illustrates an apparatus according to another embodiment of the present disclosure.

FIG. 28 illustrates an apparatus according to another embodiment of the present disclosure.

Referring to FIG. 28, an apparatus 3000 according to another embodiment of the present disclosure may include one or more vibration generating apparatuses 81 which are disposed in a glass window 20*d* of a vehicular apparatus 20 to output a sound.

The glass window 20*d* of the vehicular apparatus 20 may be one or more of a front glass window and a side glass window. Also, the glass window 20*d* of the vehicular apparatus 20 may further include one or more of a rear glass window and a roof glass window, but embodiments of the present disclosure are not limited thereto.

The glass window 20*d* according to an embodiment of the present disclosure may be configured to be wholly transparent. The glass window 200*d* according to another embodiment of the present disclosure may include a transparent portion and a semitransparent portion surrounding the transparent portion. The glass window 200*d* according to another embodiment of the present disclosure may include a transparent portion and an opaque portion surrounding the transparent portion.

The one or more vibration generating apparatuses 81 may be configured to be transparent or semitransparent. For example, when the glass window 20*d* is wholly transparent, the one or more vibration generating apparatuses 81 may be configured to be transparent and may be disposed in a middle region or a peripheral region of the glass window 20*d*. When the glass window 20*d* includes a semitransparent portion or an opaque portion, the one or more vibration generating apparatuses 81 may be configured to be semitransparent or opaque and may be disposed at the semitransparent portion or the opaque portion of the glass window 20*d*. For example, the one or more vibration generating apparatuses 81 may be referred to as the terms such as a transparent vibration generating apparatus or a transparent sound generating apparatus, but embodiments of the present disclosure are not limited thereto.

The one or more vibration generating apparatuses 81 may be connected or coupled to one surface (or an indoor surface) of the glass window 20*d* exposed at the indoor space IS of the vehicular apparatus 20. For example, the one or more vibration generating apparatuses 81 may be disposed in one or more of a front glass window and a side glass window and may be additionally disposed in one or more of a rear glass window and a roof glass window.

The one or more vibration generating apparatuses 81 may indirectly or directly vibrate the glass window 20*d* to output a sound. For example, the one or more vibration generating apparatuses 81 may output a sound to the indoor space IS based on a self-vibration to output a sound to the indoor space IS.

The one or more vibration generating apparatuses 81 according to an embodiment of the present disclosure may include the vibration apparatuses described above with reference to FIGS. 1 to 24 and may be configured to be transparent, semitransparent, or opaque. For example, the vibration apparatuses 1 to 5 described above with reference to FIGS. 1 to 24 may be configured to be transparent, semitransparent, or opaque, and thus, repetitive descriptions thereof may be omitted.

The one or more vibration generating apparatuses 81 according to an embodiment of the present disclosure may be coupled to or attached on one surface (or an indoor space) of the glass window 20*d* by a coupling member 91. The apparatus 3000 according to another embodiment of the present disclosure may vibrate the glass window 20*d* based on a vibration of the vibration generating apparatus 81 to output a sound to one or more of the indoor space IS and the outdoor space OS of the vehicular apparatus 20.

According to another embodiment of the present disclosure, the one or more vibration generating apparatuses 81 may be covered by an optical film which is attached on the one surface (or the indoor space) of the glass window 20*d*. The optical film may be attached on the one surface (or the indoor space) of the glass window 20*d* to cover the one or more vibration generating apparatuses 81, and thus, may protect the one or more vibration generating apparatuses 81 or may fix the one or more vibration generating apparatuses 81 to the glass window 20*d*. For example, the optical film may include one or more of an UV blocking film which blocks UV, a light blocking film which blocks light, and a heat blocking film which blocks heat, but embodiments of the present disclosure are not limited thereto.

Accordingly, the apparatus 3000 according to another embodiment of the present disclosure may be connected to the glass window 20*d* to self-vibrate, or may output a sound S to one or more of the indoor space IS and the outdoor space OS of the vehicular apparatus 20 by the glass window 20*d* as a sound vibration plate.

Figure 29:
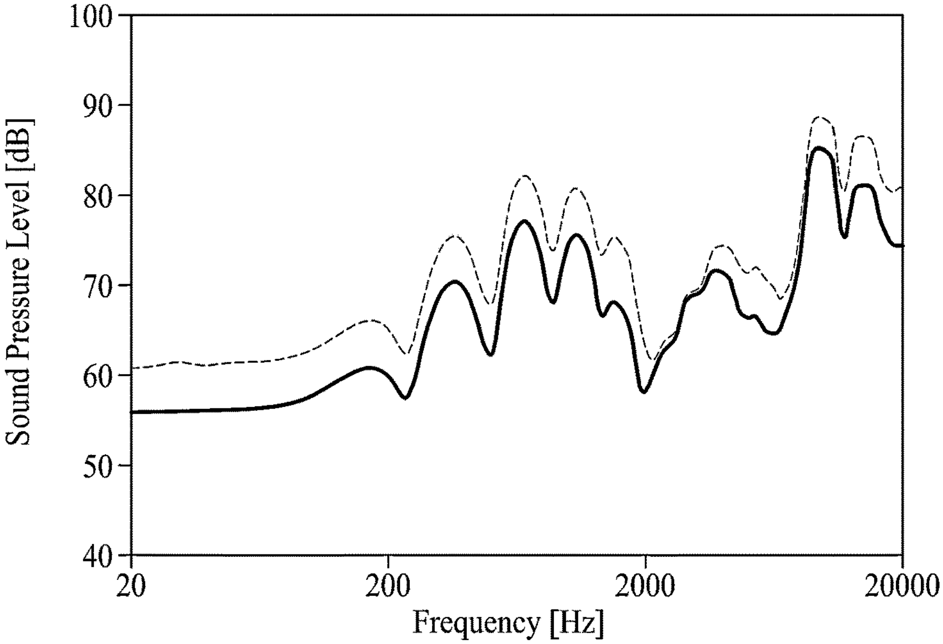
FIG. 29 illustrates a sound output characteristic of a vibration apparatus according to an embodiment of the present disclosure illustrated in FIG. 2.

FIG. 29 illustrates a sound output characteristic of a vibration apparatus according to an embodiment of the present disclosure illustrated in FIG. 2.

In FIG. 29, the abscissa axis represents a frequency (Hz (hertz)), and the ordinate axis represents a sound pressure level SPL (dB (decibel)). A sound output characteristic may be measured by a sound analysis apparatus. The sound analysis apparatus may be APX525 audio measurement equipment. The sound analysis apparatus may include a sound card which transmits or receives a sound to or from a control personal computer (PC), an amplifier which amplifies a signal generated from the sound card and transfers the amplified signal to a vibration apparatus, and a microphone which collects a sound generated by the vibration apparatus in a display panel. For example, the microphone may be disposed at a center of the vibration apparatus, and a distance between the display panel and the microphone may be about 30 cm. A sound may be measured in a state where the microphone is vertical to the vibration apparatus. The sound collected by the microphone may be input to the control PC through the sound card, and the sound of the vibration apparatus may be analyzed through checking in a control program. For example, a frequency response characteristic of a frequency range of 20 Hz to 20 kHz may be measured by using a pulse program. In sine sweep of 20 Hz to 20 kHz, measurement has been performed by applying ⅓ octave smoothing.

In FIG. 29, a thick solid line represents a sound output characteristic in a case which performs an environment reliability test where a voltage of 15 Vrms is continuously applied to the vibration apparatus illustrated in FIG. 2 for 168 hours under an environment condition where a high temperature (85° C.) and high humidity (85% RH (relative humidity (% RH)) are set. A dotted line represents a sound output characteristic in a case where an environment reliability test is not performed on the vibration apparatus. A temperature, humidity, and a driving time do not limit descriptions of the present disclosure.

Referring to FIG. 29, it may be seen that an average sound pressure level in 300 Hz to 8,000 Hz is about 68.4 dB in the solid line and is about 72.8 dB in the dotted line, and comparing the solid line with the dotted line, a difference of about −4.4 dB therebetween occurs.

Referring to FIG. 29, in a case where the protection member of the vibration apparatus is configured with a single film, it may be seen that, when the environment reliability test is not performed, an average sound pressure level in 300 Hz to 8,000 Hz is 72.8 dB corresponding to a good level, and after the environment reliability test is performed, an average sound pressure level in 300 Hz to 8,000 Hz decreases to 68.4 dB and is about −4.4 dB.

For example, a water vapor transmission rate of polyethylene terephthalate is $2\sim3\times10^{1}$ $g/m^{2}\cdot day$, and when it is applied to a protection member, a sound pressure level may decrease by about 3 dB or more under a condition where a high temperature (85° C.) and high humidity (85% RH) are adjusted. For example, a water vapor transmission rate of polyethylene terephthalate is $4\sim5\times10^{1}$ $g/m^{2}\cdot day$, and when it is applied to a protection member, a sound pressure level may decrease by about 3 dB or more under a condition where a high temperature (85 μm) and high humidity (85% RH) are adjusted.

According to an embodiment of the present disclosure, a water vapor transmission rate of polyethylene terephthalate is $3\times10^{0}$ $g/m^{2}\cdot day$, and when it is applied to a protection member, a sound pressure level may decrease by about 1 dB or less under a condition where a high temperature (85° C.) and high humidity (85% RH) are adjusted.

Accordingly, a vibration apparatus where the protection member illustrated in FIG. 2 is configured with a single film may have a good sound pressure level under a normal condition, but a mean sound pressure level thereof may decrease by about −4.4 dB under an environment reliability condition.

Figure 30:
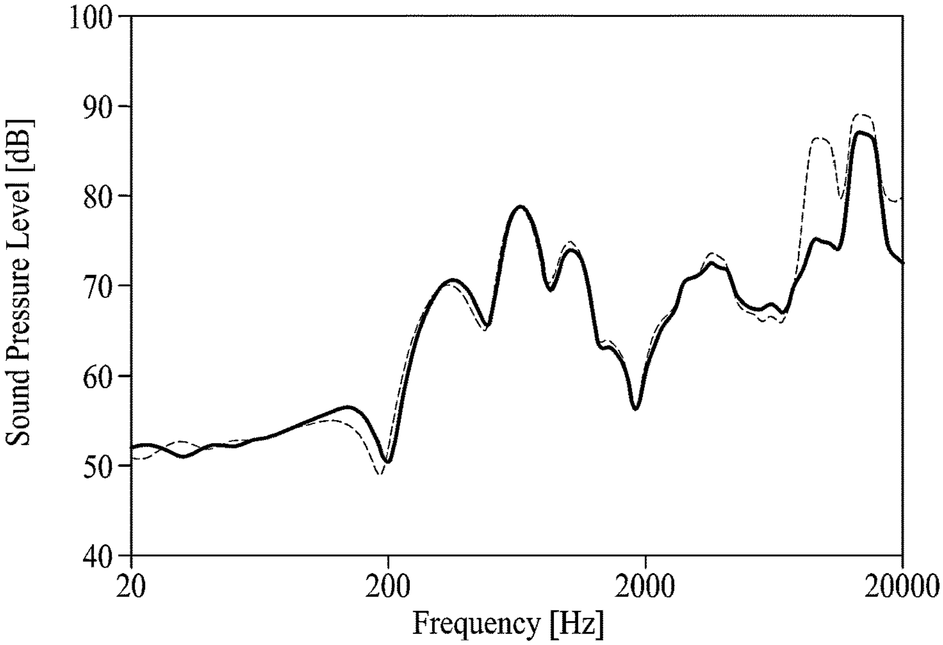
FIG. 30 illustrates a sound output characteristic of a vibration apparatus according to an embodiment of the present disclosure illustrated in FIG. 3.

FIG. 30 illustrates a sound output characteristic according to an embodiment of the vibration apparatus illustrated in FIG. 3.

In FIG. 30, the abscissa axis represents a frequency (Hz), and the ordinate axis represents a sound pressure level SPL (dB).

A sound output characteristic is the same as the description of FIG. 29, and thus, a description thereof is omitted.

In FIG. 30, a thick solid line represents a sound output characteristic in a case which performs an environment reliability test where the vibration apparatus illustrated in FIG. 3 including the first and second protection members 30 and 50 respectively including the first layers 31 and 51 including copper (Cu) is continuously applied a voltage of 15 Vrms for 168 hours under an environment condition where a high temperature (85° C.) and high humidity (85% RH (relative humidity (% RH)) are adjusted. A dotted line represents a sound output characteristic where the environment reliability test is not performed on the vibration apparatus. A temperature, humidity, and a driving time do not limit descriptions of the present disclosure.

Referring to FIG. 30, it may be seen that an average sound pressure level in 300 Hz to 8,000 Hz is about 69.0 dB in the solid line and is about 69.1 dB in the dotted line, and comparing the solid line with the dotted line, a difference of about −0.1 dB therebetween occurs.

Referring to FIG. 30, in a case where the protection member of the vibration apparatus is configured in a complex structure including a Cu thin film and a film, it may be seen that a difference after and before the environment reliability test is about −0.1 dB corresponding to a similar level.

Because a protection member includes metal, when a water vapor transmission rate WVTR of a metal composite structure which is a protection member is $2\times10^{2}$ g/m$^2$·day, a sound pressure level may be improved to about 1 dB or less under a condition where a high temperature (85° C.) and high humidity (85% RH) are adjusted, and thus, the reliability of a vibration apparatus may be enhanced.

Therefore, in a vibration apparatus where the protection member illustrated in FIG. 3 is configured with a metal thin film and a film, a sound pressure level may be maintained under an environment reliability condition, and thus, environment reliability may be enhanced.

Figure 31:
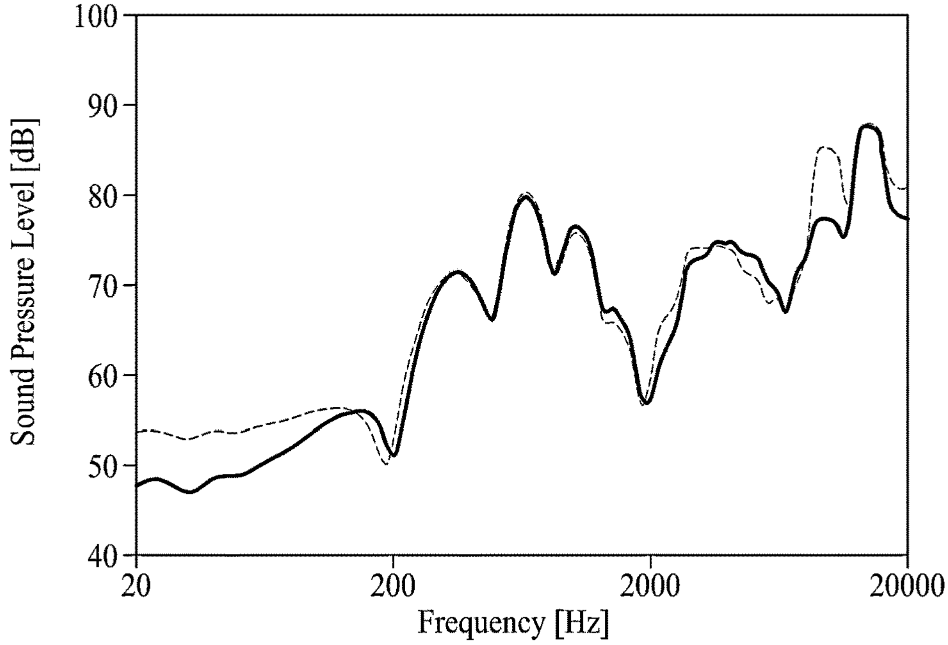
FIG. 31 illustrates a sound output characteristic of a vibration apparatus according to another embodiment of the present disclosure illustrated in FIG. 3.

FIG. 31 illustrates a sound output characteristic according to another embodiment of the vibration apparatus illustrated in FIG. 3.

In FIG. 31, the abscissa axis represents a frequency (Hz), and the ordinate axis represents a sound pressure level SPL (dB).

A sound output characteristic is the same as the description of FIG. 29, and thus, a description thereof is omitted.

In FIG. 31, a thick solid line represents a sound output characteristic in a case which performs an environment reliability test where the vibration apparatus illustrated in FIG. 3 including the first and second protection members 30 and 50 respectively including the first layers 31 and 51 including aluminum (Al) is continuously applied a voltage of 15 Vrms for 168 hours under an environment condition where a high temperature (85° C.) and high humidity (85% RH (relative humidity (% RH)) are adjusted. A dotted line represents a sound output characteristic where the environment reliability test is not performed on the vibration apparatus. A temperature, humidity, and a driving time do not limit descriptions of the present disclosure.

Referring to FIG. 31, it may be seen that an average sound pressure level in 300 Hz to 8,000 Hz is about 70.7 dB in the solid line and is about 70.6 dB in the dotted line, and comparing the solid line with the dotted line, a difference of about 0.1 dB therebetween occurs.

Referring to FIG. 31, in a case where the protection member of the vibration apparatus is configured in a complex structure including an Al thin film and a film, it may be seen that a difference after and before the environment reliability test is about 0.1 dB corresponding to a similar level.

Because a protection member includes metal, when a water vapor transmission rate WVTR of a metal composite structure which is a protection member is $2\times10^{-2}$ g/m$^2$·day, a sound pressure level may be improved to about 1 dB or less under a condition where a high temperature (85° C.) and high humidity (85% RH) are adjusted, and thus, the reliability of a vibration apparatus may be enhanced.

Therefore, in a vibration apparatus where the protection member illustrated in FIG. 3 is configured with a metal thin film and a film, a sound pressure level may be maintained under an environment reliability condition, and thus, environment reliability may be enhanced.

Figure 32:
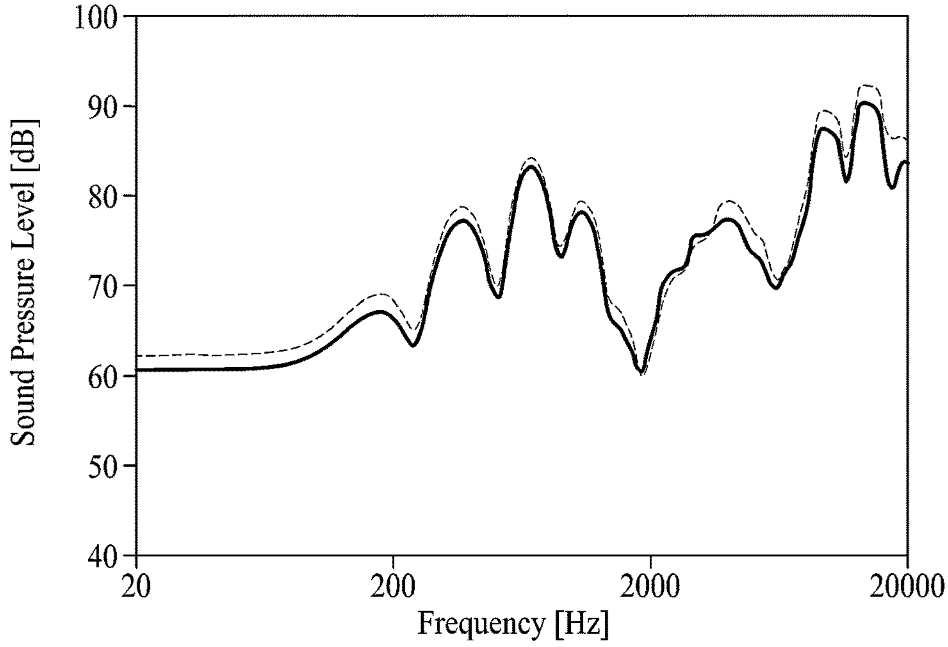
FIG. 32 illustrates a sound output characteristic of a vibration apparatus according to an embodiment of the present disclosure illustrated in FIG. 4.

FIG. 32 illustrates a sound output characteristic of the vibration apparatus illustrated in FIG. 4.

In FIG. 32, the abscissa axis represents a frequency (Hz), and the ordinate axis represents a sound pressure level SPL (dB).

A sound output characteristic is the same as the description of FIG. 29, and thus, a description thereof is omitted.

In FIG. 32, a thick solid line represents a sound output characteristic in a case which performs an environment reliability test where the vibration apparatus illustrated in FIG. 4 where the first and second protection members 30 and 50 respectively include the first layers 31 and 51 including copper (Cu) and an adhesive layer including a vibration transfer filler is provided between the first and second protection members 30 and 50 and the vibration layer 11 is continuously applied a voltage of 15 Vrms for 168 hours under an environment condition where a high temperature (85° C.) and high humidity (85% RH (relative humidity (% RH)) are adjusted. A dotted line represents a sound output characteristic where the environment reliability test is not performed on the vibration apparatus. A temperature, humidity, and a driving time do not limit descriptions of the present disclosure.

Referring to FIG. 32, it may be seen that an average sound pressure level in 300 Hz to 8,000 Hz is about 75.5 dB in the solid line and is about 76.7 dB in the dotted line, and comparing the solid line with the dotted line, a difference of about −1.2 dB therebetween occurs.

Referring to FIG. 32, in a case where the protection member of the vibration apparatus is configured in a complex structure including a Cu thin film and a film and an adhesive layer including a vibration transfer filler is provided between the protection member and a vibration layer, when the environment reliability test is not performed, it may be seen that an average sound pressure level in 300 Hz to 8,000 Hz is 76.7 dB corresponding to a good level, an average sound pressure level in 300 Hz to 8,000 Hz is 75.5 dB corresponding to a good level after the environment reliability test, and a difference after and before the environment reliability test is about −1.2 dB corresponding to a similar level.

Therefore, in a vibration apparatus where the protection member illustrated in FIG. 4 is configured with a metal thin film and a film and which includes an adhesive layer to which a vibration transfer filler is applied, a sound pressure level characteristic may be enhanced and a sound pressure level characteristic may be maintained under an environment reliability condition, and thus, environment reliability may be improved.

According to an embodiment of the present disclosure, because a protection member where a water vapor transmission rate WVTR is $1\times10^{-1}$ g/m$^2$·day or less is provided, a sound pressure level may be enhanced, a moisture resistance characteristic of the protection member may be enhanced, and thus, the reliability of a vibration apparatus may be enhanced.

The vibration generating apparatus according to an embodiment of the present disclosure may be applied to a vibration generating apparatus and/or a sound generating apparatus provided in the apparatus. The apparatus according to an embodiment of the present disclosure may be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display apparatuses, televisions (TVs), wall paper display apparatuses, signage devices, game machines, notebook computers, monitors, cameras, camcorders, home appliances, etc. Also, the vibration generating apparatus according to some embodiments of the present disclosure may be applied to organic light emitting lighting devices or inorganic light emitting lighting devices. In a case where the vibration generating apparatus is applied to a lighting device, the vibration apparatus may act as lighting and a speaker. Also, in a case where the vibration generating apparatus according to some embodiments of the present disclosure is applied to a mobile device, the vibration apparatus may be one or more of a speaker, a receiver, or a haptic, but is not limited thereto.

An apparatus according to various embodiments of the present disclosure will be described below.

An apparatus according to various embodiments of the present disclosure may include a vibration portion, a first protection member covering a first surface of the vibration portion, and a second protection member covering a second surface of the vibration portion, at least one of the first protection member and the second protection member may include a first layer including a metal material or an inorganic material.

According to various embodiments of the present disclosure, the first layer may overlap the vibration portion.

According to various embodiments of the present disclosure, each of the first protection member and the second protection member may include a base layer.

According to various embodiments of the present disclosure, the first layer may be between the vibration portion and the base layer.

According to various embodiments of the present disclosure, the vibration portion may include a vibration layer including a piezoelectric material, a first electrode layer at a first surface of the vibration layer, and a second electrode layer at a surface different from the first surface of the vibration layer.

According to various embodiments of the present disclosure, may further include an adhesive layer between the first layer and the vibration portion, the adhesive layer may be a conductive adhesive layer.

According to various embodiments of the present disclosure, the first layer may be electrically connected to one or more of the first electrode layer and the second electrode layer with the adhesive layer therebetween.

According to various embodiments of the present disclosure, may further include an adhesive layer between the first layer and the vibration portion, the adhesive layer may include a filler member.

According to various embodiments of the present disclosure, the filler member may include one or more of oxide, carbide, nitride, and oxynitride.

According to various embodiments of the present disclosure, may further include an adhesive layer between the first layer and the base layer.

According to various embodiments of the present disclosure, a size of the first layer may be less than or equal to a size of the base layer.

According to various embodiments of the present disclosure, the base layer may be between the vibration portion and the first layer.

According to various embodiments of the present disclosure, the vibration portion may include a vibration layer including a piezoelectric material, a first electrode layer at a first surface of the vibration layer, and a second electrode layer at a surface different from the first surface of the vibration layer.

According to various embodiments of the present disclosure, may further include an adhesive layer between the base layer and the vibration portion, the base layer may be adjacent to one or more of the first electrode layer and the second electrode layer with the adhesive layer therebetween.

According to various embodiments of the present disclosure, may further include a secondary layer between the base layer and the first layer.

According to various embodiments of the present disclosure, each of the first protection member and the second protection member may include the first layer, and the first layers of the first protection member and the second protection member may include the same metal material or different metal materials.

According to various embodiments of the present disclosure, the first layer of each of the first protection member and the second protection member may be a portion of a contact portion of the vibration portion.

An apparatus according to various embodiments of the present disclosure may include one or more vibration generating portions, each of the one or more vibration generating portions may include a vibration portion, a first protection member on a first surface of the vibration portion, the first protection member including two or more layers, and a second protection member on a second surface different from the first surface of the vibration portion, the second protection member including two or more layers, and the one of two or more layers in one or more of the first protection member and the second protection member may comprise an organic material.

According to various embodiments of the present disclosure, the vibration portion may include a vibration layer, a first electrode layer at a first surface of the vibration layer, and a second electrode layer at a second surface different from the first surface of the vibration layer.

According to various embodiments of the present disclosure, each of the one or more vibration generating portions may include a first adhesive layer between the first electrode layer and the first protection member, and a second adhesive layer between the second electrode layer and the second protection member.

According to various embodiments of the present disclosure, the organic material of the first protection member may be adjacent to the first adhesive layer, and the organic material of the second protection member may be adjacent to the second adhesive layer.

According to various embodiments of the present disclosure, the two or more layers of each of the first protection member and the second protection member may further include a first layer adjacent to the organic material.

According to various embodiments of the present disclosure, the first layer may include an inorganic material.

According to various embodiments of the present disclosure, each of the one or more vibration generating portions may further include a secondary layer between the first layer and the organic material.

According to various embodiments of the present disclosure, each of the one or more vibration generating portions may further include a first layer between the organic material of the first protection member and the first adhesive layer and between the organic material of the second protection member and the second adhesive layer.

According to various embodiments of the present disclosure, the first layer may include a metal material.

According to various embodiments of the present disclosure, the vibration layer may include a piezoelectric-type vibration layer.

According to various embodiments of the present disclosure, the vibration layer may include a plurality of inorganic material portions having a piezoelectric characteristic, and an organic material portion between the plurality of inorganic material portions.

According to various embodiments of the present disclosure, may further include two or more vibration generating portions, the two or more vibration generating portions may be configured to vibrate in the same direction.

An apparatus according to various embodiments of the present disclosure may comprise one or more vibration generating portions, each of the one or more vibration generating portions comprises a vibration portion, a first protection member at a first surface of the vibration portion, and a second protection member at a second surface different from the first surface of the vibration portion. One or more of the first protection member and the second protection member may comprise a layer comprising an organic material.

According to various embodiments of the present disclosure, each of the first protection member and the second protection member may further comprise a first layer adjacent to the organic material.

An apparatus according to various embodiments of the present disclosure may include a passive vibration member, and a vibration generating apparatus configured to vibrate the passive vibration member, the vibration generating apparatus may include a vibration portion, a first protection member covering a first surface of the vibration portion, and a second protection member covering a second surface of the vibration portion, at least one of the first protection member and the second protection member may include a first layer including a metal material or an inorganic material.

An apparatus according to various embodiments of the present disclosure may include a passive vibration member, and a vibration generating apparatus configured to vibrate the passive vibration member, the vibration generating apparatus may include one or more vibration generating portions, each of the one or more vibration generating portions may include a vibration portion, a first protection member at a first surface of the vibration portion, the first protection member including two or more layers, and a second protection member at a second surface different from the first surface of the vibration portion, the second protection member including two or more layers, and the one of two or more layers in one or more of the first protection member and the second protection member may include an organic material.

An apparatus according to various embodiments of the present disclosure may include a passive vibration member, and a vibration generating apparatus configured to vibrate the passive vibration member, the vibration generating apparatus may include one or more vibration generating portions, each of the one or more vibration generating portions may include a vibration portion, a first protection member at a first surface of the vibration portion, and a second protection member at a second surface different from the first surface of the vibration portion, and the one or more of the first protection member and the second protection member may comprise a layer comprising an organic material.

According to various embodiments of the present disclosure, the passive vibration member may include one or more of metal, plastic, paper, fiber, cloth, wood, rubber, leather, glass, carbon, and mirror.

According to various embodiments of the present disclosure, the passive vibration member may include one or more of a display panel including a plurality of pixels configured to display an image, a screen panel on which an image is to be projected from a display apparatus, a light emitting diode lighting panel, an organic light emitting lighting panel, an inorganic light emitting lighting panel, a signage panel, an interior material of a vehicular apparatus, an exterior material of a vehicular apparatus, a glass window of a vehicular apparatus, a seat interior material of a vehicular apparatus, a ceiling material of a building, an interior material of a building, a glass window of a building, an interior material of an aircraft, a glass window of an aircraft, and a mirror.

According to various embodiments of the present disclosure, the passive vibration member may be an interior material of a vehicular apparatus, the interior material of the vehicular apparatus may include one or more of a dash board, a pillar interior material, a roof interior material, a door interior material, a seat interior material, a handle interior material, a floor interior material, a rear package interior material, a rear view mirror, an overhead console, a glove box, and a sun visor, and the vibration generating apparatus may be configured to vibrate one or more of the dash board, the pillar interior material, the roof interior material, the door interior material, the seat interior material, the handle interior material, the floor interior material, the rear package interior material, the rear view mirror, the overhead console, the glove box, and the sun visor.

According to embodiments of the present disclosure, a vibration apparatus which vibrates a display panel or a passive vibration member may be configured, and a protection member of the vibration apparatus including a piezoelectric device may be configured, thereby providing an apparatus for enhancing environment reliability.

According to embodiments of the present disclosure, a vibration apparatus which vibrates a display panel or a passive vibration member may be configured, and a protection member of the vibration apparatus including a piezoelectric device may be configured, thereby providing an apparatus for satisfying environment reliability and enhancing a sound characteristic and/or a sound pressure level characteristic.

It will be apparent to those skilled in the art that various modifications and variations can be made in the apparatus of the present disclosure without departing from the technical idea or scope of the disclosure. Thus, it is intended that the present disclosure covers the modifications and variations of this disclosure provided they come within the scope of the appended claims and their equivalents.

What is claimed is:

1. An apparatus, comprising:

a vibration portion;

a first protection member covering a first surface of the vibration portion; and a second protection member covering a second surface of the vibration portion, wherein at least one of the first protection member and the second protection member includes two or more layers, and a first layer comprises a metal material, wherein the vibration portion comprises:

a vibration layer including a piezoelectric material;

a first electrode layer at a first surface of the vibration layer; and a second electrode layer at a surface different from the first surface of the vibration layer, wherein each of the first and second protection members comprises:

a base layer;

the first layer disposed between the vibration portion and the base layer; and an adhesive layer between the first layer and the vibration portion, the adhesive layer being a conductive adhesive layer, wherein the first and second protection members have a size greater than or equal to a size of the vibration portion, wherein the first layer is electrically connected to at least one of the first electrode layer and the second electrode layer through the adhesive layer, and wherein the first layer is configured as a portion of a contact portion of the vibration portion.

2. The apparatus of claim 1, wherein the first layer overlaps the vibration portion.

3. The apparatus of claim 1, further comprising an adhesive layer between the first layer and the base layer.

4. The apparatus of claim 1, wherein a size of the first layer is less than or equal to a size of the base layer.

5. The apparatus of claim 1, further comprising a secondary layer between the base layer and the first layer.

6. The apparatus of claim 1, wherein the first layers of the first protection member and the second protection member comprise the same metal material or different metal materials.

7. An apparatus, comprising:

a passive vibration member; and a vibration generating apparatus configured to vibrate the passive vibration member, wherein the vibration generating apparatus comprises the apparatus of claim 1.

8. The apparatus of claim 7, wherein the passive vibration member comprises one or more of metal, plastic, paper, fiber, cloth, wood, rubber, leather, glass, carbon, and mirror.

9. The apparatus of claim 7, wherein the passive vibration member comprises one or more of a display panel including a plurality of pixels configured to display an image, a screen panel on which an image is to be projected from a display apparatus, a light emitting diode lighting panel, an organic light emitting lighting panel, an inorganic light emitting lighting panel, a signage panel, an interior material of a vehicular apparatus, an exterior material of a vehicular apparatus, a glass window of a vehicular apparatus, a seat interior material of a vehicular apparatus, a ceiling material of a building, an interior material of a building, a glass window of a building, an interior material of an aircraft, a glass window of an aircraft, and a mirror.

10. The apparatus of claim 7, wherein:

the passive vibration member is an interior material of a vehicular apparatus;

the interior material of the vehicular apparatus comprises one or more of a dash board, a pillar interior material, a roof interior material, a door interior material, a seat interior material, a handle interior material, a floor interior material, a rear package interior material, a rear view mirror, an overhead console, a glove box, and a sun visor; and the vibration generating apparatus is configured to vibrate one or more of the dash board, the pillar interior material, the roof interior material, the door interior material, the seat interior material, the handle interior material, the floor interior material, the rear package interior material, the rear view mirror, the overhead console, the glove box, and the sun visor.

11. The apparatus of claim 1, wherein the at least one of the first electrode layer and the second electrode layer is configured to be driven by a vibration driving signal.

12. The apparatus of claim 1, wherein the at least one of the first electrode layer and the second electrode layer is configured to be driven by an alternating current (AC) voltage.

13. The apparatus of claim 1, wherein the at least one of the first electrode layer and the second electrode layer is electrically coupled to a signal cable.

14. An apparatus, comprising:

one or more vibration generating portions, wherein each of the one or more vibration generating portions comprises:

a vibration portion;

a first protection member at a first surface of the vibration portion, the first protection member including two or more layers; and a second protection member at a second surface different from the first surface of the vibration portion, the second protection member including two or more layers, wherein the vibration portion comprises:

a vibration layer;

a first electrode layer at a first surface of the vibration layer; and a second electrode layer at a second surface different from the first surface of the vibration layer, wherein one of the two or more layers in one or more of the first protection member and the second protection member comprises an organic material, wherein each of the first and second protection members comprises:

a base layer;

a first layer adjacent to the organic material and comprising a metal material; and an adhesive layer between the first layer and the vibration portion, the adhesive layer being a conductive adhesive layer, wherein the first and second protection members have a size greater than or equal to a size of the vibration portion, wherein the first layer is electrically connected to at least one of the first electrode layer and the second electrode layer through the adhesive layer, and wherein the first layer is configured as a portion of a contact portion of the vibration portion.

15. The apparatus of claim 14, wherein the adhesive layer comprises:

a first adhesive layer between the first electrode layer and the first protection member; and a second adhesive layer between the second electrode layer and the second protection member.

16. The apparatus of claim 14, wherein each of the one or more vibration generating portions further comprises a secondary layer between the first layer and the organic material.

17. The apparatus of claim 15, wherein the first layer is disposed between the organic material of the first protection member and the first adhesive layer and between the organic material of the second protection member and the second adhesive layer.

18. The apparatus of claim 14, wherein the vibration layer comprises a piezoelectric-type vibration layer.

19. The apparatus of claim 14, wherein the vibration layer comprises:

a plurality of inorganic material portions having a piezoelectric characteristic; and an organic material portion between the plurality of inorganic material portions.

20. The apparatus of claim 14, further comprising two or more vibration generating portions, wherein the two or more vibration generating portions are configured to vibrate in the same direction.

21. An apparatus, comprising:

a passive vibration member; and a vibration generating apparatus configured to vibrate the passive vibration member, wherein the vibration generating apparatus comprises the apparatus of claim 18.

22. The apparatus of claim 21, wherein the passive vibration member comprises one or more of metal, plastic, paper, fiber, cloth, wood, rubber, leather, glass, carbon, and mirror.

23. The apparatus of claim 21, wherein the passive vibration member comprises one or more of a display panel including a plurality of pixels configured to display an image, a screen panel on which an image is to be projected from a display apparatus, a light emitting diode lighting panel, an organic light emitting lighting panel, an inorganic light emitting lighting panel, a signage panel, an interior material of a vehicular apparatus, an exterior material of a vehicular apparatus, a glass window of a vehicular apparatus, a seat interior material of a vehicular apparatus, a ceiling material of a building, an interior material of a building, a glass window of a building, an interior material of an aircraft, a glass window of an aircraft, and a mirror.

24. The apparatus of claim 21, wherein:

the passive vibration member is an interior material of a vehicular apparatus;

the interior material of the vehicular apparatus comprises one or more of a dash board, a pillar interior material, a roof interior material, a door interior material, a seat interior material, a handle interior material, a floor interior material, a rear package interior material, a rear view mirror, an overhead console, a glove box, and a sun visor; and the vibration generating apparatus is configured to vibrate one or more of the dash board, the pillar interior material, the roof interior material, the door interior material, the seat interior material, the handle interior material, the floor interior material, the rear package interior material, the rear view mirror, the overhead console, the glove box, and the sun visor.

* * * * *